US005670228A

United States Patent [19]

Kakamu et al.

[11] Patent Number: 5,670,228

[45] Date of Patent: Sep. 23, 1997

[54] TILE HAVING A PATTERN AND ITS MANUFACTURING METHOD

[75] Inventors: Yoshinori Kakamu; Shinichi Kakamu; Shukichi Kakamu, all of Toki, Japan

[73] Assignee: Mino Ganryo Kagaku Corporation, Japan

[21] Appl. No.: 552,608

[22] Filed: Nov. 3, 1995

Related U.S. Application Data

[62] Division of Ser. No. 119,733, Sep. 10, 1993, abandoned.

[30] Foreign Application Priority Data

| | | | |
|---|---|---|---|
| Sep. 16, 1992 | [JP] | Japan | 4-246331 |
| Sep. 24, 1992 | [JP] | Japan | 4-254403 |
| Nov. 11, 1992 | [JP] | Japan | 4-301364 |
| Jan. 7, 1993 | [JP] | Japan | 5-001147 |
| Jun. 11, 1993 | [JP] | Japan | 5-140869 |
| Jun. 25, 1993 | [JP] | Japan | 5-155118 |

[51] Int. Cl.[6] ..... B32B 9/00

[52] U.S. Cl. ..... 428/49; 428/47; 428/48; 428/88; 428/156; 428/161; 428/172; 428/207; 428/317.7; 428/904.4; 264/35; 264/42; 264/63; 264/119; 264/125; 264/245; 264/333; 156/63; 156/257; 156/293; 156/304.5; 52/385; 52/389; 52/311.1

[58] Field of Search ..... 428/47, 156, 88, 428/172, 207, 904.4, 48, 49, 161, 313.7; 501/5, 18, 22, 74; 264/63, 35, 42, 119, 125, 245, 255, 333, 337; 52/385, 389, 311.1; 156/63, 257, 293, 304.5, 304.6

[56] References Cited

U.S. PATENT DOCUMENTS

| | | | |
|---|---|---|---|
| 957,187 | 5/1910 | Chappell . | |
| 1,539,148 | 5/1925 | Sylvester . | |
| 2,007,961 | 7/1935 | Bolton | 25/42 |
| 2,794,940 | 6/1957 | Roup | 317/101 |
| 4,759,965 | 7/1988 | Kato et al. | 428/138 |
| 5,190,708 | 3/1993 | Vitaliano et al. | 264/62 |

FOREIGN PATENT DOCUMENTS

| | | |
|---|---|---|
| 0473383 | 3/1992 | European Pat. Off. . |
| 351874 | 7/1905 | France . |
| 497983 | 12/1919 | France . |
| 658070 | 5/1929 | France . |
| 814339 | 6/1937 | France . |
| 1234462 | 10/1960 | France . |
| 68728 | 6/1893 | Germany . |
| 287358 | 1/1914 | Germany . |
| 282990 | 3/1915 | Germany . |
| 286234 | 7/1915 | Germany . |
| 3203107 | 8/1983 | Germany . |
| 6411441 | 2/1989 | Japan . |
| 28883 | 2/1990 | Japan . |
| 242323 | 9/1990 | Japan . |
| 2239905 | 9/1990 | Japan . |
| 430011 | 7/1992 | Japan . |
| 430012 | 7/1992 | Japan . |
| 302246 | 10/1954 | Switzerland . |
| 904037 | 8/1962 | United Kingdom . |

*Primary Examiner*—Patrick Ryan
*Assistant Examiner*—Abraham Bahta
*Attorney, Agent, or Firm*—Michaelson & Wallace; Peter L. Michaelson; Jeremiah G. Murray

[57] ABSTRACT

A tile having a desired pattern is provided. The pattern goes through the tile in the thickness direction. For manufacturing such a tile, e.g. a partition plate 84 is disposed in a pressure forming die 91 so as to divide its inside space into an outer forming space 95 and an inner forming space 96. Light black granules and light red granules are filled respectively in the outer and inner forming spaces 95, 96. Then, the partition wall 84 is taken out from the die 91, and lining granules are filled over the colored granules. Thereafter, they are pressed into one body and burned.

26 Claims, 53 Drawing Sheets

TILE HAVING A PATTERN AND ITS MANUFACTURING METHOD

This application is a division of our patent application Ser. No. 08/119,733 filed on Sep. 10, 1993, now abandoned.

BACKGROUND OF THE INVENTION

1. Field of the Invention

The present invention relates to a nonglazed tile provided with a design of many colors or a colored pattern and its manufacturing method, particularly to a tile which is able to keep an initial distinct and vivid pattern even against long time abrasion and its manufacturing method. Such tiles may be laid on a floor of a bathroom, a lavatory or the like, sidewalks of a park, a shopping center or the like, etc. Such tiles may be also used for an interior or exterior wall material of a building or applied to tiling at stepped portions of stairs or roads, corners of gateposts or buildings, etc.

2. Description of Related Art

Conventionally, cement tiles, which are cheap, are generally used for tiles having a pattern that are laid on a sidewalk, a floor or the like while serving as an ornament, since such tiles need to be inexpensive. Each piece of tile is a plain colored tile of generally a rectangular shape fabricated by a colored body added with a kneaded pigment. Various colors of tiles are used in combination and joined to each other by a jointing cement.

In case one piece of rectangular tile needs to have a multicolored pattern, in general, colored tile pieces of different colors are separately made, thereafter the colored tile pieces of different colors and shapes are jointed by a cement at the time of laying.

There is a tile having a pattern with only a surface printed by a pigment.

However, with the method of making a pattern by a manner of arranging the rectangular plain colored tiles as the conventional tiles having a pattern, patterns to be formed are limited in simple patterns such as a diced pattern, now that a piece of floor tile is large, i.e. 200 mm or 300 mm square.

With the method of jointing the colored tile pieces by a cement at the time of laying, a white line of the jointing cement which is exposed after joining is easy to become dirty and unclear particularly in a floor, a pavement or the like. Moreover, if the jointed part is made into a line as narrow as possible, inadvantageously it is peeled off with time. With this method, a border of the colored tile pieces is also limited in a straight line or a curved line very similar to the straight line due to work convenience. In addition, as the colored tile pieces are separately made, a jointing work by the cement joining them each other is multiplied, then taking much time and labor in a laying work at a job site.

Furthermore, though the cement tile can be manufactured at low costs, since it does not experience burning, it is inferior to a burnt tile in luster or the like, and is low in strength, particularly a surface strength thereby being abraded with time, e.g. when pedestrians pass thereon. Such a tile needs to be thick in order to assure a fixed strength, so that a transportation work efficiency is lowered.

The tile with the surface alone printed by an organic pigment is inadvantageously decolored with time.

By the reasons mentioned above, burnt tiles are desirously used at a sidewalk of a shop street, a park or the like an appearance of which is thought important.

Some methods are used for giving a pattern to a nonglazing tile as a burnt tile. One method is to form flutes or irregularities. Other method is to disperse rock powders or colored tile powders to obtain a spotted pattern. However, these methods are not satisfactory in view of ornamentation. There is a tile provided with a baking pattern by printing or handwriting on a surface of a green body or a biscuit tile, too. However, the thickness of the pattern of this tile is about 0.1 to 0.3 mm, so that the pattern is faded by abrasion or the tiles are possibly slippery thereby to need some caution in case of wet condition, with resultant limited applications.

In order to solve these problems, Japanese Patent Publication No. 50-20962 discloses a technique of manufacturing method of a multicolor tile in which a powdery pattern is embedded into a surface of a tile in a thickness of 3 mm. As improved methods of the above technique, Japanese Patent Publication No 2-42323 shows a manufacturing method of ceramics provided with an inlaid ornamental surface, and Japanese Laid Open Patent Publication Nos. 2-239905 and 2-241703 respectively disclose techniques of manufacturing methods of inlaid tiles. These inlaying methods can obtain nonglazing tiles having a variety of patterns of a thickness of about 3 mm, since they embed prepared patterns into bodies and sinter them.

As mentioned above, the inlaid tiles excel, as nonglazed tiles used for pavements or the like, in view of variety of patterns and thickness.

However, it is important for the inlaying method to control density and shrinkage degree of pattern materials, pellets and powders to be embedded as well as compression density of concaves of bodies receiving the embedded materials, in order to get tiles with a precise and elaborate boundary between the body and the pattern. Unless they are not controlled, gaps arise at the boundary. Generally, the inlaying method needs two or three times of pressing work, so that it has disadvanteges of taking a lot of time and labor in making tiles and increasing production costs.

In the technique of Publication No. 2-241703, a base tile is preformed at such a pressure as maintaining its shape. Dents are formed at the same time and inlaying pellets are put and fitted into the dents. Otherwise, separately preformed base tile pellets and inlaying pellets are arranged in order while the base tile pellets are kept flat, then they are pressed and formed as a whole. The inlaid tiles thus obtained have desired strength by burning, and has no gaps produced at the above mentioned boundary. Moreover, different colors of clay bodies rarely flow on pressing, so that it is possible to make clear the boundary between inlaid patterns and other areas.

However, the technique of Publication No. 2-241703 takes a lot of time and labor in making the base tiles having dents. In case the tile is give such a pattern as has a constant width of partition line at the boundary of the pattern, it is difficult to make the width of the partition line constant, so that it is unseemly in view of appearance.

As a manufacturing method of a body provided with a pattern of unfixed shapes of spots, Japanese Patent Publication No. 2-8883 discloses a tile having a bordered pattern of unfixed shapes of spots which is obtained by arranging and pressing to mold a lump of raw material dusted with color pigment powder or a lump of color raw material dusted with raw material powder in a press die. However, the technique is limited in the pattern of unfixed shapes, so that it is necessary to think out how to arrange the color raw material lump or the like in order to make a uniform pattern.

It is known to mix and knead two colors of clays and slice kneaded body, thereby making such a pattern as an ink flow. With tiles obtained by this technique, since the same color part go through the tile in the thickness direction, the pattern is never vanished even if the surface is abraded. However, this technique is in capable of providing patterns other than the above ink flowing pattern. Moreover, the tiles are fabricated by hand, so that the technique is no good in workability.

Conventionally, in tiling a corner, angle tiles which are bent according to an angle of the corner are used. The angle tiles are manufactured generally by pressure forming of powder raw material. Specifically, its making method utilizes a press die which define an angle shape of a pressing space between au upper mold and a lower mold of a V-section or an inverted V-section. The powder raw material added with a binder is disposed on a whole surface of both slopes of the lower mold and a top thereof. Then the material is pressingly formed between the upper and lower molds, thereafter being burned to obtain produce tiles. Such a technique is shown in Japanese Utility Model Publication No. 4-30011 or the like, for example.

Thus manufactured angle tiles have good appearance and sufficient corner strength, since they are formed into one body as a whole including the corner and have no joints. Still, a surface pattern is limited into a simple color pattern such as one color pattern or a spotted pattern.

In recent years, there arise needs for colorful tiles. Therefore, many kinds of tiles with various patterns have been proposed and used. For instance, in addition to the above Publication No. 2-42323, Japanese Patent Publication No. 2-8883 discloses a tile having an unfixed pattern which is obtained by arranging and pressingly forming raw material lump of clay body dusted with color pigment powder in a press die.

However, as such various patterns are made by use of a plane die, the above methods are applicable to flat plate shaped tiles, but it is hard to apply to the above mentioned angle tiles which are manufactured by use of a press die with inclined die surfaces. Therefore, other methods are currently adopted to make up corners using tiles having the above color pattern. One method is to stick two tiles at right angles via an adhesive. Other one is to join two tiles at right angles via cement and connect them by use of angle members made of a metal, a synthetic resin or the like.

However, these methods need much labor in practising. Moreover, it is possible that a cutting plane Is exposed to affect an appearance. There is a fear of abrasion in case of connecting through the cement. Thus, large improvement is to be achieved in manufacturing steps for tiling, durability, an appearance, etc. if angle tiles that has various patterns can be obtained. For that reason, such tiles have been desired in the industry for a long time.

SUMMARY OF THE INVENTION

In view of the above, it is an object of the invention to provide a nonglazed tile having a pattern and a manufacturing method thereof that is capable of clearly making desired and various patterns by simple steps without any gaps at a boundary, that is free from fading or disappearing of the patterns and that prevents slip when it gets wet.

It is another object of the invention to provide a tile having a pattern and a manufacturing method thereof that has large abrasion resistance while having a fixed width of partition line at a boundary of the pattern and that is excellent in an appearance of the boundary of the pattern.

It is a still another object of the invention to provide a tile having a pattern and a manufacturing method thereof that can easily make such color patterns as are impossible in a common forming die for an angle tile and that has a sufficient corner strength and high quality in an appearance.

In accordance with one preferred mode of the invention, there is provided a tile having a pattern that is made by: disposing a plurality of molding materials of different colors into an inside space of a pressure forming die while dividing them from each other in a planar direction of the inside space and while having each color of the molding materials extend from one side to an other side of a thickness direction of the inside space; pressing and forming integrally the molding materials into a molded body in the inside space; and burning the molded body.

Preferably, the molding materials are composed of different colors of colored granules filled in a divided manner in the inside space; and the molded body is made by pressing and forming integrally the colored granules in the inside space.

More preferably, a partition means is disposed in the inside space to divide the inside space into a plurality of forming spaces; and each color of the colored granules are filled in each of the forming spaces.

Preferably, the partition means is a partition wall made of a clay body into a predetermined moisture content, and the partition wall is pressed and formed integrally with the colored granules to make the molded body.

Preferably, the molding materials are blocks respectively prepared before being disposed in the inside space; and the block is made by kneading a raw material mixed powder, a pigment and water to prepare a plurality of colored clay bodies of different colors of a predetermined moisture content, molding each color of the colored clay bodies into a colored base material of a fixed thickness, and joining a plurality of colored base materials of different colors in its thickness direction into one body.

Preferably, the molded body is made by gathering, piling and joining a plurality of base materials of different colors, cutting the joined base materials in the gathering and piling direction into a constant width thereby making the block, and disposing and pressing the blocks in the inside space while a cutting surface of the block being faced vertically.

Preferably, the base material has a bar shape; the block is made by gathering, twisting and joining the base materials of different colors; and the molded body is made by disposing the block in the inside space in the planar direction and pressingly forming the block therein.

Preferably, the molding material comprises a preformed body of a plate shape prepared before being disposed in the pressure forming die; the pressure forming die comprises an upper mold and a lower mold defining a forming space of substantially an angle section therebetween; and the molded body is made into an angle plate by disposing a pair of preformed bodies on opposite slopes of the lower mold, disposing a joining material between opposing end surfaces of the preformed bodies along a corner of the lower mold, and pressing the preformed tile bodies and the joining material between the upper mold and the lower mold into one body.

In accordance with one preferred mode of the invention, there is provided a manufacturing method of a tile having a pattern, comprising: a molding material disposing step for disposing a plurality of molding materials of different colors into an inside space of a pressure forming die while dividing them from each other in a planar direction of the inside space and while having each color of the molding materials extends from one side to an other side of a thickness direction of the inside space; a pressure forming step for pressing and forming integrally the molding materials into a molded body in the inside space; and a burning step for burning the molded body.

Preferably, the molding materials are composed of different colors of colored granules; the molding material disposing step is a colored granule filling step for filling the plural colored granules in a divided manner in the inside space; and the molded body is made by pressing and forming integrally the colored granules in the inside space in the pressure forming step.

More preferably, the method further comprises, before the colored granule filling step, a partition means disposing step for disposing a partition means in the inside space to divide the inside space into a plurality of forming spaces, each color of the colored granules being filled in each of the forming spaces.

Preferably, the partition means is a partition wall molded of a clay body into a predetermined moisture content in a partition wall forming step before the colored granule filling step, and the partition wall is pressed and formed integrally with the colored granules in the pressure forming step to make the molded body.

Preferably, the molding materials are blocks respectively prepared before the molding material disposing step; and the block is made by a raw material kneading step for kneading a raw material mixed powder, a pigment and water to prepare a plurality of colored clay bodies of different colors of a predetermined moisture content, a base material molding step for molding each color of the colored clay bodies into a colored base material of a fixed thickness, and a joining step for joining a plurality of colored base materials of different colors in its thickness direction into one body.

Preferably, the joining step comprises a gathering and piling step for gathering and piling a plurality of base materials of different colors, and a cutting step for cutting the gathered and piled base materials in the gathering and piling direction into a constant width thereby making the block; and the molded body is made by disposing and pressing the blocks in the inside space while a cutting surface of the block being faced vertically.

Preferably, the base material has a bar shape; the joining step is a twisting step for gathering, twisting and joining the base materials of different colors into the block; and the molded body is made by disposing the block in the inside space in the planar direction and pressingly forming the block therein before the pressure forming step.

Preferably, the molding material comprises a preformed body of a plate shape prepared in a preformed body forming step before the molding material disposing step; the pressure forming die comprises an upper mold and a lower mold defining a forming space of substantially an angle section therebetween; in the disposing step, a pair of preformed bodies are disposed on opposite slopes of the lower mold, and a joining material is disposed between opposing end surfaces of the preformed bodies along a corner of the lower mold; and in the pressure forming step, the preformed tile bodies and the joining material are pressed between the upper mold and the lower mold into one body, thereby making the molded body of an angle plate shape.

Further objects and advantages of the invention will be apparent from the following description, reference being had to the accompanying drawings, wherein preferred embodiments of the invention are clearly shown.

BRIEF DESCRIPTION OF THE DRAWINGS

FIG. 7(*b*) is a plan view showing another modification of the first embodiment of a tile having a pattern of the invention.

FIG. 7(*c*) is a plan view showing still another modification of the first embodiment of a tile having a pattern of the invention.

FIG. 7(*d*) is a plan view showing still another modification of the first embodiment of a tile having a pattern of the invention.

FIG. 7(*e*) is a plan view showing still another modification of the first embodiment of a tile having a pattern of the invention.

FIG. 7(*f*) is a plan view showing still another modification of the first embodiment of a tile having a pattern of the invention.

FIG. 17(*b*) is a plan view showing a modification of a third embodiment of a tile having a pattern of the invention.

FIG. 17(*c*) is a plan view showing a modification of a third embodiment of a tile having a pattern of the invention.

FIG. 17(*d*) is a plan view showing a modification of a third embodiment of a tile having a pattern of the invention.

FIG. 17(*e*) is a plan view showing a modification of a third embodiment of a tile having a pattern of the invention.

FIG. 17(*f*) is a plan view showing a modification of a third embodiment of a tile having a pattern of the invention.

FIG. 20(*b*) is a schematic view showing a pressing die of a molded thin plate to be a partition wall of the tile having the pattern of FIG. 17(*c*).

FIG. 20(*c*) is a schematic view showing a pressing die of a molded thin plate to be a partition wall of the tile having the pattern of FIG. 17(*d*).

FIG. 20(*d*) is a schematic view showing a pressing die of a molded thin plate to be an inside partition wall of the tile having the pattern of FIG. 17(*e*).

FIG. 20(*e*) is a schematic view showing a pressing die of a molded thin plate to be an outside partition wall of the tile having the pattern of FIG. 17(*e*).

FIG. 20(*f*) is a schematic view showing a pressing die of a molded thin plate to be a partition wall of the tile having the pattern of FIG. 17(*f*).

FIG. 54(*b*) is a perspective view showing an appearance of a modification of an angle tile having a colored pattern obtained by the twelfth to sixteenth embodiments.

FIG. 54(*c*) is a perspective view showing an appearance of a modification of an angle tile having a colored pattern obtained by the twelfth to sixteenth embodiments.

FIG. 54(*d*) is a perspective view showing an appearance of a modification of an angle tile having a colored pattern obtained by the twelfth to sixteenth embodiments.

FIG. 63(*b*) is an explanatory drawing of a used state of trimming metal fittings of a pressing die of an angle tile pressing machine used in the thirteenth embodiment of the invention.

FIG. 70(*b*) is an explanatory drawing showing a modified mode of an arranging manner of materials in an arranging step of a preformed tile body and a joining bar in each of the twelfth to sixteenth embodiments of the invention.

FIG. 70(*c*) is an explanatory drawing showing a modified mode of an arranging manner of materials in an arranging step of a preformed tile boy and joining granules in each of the twelfth to sixteenth embodiments of the invention.

FIG. 70(*d*) is an explanatory drawing showing a modified mode of an arranging manner of materials in an arranging step of a preformed tile boy and joining granules in each of the twelfth to sixteenth embodiments of the invention.

FIG. 70(*e*) is an explanatory drawing showing a modified mode of an arranging manner of materials in an arranging step of a preformed tile boy and joining granules in each of the twelfth to sixteenth embodiments of the invention.

FIG. 70(*f*) is an explanatory drawing showing a modified mode of an arranging manner of materials in an arranging step of a preformed tile boy and joining granules in each of the twelfth to sixteenth embodiments of the invention.

FIG. 74(*b*) is a perspective view of a short preformed tile body formed in the preformed tile body forming step.

FIG. 82(*b*) is a perspective view showing another modification of slip preventing lugs.

FIG. 82(*c*) is a perspective view showing still another modification of slip preventing lugs.

DETAILED DESCRIPTION OF PREFERRED EMBODIMENTS

Figure 1:
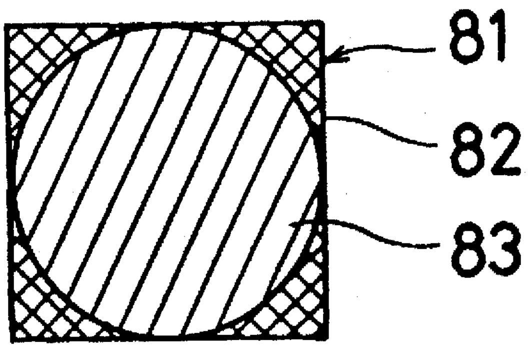
FIG. 1 is a plan view showing one example of a first embodiment of a tile having a pattern of the invention.

Referring now to the drawings, wherein like reference characters designate like or corresponding parts throughout the several views, several preferred modes of the invention will be described hereafter.

First Embodiment

A first embodiment of the invention will be described hereunder referring to FIGS. 1 to 6.

Referring to FIG. 1, a tile having a pattern 81 is a nonglazing tile of a dimension of 100 mm square. The pattern is composed of a light black part 82 provided at an side part and a light red part 83 provided at an inside circular part. The light black part 82 and the light red part 83 are made of the same raw material but mixed with different pigments. They are burnt into one body. A lining layer is formed on a rear part (not shown) of the tile 81.

Figure 2:
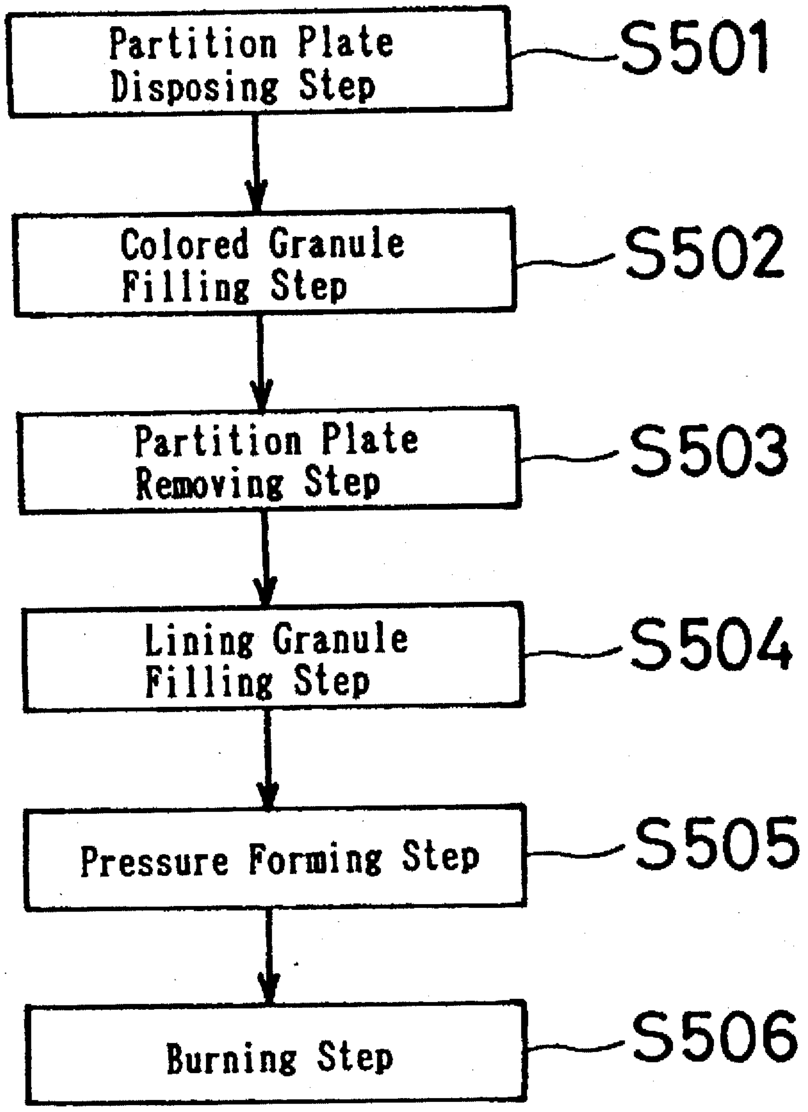
FIG. 2 is a flowchart showing manufacturing steps of the first embodiment of a tile having a pattern of the invention.

The tile 81 was manufactured as follows. FIG. 2 shows manufacturing steps.

Figure 3:
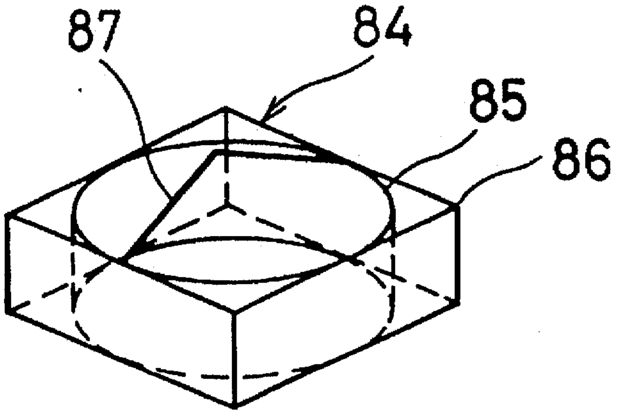
FIG. 3 is a perspective view of a partition plate used in manufacturing the first embodiment of a tile having a pattern of the invention.

First, in a partition plate disposing step S501, a partition plate 84 as a partition means shown in FIG. 3 is fabricated of a thin steel plate of a thickness of approximately 1 mm in such a manner to correspond to the pattern of the tile 81. This partition plate 84 is composed of a center partition 85 and an outer wall 86 formed in one body. The center partition 85 is a ring plate shape with a height of 10 to 12 mm and constitutes a border of multicolors. The outer wall 86 is a rectangular frame shape with the same height of 10 to 12 mm and is contacted with an inside wall of a pressure forming die described later. A handle 87 is attached to an upper end of the partition plate 84. The outer wall 86 is provided for a purpose of holding the center plate 85 at a fixed position, but it may be omitted and only the inside center plate 85 may be disposed in the die according to a formed pattern. The thickness of the partition plate 84 is preferably made thin in order to make the border as distinct as possible. Still, if it is too thin, it would be easily deformed in works of its disposing and taking-out or filling of granules mentioned later. Thus, it is necessary to determine the thickness in consideration thereof. It is possible to chamfer a lower end of the partition plate 84 into a tapered shape.

Figure 4:
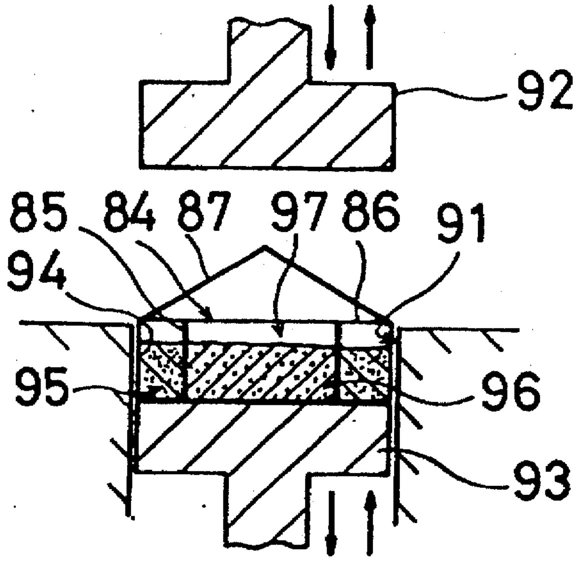
FIG. 4 is a sectional view of a pressure forming die showing a state just after filling a color granule in a color granule filling step in FIG. 2.

After the partition plate 84 was fabricated, it was disposed on a bottom surface of a pressure forming die 91 shown in FIG. 4.

On the other hand, in a colored granule filling step S502, colored granules were prepared for forming a colored part. For the preparation of the colored granules, a tile body consisting of 50% feldspar, 20% china clay and 30% clay was added with 2% black pigment for kneading, 0.5% CMC and water. This tile body was then mixed and ground in a trommel 101 shown in in FIG. 5 thereby to obtain a slip 102. Thereafter, it was pumped up to a spray drier 104 by a pump 103, and dried and granulated by the spray drier 104 to obtain the colored granules. This light black colored granules was stored in a storage/feed tank 105. Similarly, the above tile body was added with 3% of a red pigment for kneading thereby to obtain light red colored granules by a similar operation. The light red colored granules were stored in another storage/feed tank 106. These two kinds of granules had their moisture content regulated in about 7% by controlling drying condition. A raw material supplying means used in the colored granules filling step S502 may directly supply the raw material from a measuring means or supply them evenly over a fixed wide area by a robot or the like.

After such preparation, the light black granules and the light red granules were, filled into the pressure forming die 91 which had the partition plate 84 disposed therein. In this filling work, the light black granules were filled to a height of 7 to 8 mm, by use of a feeder not shown, in an outer forming space 95 that was surrounded by the center partition 85 and the outer wall 86 of the partition plate 84, among a forming space 10 to 12 mm deep defined by a lower mold 93 and a side mold 94, while an upper mold 92 was kept raised in the pressure forming die 91 of FIG. 4. At this time, care was taken of so that the light black granules did not intrude into an inner forming space 96. When they intruded, they were sucked and eliminated.

Next, the light red granules were filled into the inner forming space 96 to a height of 7 to 8 mm in the same manner as the light black granules. Here, the light red granules may reversely be filled prior to filling of the light black granules, or they may be filled at the same time.

After the colored granules were filled, in a partition plate removing step S503, the partition plate 84 were removed by taking the handle 87 which was attached to the upper end of the outer wall 86. Thereby, the light black granules and the light red granules overflowed the border to each other and were mixed in a very small amount. If the colored granules overflow to each other and are mixed, a joining strength is improved between the different colored granules, though the border is made slightly indistinct.

Figure 6:
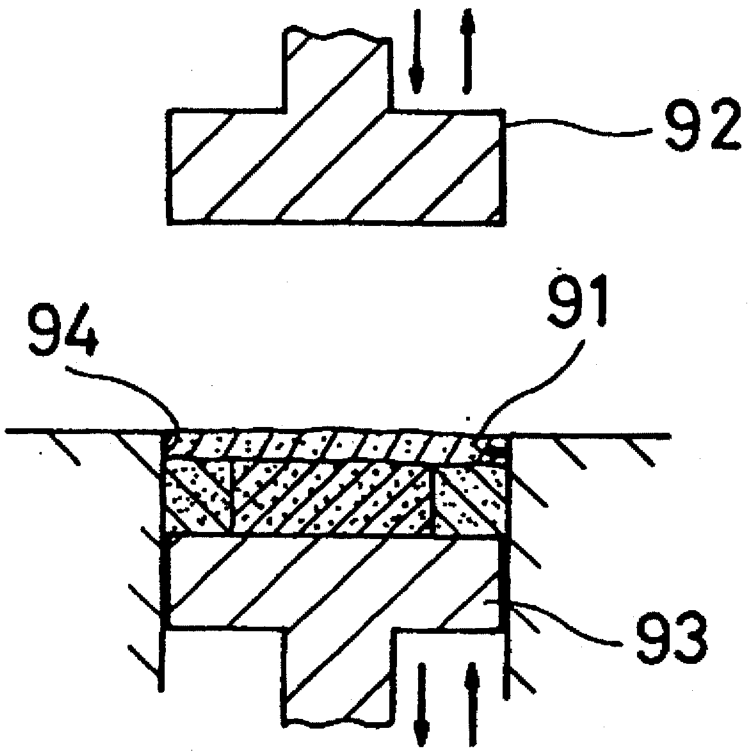
FIG. 6 is a sectional view of the pressure forming die showing a state just after filling a lining granule in a lining granule filling step in FIG. 2.
Figure 7A:
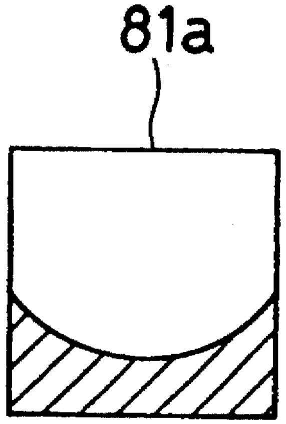
FIG. 7(*a*) is a plan view showing a modification of the first embodiment of a tile having a pattern of the invention.
Figure 7B:
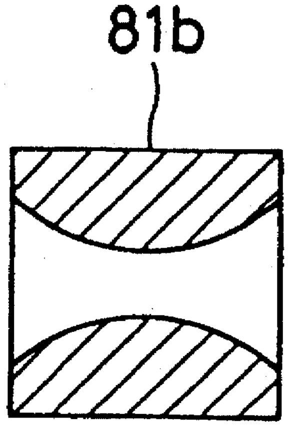
Figure 7C:
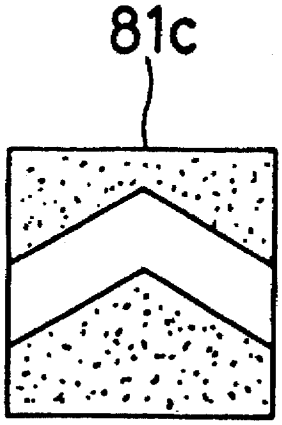
Figure 7D:
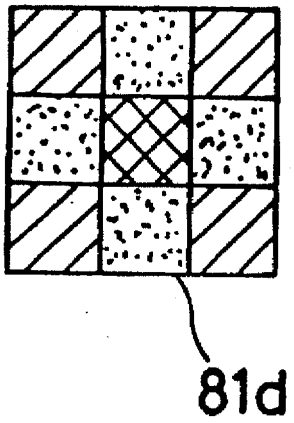
Figure 7E:
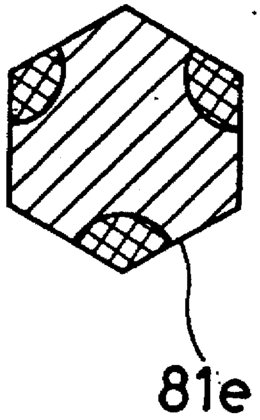
Figure 7F:
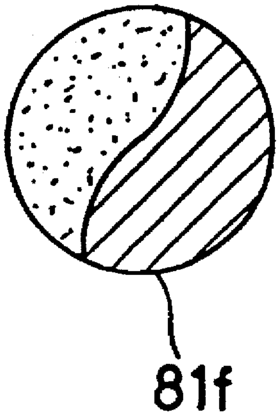

In a lining granule filling step S504, on the other hand, lining granules as uncolored body grains were prepared in the same manner as the colored granules, by use of the same tile body as that of the light black and red granules, without any pigment added. They were stored in a storage/feed tank 107. Then as shown in FIG. 6, the lining granules were filled into a lining granule forming space 97 which was defined over the filled light black and red granules, to the same height as an upper surface of the side mold 94.

Next, in a pressure forming step S505, each kind of the colored granules and the lining granules in the pressure forming die 91 were pressed and molded at a pressure of 100 kg/cm$^2$. At this time, though not shown illustratively, if a pressing surface of a bottom part of the upper mold 92 is given concaves and convexes of a fixed width, it is possible to form concavo-convex ribs or protrusions for heightening an adhering strength at the same time on the rear surface of the tile 81.

Thereafter, in a burning step S506, a block which was molded in the pressure forming step S505 was turned over, and burnt under a condition of a burning temperature of 1250° C. and a burning time of 30 hours. The 6 to 7 mm thick nonglazing tile 81 was obtained, by burning, as shown in FIG. 1 which had a pattern of the light black part 82 and the light red part 83 at the front side while lined by uncolored porcelain at the rear side.

As mentioned above, this embodiment of the tile is obtained by: disposing the partition plate 84 in the pressure forming die 91; then filling the light black granules and the light red granules respectively in the outer forming space 95 and the inner forming space 96 both defined by the partition plate 84; removing the partition plate 84 and then filling the lining granules over the filled colored granules; pressing and molding them into one body; and burning them.

According to this embodiment, since the partition plate 84 is disposed beforehand in the pressure forming die 91 so as to fill the colored granules in the forming spaces 95, 96 and the lining granules are filled and pressed after removal of the partition plate 84, it is possible to easily form a multicolored pattern and improve a joining property between the light black granules and the light red granules, thereby preventing the border part from being peeled off and cracked, though the border line is made slightly indistinct if a very small amount of the colored granules overflow the border at the time of pressing.

Moreover, the pattern is never faded or vanished, thus exhibiting the same pattern as the initial one, even if the tile surface is abraded with long time of use.

Furthermore, the lining granules are joined to both the colored granules so as to also enlarge the joining strength between them. The lining granules are filled in each forming space so as to flat a filled surface of the colored granules that is apt to become irregular, thereby making it easy to standardize the tile thickness.

In addition, since both the colored granules and the lining granules are filled, pressed and thereafter burnt, it is possible to improve an overall strength and a surface hardness, thereby preventing abrasion of the tile surface.

Moreover, both the colored granules dried are good in fluidity in filling, and easy to handle or suitable for mass production.

While the above embodiment uses the uncolored lining granules in addition to the two colored granules, one of the colored granules may be used for the liner. That is, after one of the two colored granules are filled in one of the forming spaces 95, 96, the other colored granules are filled wholly up to the lining granule forming space 97. This make material control easy. Moreover, the lining granules may be obtained by granulating sewage disposal waste soil, waste tile material or the like. In this case, it is possible to manufacture the tile at low costs, which will serve for waste disposal and contribute to recycle of resources.

The above embodiment of the manufacturing method of the tile having the pattern is composed of: the partition plate disposing step S501 for disposing the partition plate 84 in the pressure forming die 91; the colored granule filling step S502 for filling the light black granules and the light red granules respectively in the outer forming space 95 and the inner forming space 96 both defined by the partition plate 84 after disposing the partition plate 84; the partition plate removing step S503 for removing the partition plate 84 out of the pressure forming die 91 after filling the colored granules; the lining granule filling step S504 for filling the lining granules over both the filled colored granules; the pressure forming step S505 for pressing and forming the colored granules and the lining granules in the pressure forming die 91 into one body after filling both the colored granules and the lining granules in the pressure forming die 91; and the burning step S506 for burning the block molded in the pressure forming die 91.

According to the above method, since the colored granules are filled in the forming spaces 95, 96 after disposing the partition plate 84 in the pressure forming die 91 and then the lining granules are filled therein, the pattern of the tile can be made with an easy operation, and different colors of granules can be filled simultaneously.

Here, the colored granules used in manufacturing the present embodiment of the tile are preferably obtained by: using the same materials as ordinary tiles like feldspar, china clay, kaolin, clay, etc.; adding coloring pigments, organic caking agent, water thereto; mixing and grinding them into slip by a trommel or the like; and pelletizing them into a fixed moisture content by a spray drier or the like. The particle diameter is preferably 20–50 meshes. Moreover, the colored granules may be used in a powdered state without pelletizing process. Still, the pelletized granules of a fixed moisture content are good in workability and suitable for mass production. This is because advantageously they have no irregular color and are unsticky and spread entirely over the pressure forming die 91.

The coloring pigment may be such pigments for kneading as chromium oxide, iron oxide and Mn-Al pink, in addition to such natural pigments as chromite and loess. Preferably, an adding amount thereof is generally two to three percent.

Moreover, it is best for the lining granules to use the same granulated grains as the colored granules in view of a joining strength and a shrinkage percentage, since one object of the invention is to reinforce the joined part of the colored granules of the tile surface corresponding to the partition plate 84 and prevent its crazing. However, since the lining granules do not appear on the tile in a normal use, other material may be utilized as long as the joining strength and the shrinkage percentage can be regulated. For example, it is possible to use a material that is obtained by mixing refuses, such as crashed fine powders of tile waste and dried waste soil powder of sewage disposal, as a main material with silica or the like, and adjusting a melting point and a shrinkage percentage. This makes recycle of resources possible.

It is preferable to use a cellulose ether such as MC (methyl cellulose), CMC (carboxymethyl cellulose sodium), ethyl cellulose and benzyl cellulose, or a synthetic resin.

The firing or burning after pressure molding may be performed correspondingly to a manufacturing condition of general nonglazing tiles. Here, it is possible to give luster to the fired tile by properly polishing its surface.

While, in the above embodiment, the lining granules are filled together with the colored granules, it is possible to eliminate the filling of the lining granules. In case of eliminating the filling of the lining granules, material control is made easy, and manufacturing steps are simplified.

While, in the above embodiment, the lining granules are filled over the colored granules after filling of the colored ones, the order of filling work may be changed. Namely, the colored granules may be filled over the lining granules after filling the lining granules. In this case, the partition plate 84 is to be disposed on the lining granules which were filled beforehand in the pressure forming die 91. Accordingly, it is unnecessary to closely contact the lower end of the partition plate 84 with the surface of the pressure forming die 91 in a uniform manner, so that the partition plate 84 may be fabricated without special care for accuracy at the lower end.

While the above embodiment of the tile 81 has the pattern that a circle is formed in a square frame, desired patterns may be given to various shapes of tiles, such as a rectangular tile 81*a* shown in FIG. 7(*a*), a rectangular tile 81*b* shown in FIG. 7(*b*), a rectangular tile 81*c* shown in FIG. 7(*c*), a rectangular tile 81*d* shown in FIG. 7(*d*), a hexagonal tile shown in FIG. 7(*e*), and a circular tile 81*f* shown in FIG. 7(*f*). For example, in the tile 81*c* of FIG. 7(*c*), a pattern is defined by a white part and a spotted part that is made of a body with blue granules dispersed. The tile 81*d* of FIG. 7(*d*) has a pattern defined by three colors.

The partition plate may make its pattern forming lower end or all the part thinner or thicker than the above embodiment. Thinner one prevents breakage of the pattern in removing the partition plate. Thicker one makes an outline of the pattern indistinct thereby exhibiting a unique appearance. Moreover, it is possible to use part of a pressure forming die as a substitute for an outer wall of a partition plate, which forms an outer part of a tile, so as to eliminate the outer wall and simplify its construction.

Second Embodiment

A second embodiment will De described hereunder referring to FIGS. 8 to 16.

Figure 8:
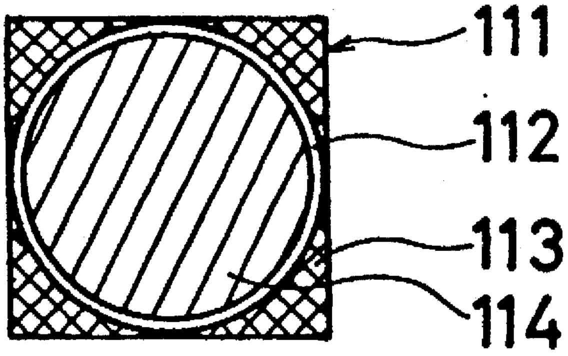
FIG. 8 is a plan view showing an example of a second embodiment of a tile having a pattern of the invention.

Referring to FIG. 8, a tile having a pattern 111 is a nonglazing tile of a dimension of 200 mm square. The pattern is formed by an outer light black part 113 and an inner light red part 114 with a white ring part 112 of a constant width of 6 mm bordering them. All of these white ring part 112, light black part 113 and light red part 114 are made of the same raw material and burnt into one body. However, they have respectively different pigments mixed therein and show different colors. A lining layer is formed on a rear side thereof (not shown).

Figure 9:
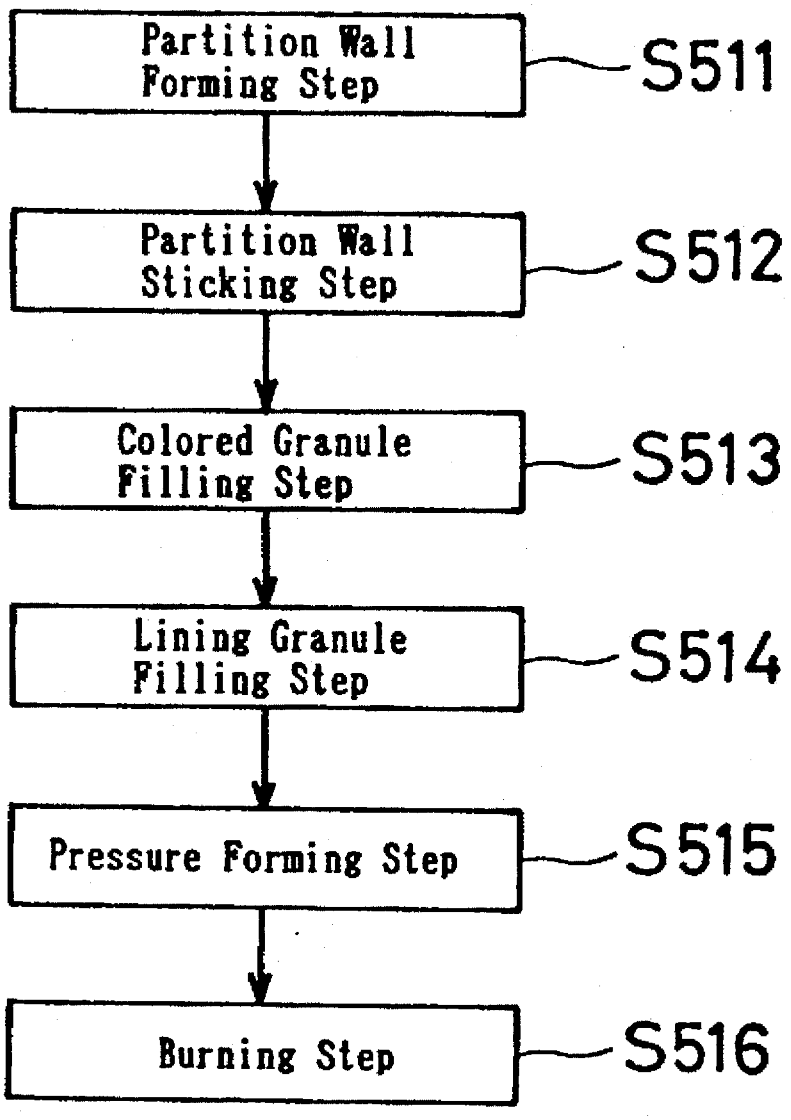
FIG. 9 is a flowchart showing manufacturing steps of the second embodiment of a tile having a pattern of the invention.
Figure 10:
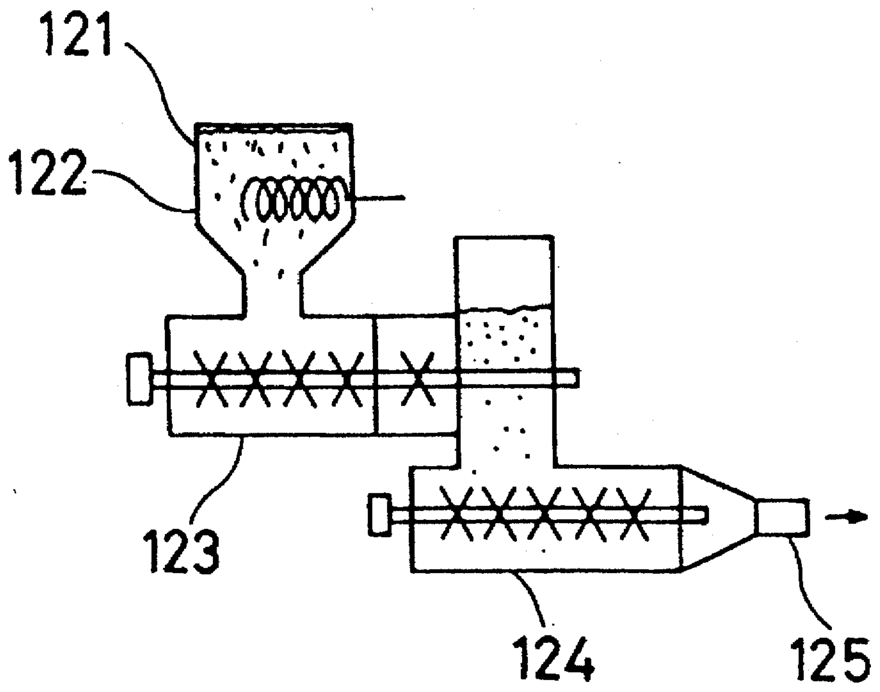
FIG. 10 is a schematic drawing of a continuous molding machine used in a partition wall forming step of FIG. 9.
Figure 11:
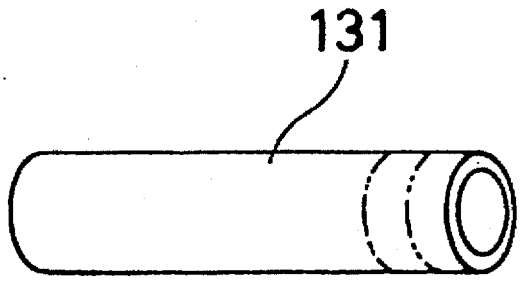
FIG. 11 is a perspective view showing an extruded product molded by the continuous molding machine of FIG. 10.
Figure 12:
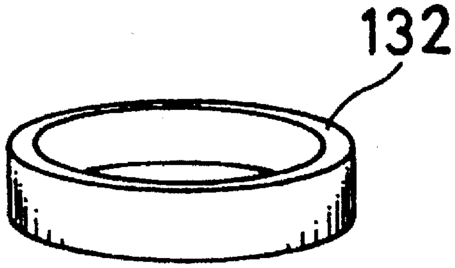
FIG. 12 is a perspective view of a partition wall obtained by cutting the extruded product of FIG. 10.

Manufacturing steps of the tile 111 is described hereafter referring to FIG. 9.

First, in a partition wall forming step S511, a tile body consisting of 50% feldspar, 20% china clay and 30% clay was added with 10% zirconium silicate, namely superfine powders of zircon as a white pigment, 1% CMC and 25% water. Then, they were put into and mixed in a mixer 122 of a continuous molding machine 121 which was composed of the mixer 122, a kneader 123 and an extruder 124, and sufficiently kneaded by the kneader 123 thereby preparing a clay body for a partition wall 132. Thereafter, a cylindrical molded body 131 shown in FIG. 11 was obtained through a mouthpiece 125 by use of the extruder 124. Next, this cylindrical molded body 131 was cut into a 15 mm length, and dried a predetermined time at a temperature not more than 200° C. by a drier. Thus, most of moisture of the cylindrical molded body 131 was evaporated thereby to obtain the ring partition wall 132 shown in FIG. 12 which has 7% moisture content and an outer diameter of 200 mm and a thickness of 6 mm.

Figure 13:
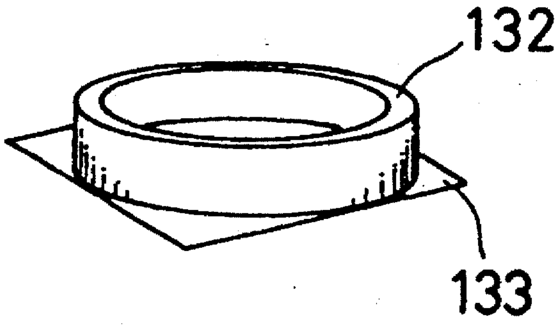
FIG. 13 is a perspective view showing a partition wall sticking sheet material obtained in a partition wall sticking step of FIG. 9.

Next, in a partition wall sticking step S512, an organic adhesive known in the art was coated on one cut surface of the partition wall 132 as a partition means obtained in the step S511. Such a partition wall 132 was put on and stuck to a predetermined position of a sheet material 133 of Japanese paper which is the same dimension as an inside dimension of a bottom surface of a pressure forming die 91, which was similar to that of the first embodiment. Then, the sheet material 133 with the partition wall 132 stuck thereto, as shown in FIG. 13, was laid on the bottom surface of the pressure forming die. Here, an inner dimension of the pressure forming die 91 was 210 mm square.

On the other hand, in a colored granule filling step S513, colored granules for forming a colored part were prepared, separately from the partition wall 132. The preparation of the colored granules was carried out in the same manner as the first embodiment, by use of the device shown in FIG. 5.

Figure 14:
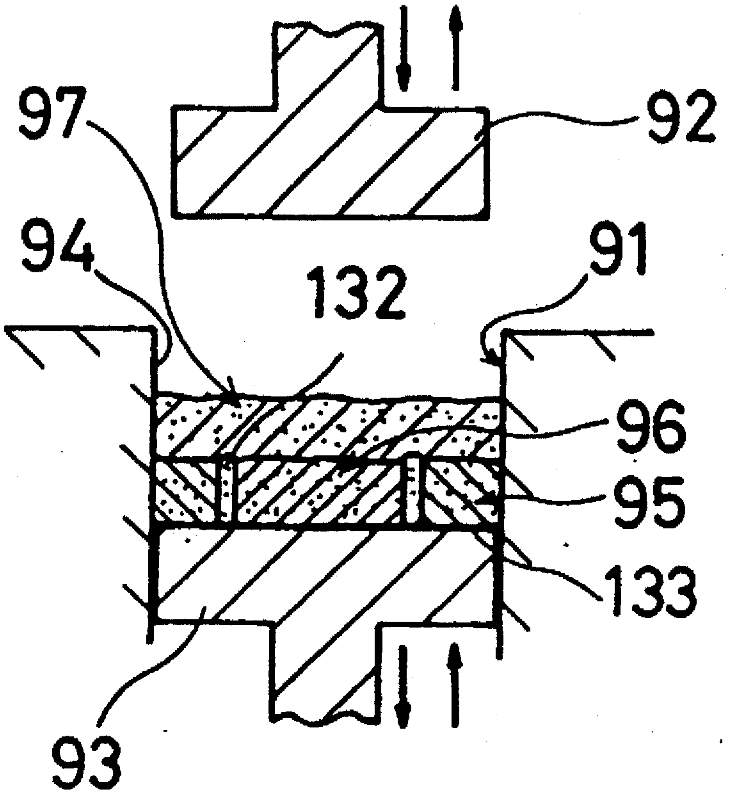
FIG. 14 is a sectional view of a pressure forming die used in a colored granule filling step and a lining granule filling step of FIG. 9.

After such preparation, light black granules and light red granules were filled in the pressure forming die 91 that accommodated the sheet material 133 with the partition wall 132 stuck thereto. In this filling work, the upper mold 92 of the pressure forming die 91 was kept raised as shown in FIG. 14. Then, the light black granules were filled, by use of a feeder (not shown), into the outer forming space 95 which was surrounded by the pressure forming die 91, the ring partition wall 132 and the underlying sheet material 133, among the forming spaces defined by the lower mold 93 and the side mold 94, up to such a height as an upper end of the partition wall 132 was not hidden. At this time, a care was paid for so that the light black granules did not overflow into the inner forming space 96 formed by the partition wall 132 and the sheet material 133. Any ones which were erroneously overflowed thereinto were sucked and eliminated.

Figure 15:
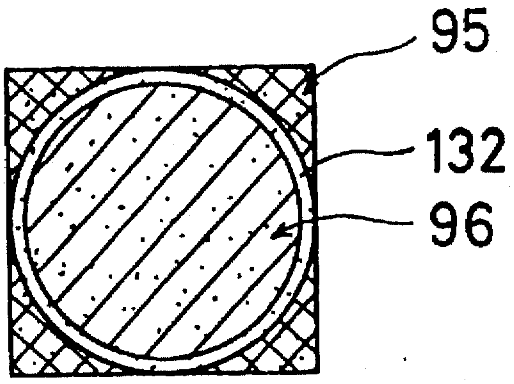
FIG. 15 is a plan view showing a filled state of colored granules of FIG. 14.
Figure 16:
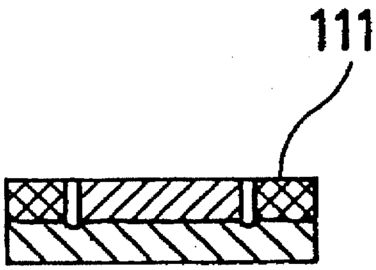
FIG. 16 is a sectional view showing a nonglazing tile burnt in a burning step of FIG. 9.

Next, the light red granules were filled into the inner forming space 96 up to such a height as the upper end of the partition wall 132 was not hidden, as in the light black granules. A state after filling is shown in FIG. 15. Regarding the filling works of the light black and red granules, contrary to the above, the red ones may be filled first as in the first embodiment, or both of them may be filled at the same time.

Figure 5:
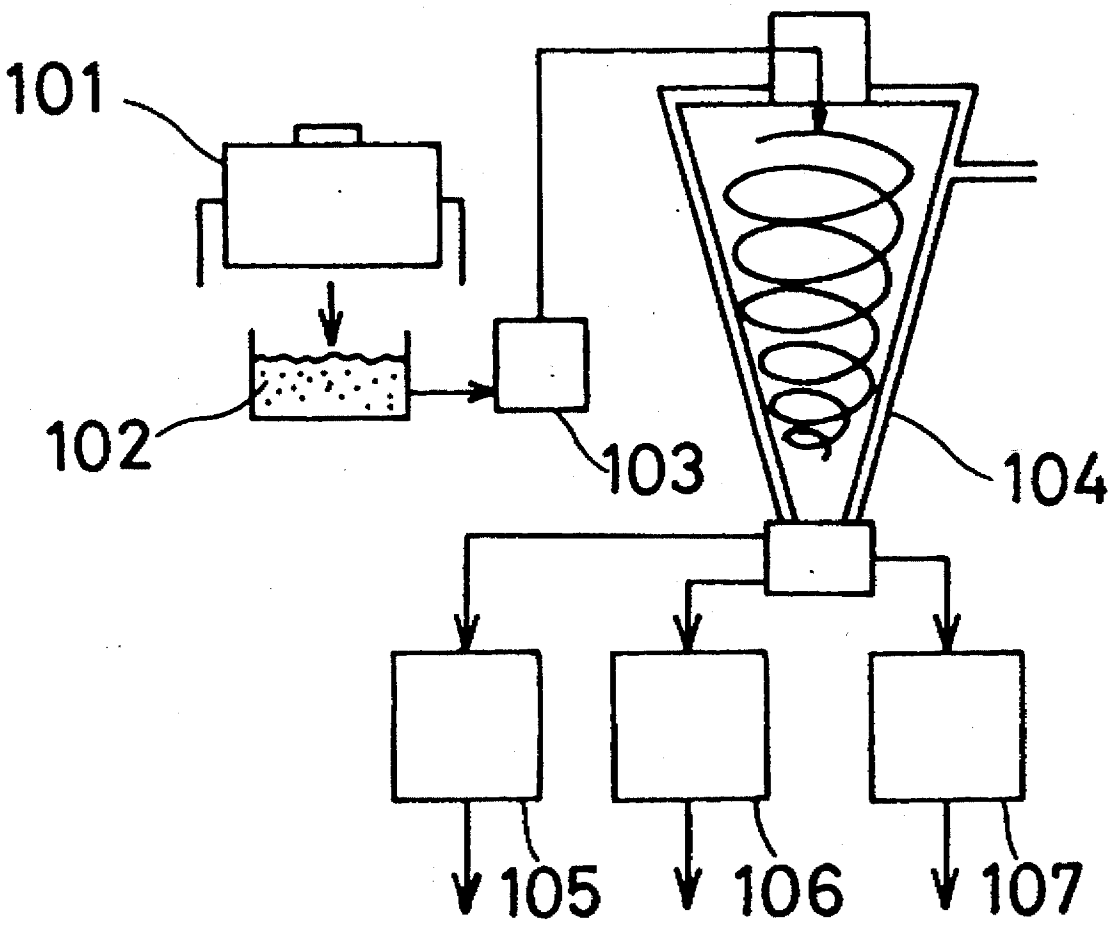
FIG. 5 is a schematic view of a device for making a color granule used in the color granule filling step of FIG. 2.

After the light black and red granules were filled in the forming spaces 95, 96 of the pressure forming die 91, in a lining granule filling step S514, lining granules as uncolored body grains were prepared in the same manner as the first embodiment, and stored in the storage/feed tank 107 for the lining granules shown in FIG. 5. Then, these lining granules were filled into the lining granule forming space 97 from over the already filled light black and red granules up to a height twice that of the partition wall 132, namely a height of 25 to 30 mm.

Next, in a pressure forming step S515, each color of granules and the lining granules in the pressure forming die 91 were pressed and formed at a pressure of 100 kg/cm$^2$.

Thereafter, in a burning step S516, a block formed in the pressure forming step S515 was turned over, and burnt under a condition of a burning temperature of 1250° C. and a burning time of 30 hours. A nonglazing tile 111 of a section shown in FIG. 16 was obtained by burning. As to an appearance, the tile 111 has its front side design surface formed with a pattern which is composed of an inner light black part 113, an outer light red part 114 and a white ring part 112 bordering them, and its rear side lined by the uncolored porcelain, as shown in FIG. 8.

Here, the sheet material 133 of Japanese paper is burnt out by high temperature heat in the above burning. A plastic sheet or the like may be used as the sheet material 133. However, a common European paper needs some attention since residue is left after burning.

As mentioned above, the second embodiment of the tile is obtained by: forming the partition wall 132 of a fixed moisture content from a clay body and disposing it in the pressure molding die 91; then filling the light black granules and the light red granules in the outer forming space 95 and the inner forming space 96 both defined by the partition wall 132; thereafter filling the lining granules over the filled colored granules to press and mold into one body; and burning them.

According to this embodiment, since the partition wall 132 is disposed beforehand in the pressure forming die 91 so as to define the forming spaces 95, 96 for the colored granules, the partition wall 132 functions as a shielding wall in the pressing step. Thus, it is prevented that the colored granules overflow the border, thereby making the pattern distinct. Moreover, since the lining granules are filled over the colored granules and pressed integrally therewith, the border part between the partition wall 132 and the colored granules is given a sufficient joining strength. As a result, the border part of the pattern can be restrained from cracking or the like. Moreover, since the colored granules and the lining granules are filled, pressed and molded, and fired thereafter, an overall strength and a surface hardness are improved. Thereby, the tile is prevented from abrasion at the surface as well as dirt or stain at the border part.

In addition, since multicolored patterns can be provided on one piece of tile, many kinds of patternings can be realized, though conventional technique is only capable of forming such a simple pattern as a diced pattern in spite of a trend of these days in which a size of one tile piece has been becoming larger such as 200 mm square or 300 mm square.

Here, the lining granules may be the same color as that of one of the colored granules as in the first embodiment. The lining granules may be obtained by granulating sewage disposal waste soil, waste tile material or the like.

The above second embodiment of the manufacturing method of the tile having the pattern is composed of: the partition wall forming step S511 for forming the partition wall 132 of a predetermined moisture content from a clay body; the partition wall sticking step S512 for sticking the formed partition wall 132 to the sheet material 133 of the same dimension as that of the bottom surface in the pressure forming die 91 while being standed; the colored granule filling step S513 for disposing the sheet material 133, to which the partition wall 132 has been stuck, in the pressure forming die 91 and filling the light black granules and the light red granules respectively in the outer forming space 95 and the inner forming space 96 both defined by the partition wall 132; the lining granule filling step S514 for filling the lining granules over the partition wall 132 and the upper surface of both the filled colored granules; the pressure forming step S515 for pressing and forming the partition wall 132, the colored granules and the lining granules in the pressure forming die 91 into one body; and the burning step S516 for burning the pressed and formed block and burning out the sheet material 133 by the heat.

According to the above method, since the colored granules and the lining granules are filled in the forming spaces 95, 96, 97 after disposing the partition wall 132 in the pressure forming die 91, a desired distinct pattern can be given to the tile with an easy operation, and different colors of granules can be filled simultaneously. Since each color of the granules that has been dried into a fixed moisture content has a good fluidity at the time of filling, so that they are easy to handle and suitable for mass production.

Furthermore, since the sheet material 133 that is as large as the bottom surface of the pressure forming die 91 is disposed in the pressure forming die 91, while having the molded partition wall 132 stuck in a standed state thereto, the colored granules are blocked by the sheet material 132 from going over the border part in the die 91 at the time of pressing. Thus, the border part of the pattern can be more distinct. Inasmuch as the sheet material 133 for sticking the partition wall 132 is made of Japanese paper as a combusting material, it is burnt out at the time of burning after pressing, so that it never affects an appearance of tile surface nor material property of the tile after burning.

Third Embodiment

Next, a third embodiment of the invention will be described referring to FIGS. 17(*a*) to 22.

Figures 17A, 17B, 17C:
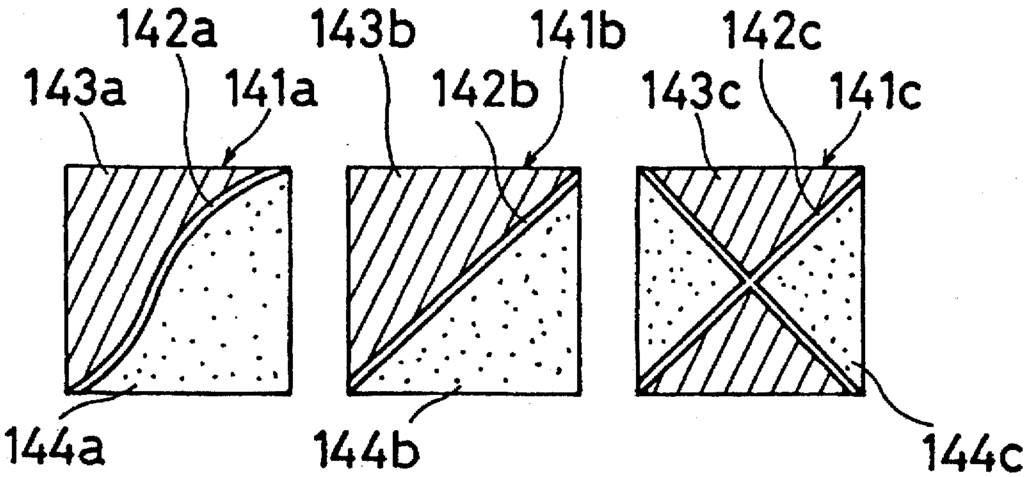
FIG. 17(*a*) is a plan view showing an example of a third embodiment of a tile having a pattern of the invention.
Figures 17D, 17E, 17F:
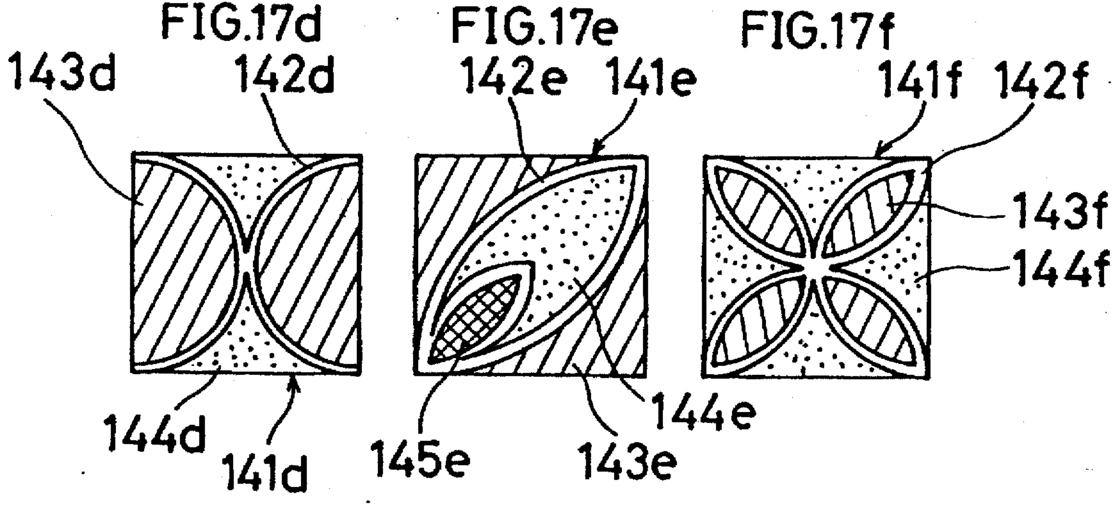

The third embodiment shows tiles of relatively small dimension such as 100 mm square or 150 mm square while having patterns illustrated in FIG. 17(*a*) to FIG. 17(*f*).

FIG. 17(*a*) to FIG. 17(*f*) show six kinds of tiles 141*a*, 141*b*, 141*c*, 141*d*, 141*e*, 141*f* respectively having different patterns. The tiles 141*a*–141*f* are nonglazing tiles of approximately 100 mm square or an outer dimension smaller than that of the tile 111 in the second embodiment. The tiles 141*a*, 141*b*, 141*c*, 141*d*, 141*f* have patterns that dark brown parts 143*a*, 143*b*, 143*c*, 143*d*, 143*f* and green parts 144*a*, 144*b*, 144*c*, 144*d*, 144*f* are disposed at opposite sides of white border part 142*a*, 142*b*, 142*c*, 142*d*, 142*f*. The tile 141*e* has a pattern that a dark brown part 143*e*, a green part 144*e* or a yellow part 145*e* are disposed at opposite sides of a white border part 142*e*. The white border part 142*a*–142*f* is approximately 3 mm wide which is narrower than the white ring part 112 approximately 7 mm wide in the second embodiment, since the tile 141*a*–141*f* has a smaller outer dimension.

Hereunder, manufacturing steps of the third embodiment of a tile will be described referring to the tile 141*e* of FIG. 17(*e*) as an example.

Regarding the third embodiment of the tile 141*a*–141*f*, the white border part 142*a*–142*f* that has a small width of about 3 mm is preferably formed by use of a pressing die, in order to make its handling in the following steps easier.

The third embodiment is the same as the second embodiment in other operations such as preparation of colored granules and lining granules, their filling into a pressure forming die, pressing and forming, and burning.

Figure 18:
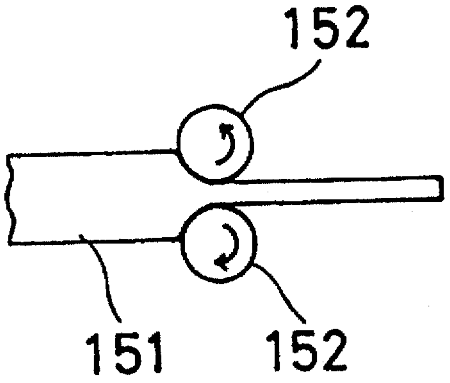
FIG. 18 is a schematic drawing showing diagramatically a molding of a molded thin plate in manufacturing the third embodiment of a tile having a pattern of the invention.
Figure 19:
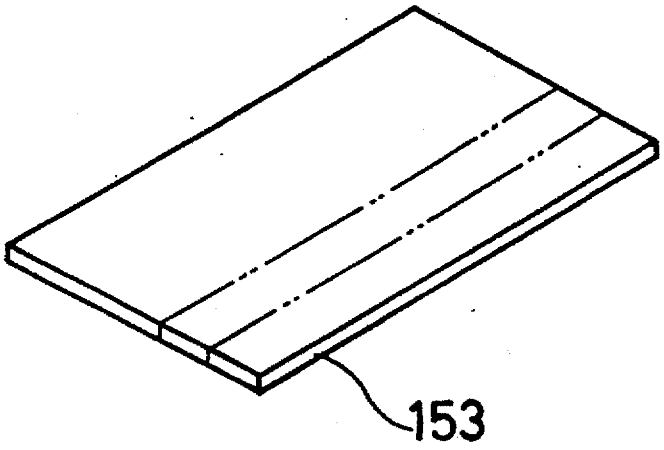
FIG. 19 is a perspective view showing the molded thin plate of FIG. 18.
Figure 20A:
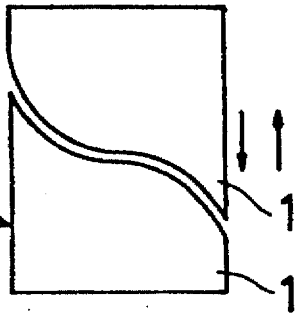
FIG. 20(*a*) is a schematic view showing a pressing die of a molded thin plate to be a partition wall of the tile having the pattern of FIG. 17(*a*).
Figure 20B:
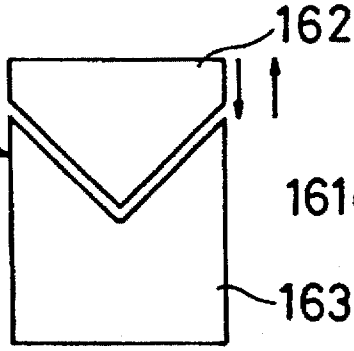
Figure 20C:
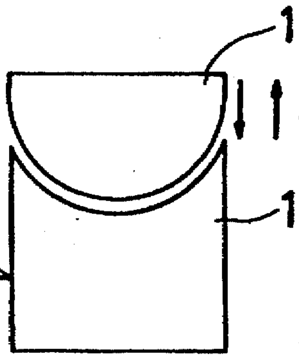
Figure 20D:
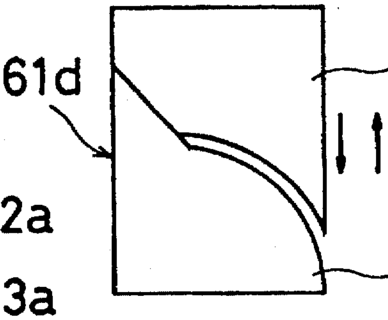
Figure 20E:
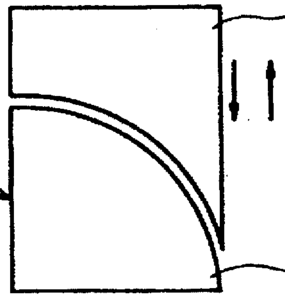
Figure 20F:
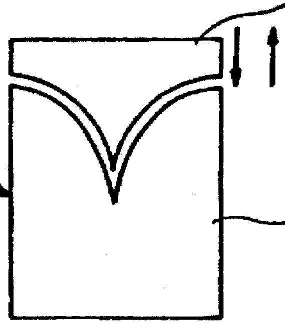

First, a tile body consisting of 50% feldspar, 20% china clay and 30% clay was added with 5% titanium oxide, 1% CMC and 25% water. Then, they were mixed and kneaded into a clay body 151, and the clay body 151 was molded by a double stage mill 152 shown in FIG. 18 thereby to obtain a molded thin plate 153 250 mm wide, 3 mm thick and 1000 mm long as shown in FIG. 19.

Thereafter, a little amount of titanium white was sprinkled over a surface of the molded thin plate 153 that had been laid on a base. Then, such molded thin plate 153 was cut, along longitudinally extending cutting lines shown by two-dotted chain lines in FIG. 19, into 7 mm wide strips. These strips were gently wound.

A white molded strip cut into 7 mm width had its one end positioned at one end of a lower mold 163*d*, 163*e* while an upper mold 162*d*, 162*e* was kept raised. A pressing die 161*d*, 161*e* was used for fabricating the tile 141*e* of 100 mm square as shown in FIG. 20(*d*) and FIG. 20(*e*). Then, the upper mold 162*d*, 162*e* was lowered to press the strip. Thereafter, the white molded strip had its other end cut off, if such end was out of the pressing die 161*d*, 161*e*. The tile 141*e* of FIG. 17(*e*) is manufactured by use of two smaller white strips and two larger white strips, which are pressingly molded by the pressing die 161*d* of FIG. 20(*d*) and the pressing die 161*e* of FIG. 20(*e*), respectively.

The tile 141*a* of FIG. 17(*a*) can be fabricated by use of a white molded strip formed by a pressing die 161*a* of FIG. 20(*a*). The tile 141*c* of FIG. 17(*c*) can be fabricated by use of two white molded strips formed by a pressing die 161*b* of FIG. 20(*b*). The tile 141*d* of FIG. 17(*d*) can be fabricated by use of two white molded strips formed by a pressing die 161*c* of FIG. 20(*c*). The tile 141*f* of FIG. 17(*f*) can be fabricated by use of four white molded strips formed by a pressing die 161*f* of FIG. 20(*f*).

The white strips molded by the pressing die 161*d* of FIG. 20(*d*) and the pressing die 161*e* of FIG. 20(*e*) were dried at a temperature of not more than 200° C. into 7% moisture content. Two small strips and two large strips were used and mutually joined by coating an organic adhesive on a joint surface, thereby forming one partition wall 171 shown in FIG. 21.

Next, an organic adhesive was coated on a bottom surface of the partition wall 171, and the partition wall 171 was stuck to such a sheet material as a Japanese paper or a plastic sheet, and disposed in a pressure forming die.

On the other hand, in addition to the above operation, three tile bodies each consisting of 50% feldspar, 20% china clay and 30% clay were added respectively and separately with kneading pigments of dark brown, green and yellow. CMC and water were further added to each tile body. Then, each of them was mixed, crashed and made into a slip by the same operations as each color of granules in the second embodiment, and dried and pelletized by the spray drier 104. Thereby, brown colored granules, green colored granules and yellow colored granules were prepared.

Figure 21:
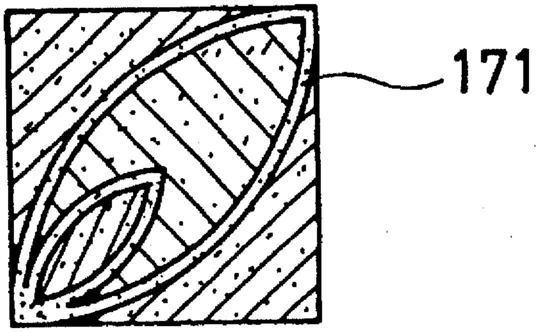
FIG. 21 is a plan view showing a filled state of colored granules in manufacturing the tile having the pattern of FIG. 17(*e*) among the third embodiment of tiles of the invention.

Thereafter, the three colors of the granules prepared beforehand as above were filled one by one into forming spaces defined by the pressure forming die, the partition wall 171 and the sheet material, from the inside to the outside. Then, uncolored lining granules were filled over these three colored granules. FIG. 21 shows their filling state in the pressure forming die. In FIG. 21, the innermost is yellow granules, the center is green granules, and the outermost is dark brown granules.

Figure 22:
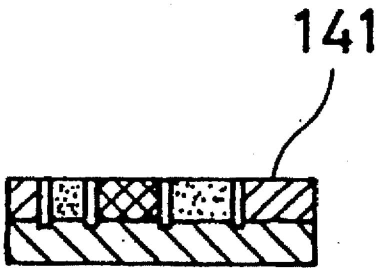
FIG. 22 is a sectional view showing a tile having a pattern after burning in manufacturing the tile having the pattern of FIG. 17(*e*) among the third embodiment of tiles of the invention.

After this, they were pressed and formed into a block by the same operation as the second embodiment. Such a pressed block was fired to obtain the tile 141*e* approximately 10 mm thick shown in FIG. 17(*e*) and FIG. 22.

That is, the third embodiment is different from the second embodiment in the forming process of the partition wall.

Here, in the second and third embodiments, a partition wall may be obtained by: using the same raw material as that of common tiles such as feldspar, china clay, kaolin, clay or the like; adding thereto a pigment, an organic caking agent and water to prepare a kneaded clay body; forming the clay body by means of extrusion, roller molding or the like; cutting it into a constant width; and drying it into a predetermined moisture content. The moisture content is preferably a value substantially the same as that of the colored granules, and more preferably 6 to 8% from experience. It is possible to use similar materials to those of the first embodiment, as colored granules, lining granules, pigments, and organic caking agents. The burning work may be done according to a manufacturing condition of general nonglazing tiles, as in the first embodiment.

While, in the second and third embodiment, the partition wall is disposed in the pressure forming die after being stuck to the sheet material like a Japanese paper or a plastic sheet, and then the colored granules are filled into the pressure forming die, other modifications are possible. For instance, the partition wall may be disposed directly in the pressure forming die without use of the sheet material. However, it may be caused in this case that the colored granules flow into between the partition wall and the bottom surface of the die thereby to make the pattern of the border part slightly indistinct, at the time of filling the colored granules in the die. Therefore, it is preferable to use the sheet material in case there is a problem in a finished article due to a grain diameter and fluidity of filled colored granules, a degree of flatness of the bottom surface of the partition wall or the like.

While the above embodiments of the partition walls are made into a constant width of 3 mm or 7 mm, other shapes may be adopted. For example, it may have a width change such as an expanded part provided at some position. In this case, it is possible to give a different feeling to the pattern compared with that of each of the above embodiments.

Moreover, in the above embodiments, each of the partition walls may make its surface roughness of a side wall coarse or into a concavo-convex surface or formed with an undercut. In this case, it is possible to make the joining strength larger between the partition wall and the colored granules, thereby restraining more effectively cracks or crazes from being caused at the joined surface.

In addition, the above second and third embodiments of the partition walls may be the same color as one of the colored granules thereby to obtain a pattern with a border line having no width.

Fourth Embodiment

A fourth embodiment of the invention will be described hereunder, referring to FIGS. 23 to 28. A tile having a stripe pattern is illustrated as an example.

Figure 23:
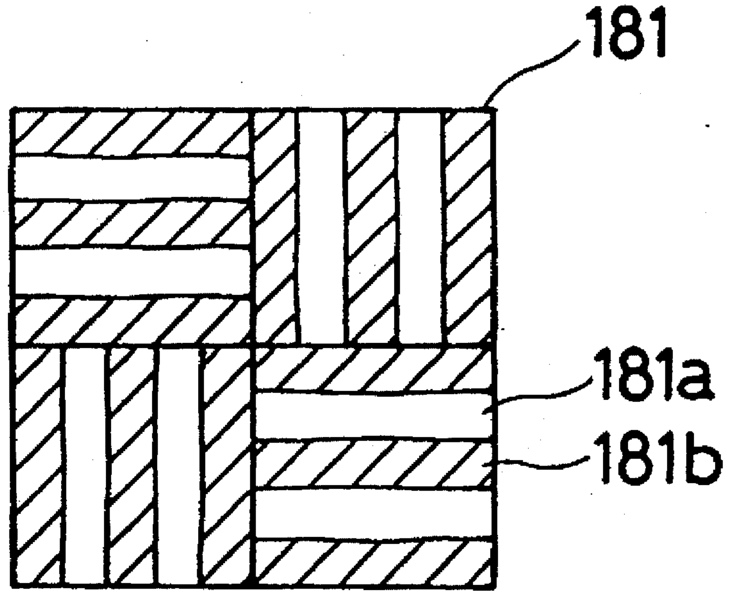
FIG. 23 is a plan view showing a fourth embodiment of a tile having a pattern of the invention.

Referring to FIG. 23, a tile 181 has a stripe pattern. The pattern may be formed by whitish parts 181*a* and blackish parts 181*b*, for example. The whitish part 181*a* and the blackish part 181*b* respectively go through the tile 181 in a thickness direction with a constant sectional area, so that, if the tile 181 is sliced at any plane parallel to a front surface, the same pattern as the front surface appears at all times.

Figure 24:
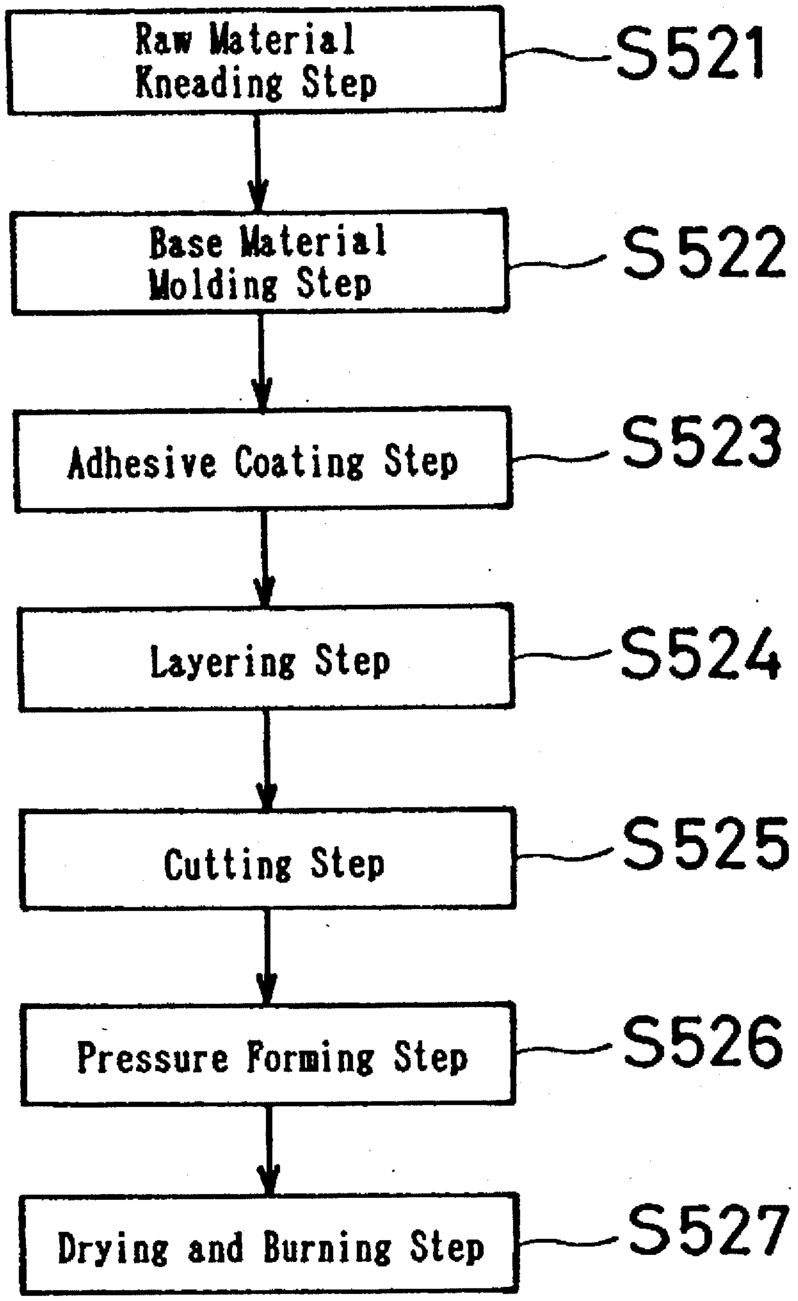
FIG. 24 is a flowchart showing manufacturing steps of the fourth embodiment of a tile having a pattern of the invention.

Next, manufacturing steps of this tile will be described referring to FIG. 24.

In manufacturing the tile 181, first, in a raw material kneading step S521, two kinds of raw material mixed powders were prepared: raw material mixed powders obtained by blending 50% feldspar, 20% china clay, 10% kaolin and 20% clay; and colored raw material mixed powder obtained by adding 2% chromite pigment powders to a body of the same composition as the above raw material mixed powder. Each of the raw material mixed powders was added with 20% water and kneaded sufficiently by a kneader. Thereby, two kinds of clay bodies 182 were prepared. Here, the first raw material mixed powders as a body having the above composition are made into a whitish color after burning, while the colored raw material mixed powders further added with the chromite pigment powders are made into a blackish color.

Figure 25:
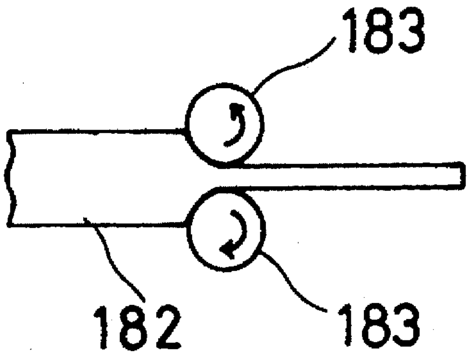
FIG. 25 is a schematic drawing showing a forming state in a base material forming step of FIG. 24.
Figure 26:
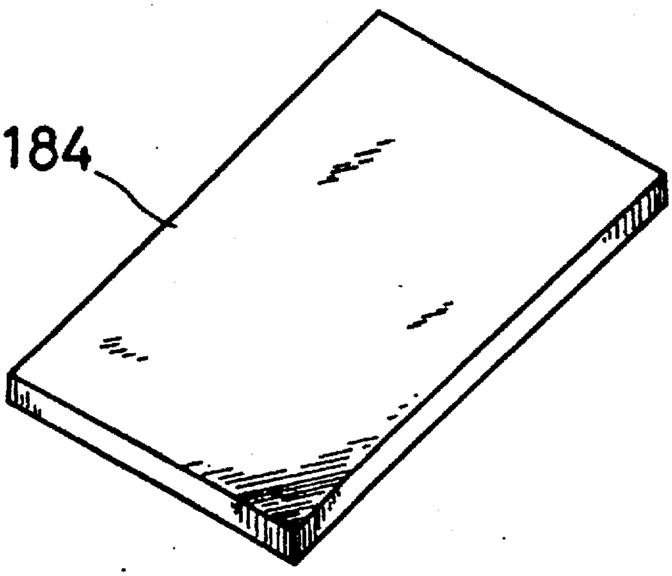
FIG. 26 is a perspective view showing a molded base material in the base material forming step of FIG. 24.

Next, in a base material molding step S522, each of the clay bodies 182 kneaded in the step S521 was molded into a plate 184 200 mm wide, 500 mm long and 8 mm thick, as shown in FIG. 26, by use of a double stage mill 183 shown in FIG. 25.

Then, in an adhesive coating step S523, an adhesive was coated on a joint surface of the plate 184 by a known method like spraying, brushing, etc. Thereafter, in a layering step S524, whitish plates 184*a* and blackish plate 184*b* were piled up one after another, such as black, white, black, white and black, into five layers and slightly pushed on each other as a whole to form a layered body 185. The layered body 185 is about 40 mm high.

Figure 27:
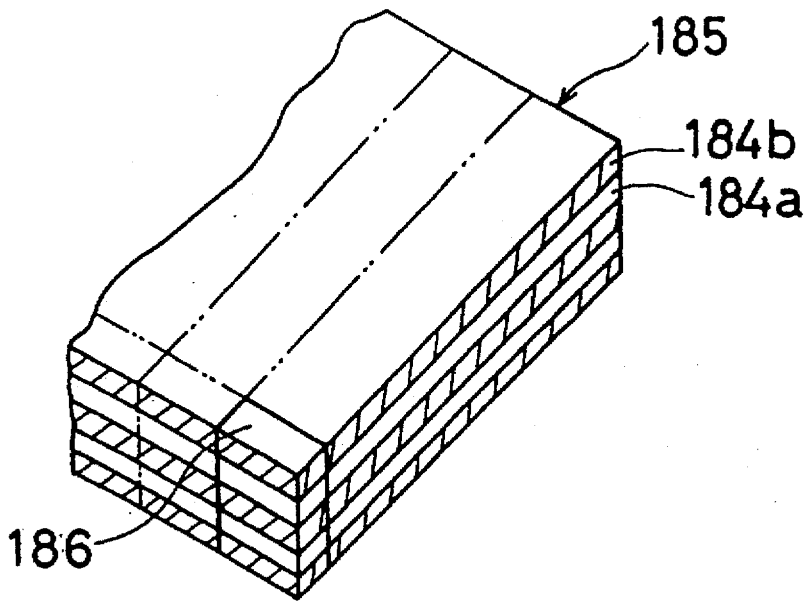
FIG. 27 is a perspective view showing a layered body in a layering step of FIG. 24.

After the above preload, in a cutting step S525, the layered body 185 composed of five layers of the plates 184 had its surface provided with cut lines by a piano wire at 40 mm intervals and was cut off vertically. Each 40 mm wide layered body was further cut in its length direction at 15 mm intervals, thereby obtaining blocks 186. The dimension of this block 186 is about 40 mm×40 mm×15 mm. The two-dot chain lines in FIG. 27 show the cut lines on the surface of the layered body 185 and a cutting line for a unit of block 186.

Figure 28:
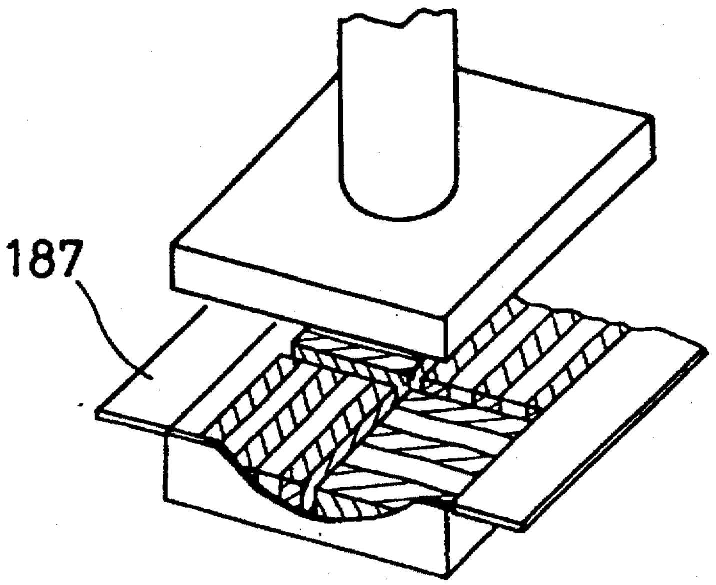
FIG. 28 is a perspective view showing a pressing state in a press forming step of FIG. 24.

Next, in a pressure forming step S526, as shown in FIG. 28, four cut blocks 186 were placed with its opposite surfaces in the thickness direction disposed at the upside and the downside in a pressure forming dish 187, which was 85 mm square and constituted a pressure forming die, so that stripes made by the five layered square pattern were crossed each other. Then, the pressure forming dish 187 was loaded into a pressing machine and the blocks 186 were pressed at a pressure of 50 kg/cm$^2$ thereby to obtain a pressed block.

Thereafter, in a drying and burning step S527, the pressed block composed of the four blocks 186 with their stripes crossed was dried at a temperature of 200° C., and then burned 30 hours at a temperature of 1200° C. Thus, the nonglazing tile 181 of 75 mm square was obtained which had a pattern composed of five layers of black and white stripes. The pressed block of 85 mm square contracted into 75 mm square.

While, in this embodiment, the dimension of the block 186 is 40 mm square, it may be set into a desired dimension such as 20 mm square or 80 mm square. In this case, it is necessary to appropriately choose the number of layers or a thickness of the plate 184 or the like according to a dimension of a finished tile. For example, the thickness of the block 186 obtained by cutting vertically the layered body 185 needs to be approximately twice as large as that of the finished tile. A tile of 75 mm square needs to be about 15 mm thick. A tile of 150 mm square needs to be about 20 mm thick. A tile of 300 mm square needs to be about 30 mm thick. The thickness of the plate 184 obtained by the clay body can be set in a desired value according to a specification of a used rolling mill.

As mentioned above, the above embodiment of the tile is obtained by: molding the whitish plates 184*a* and the blackish plates 184*b* as different colors of molded base materials out of the colored clay body 182 of a predetermined moisture content; layering the plates 184*a*, 184*b* while coating an adhesive on their joint surfaces; cutting the layered body at fixed intervals in their layering direction to form the blocks 186; disposing and pressing the blocks 186 with the cutting surface faced upside or downside in the pressure forming dish 187; and drying and burning the pressed block.

According to the above embodiment, a distinct border line is formed in the pattern by the joint surface of the whitish plates 184*a* and the blackish parts 184*b* which go through the tile in the thickness direction. Thus, there is no problem that the tile has its surface layer abraded and its pattern faded or vanished.

Since any glaze is not used on the surface of the tile, the tile surface is rough and hard to slip if it gets wet in a bathroom, a pavement or the like, thereby assuring safety.

Here, though the pattern at the section of the block 186 is pressingly spread a little in pressing work, inasmuch as all the blocks are made of the same body material and fabricated out of the clay bodies 182 of the same density, or inasmuch as an adhesive is coated on the joint surface, there are caused no cracks or the like nor any clearance The manufacturing method of the present embodiment comprises: the raw material kneading step S521 for kneading, on the one hand, the raw material mixed powders and water, and on the other hand, the raw material mixed powders and pigment and water, thereby to prepare the uncolored clay body 182 and the colored clay body 182; the base material molding step S522 for molding the uncolored clay body 182 and the colored clay body 182 respectively into the whitish plates **184*a* and the blackish plates 184*b* as the base material; the adhesive coating step S523 for coating an adhesive on the joint surface of the whitish plates 184*a* and the blackish plates 184*b*; the layering step S524 as a gathering and piling step for layering the whitish plates 184*a* and the blackish plates 184*b* on which the adhesive has been coated; the cutting step S525 for cutting the layered body 185 at fixed intervals in the layering direction to form the blocks 186; the pressure forming step S526 for disposing and pressing the blocks 186 in the pressure forming dish 187 while its cutting surface is faced upside; and the drying and burning step S527 for drying and burning the pressed blocks 186**.

Accordingly, it is possible to manufacture the tile with ease by the simple steps from the raw material kneading step S521 to the drying and burning step S527.

Fifth Embodiment

Next, a fifth embodiment of the invention will be described referring to FIGS. 29 to 33. A tile having a spiral pattern is shown as an example.

Figure 29:
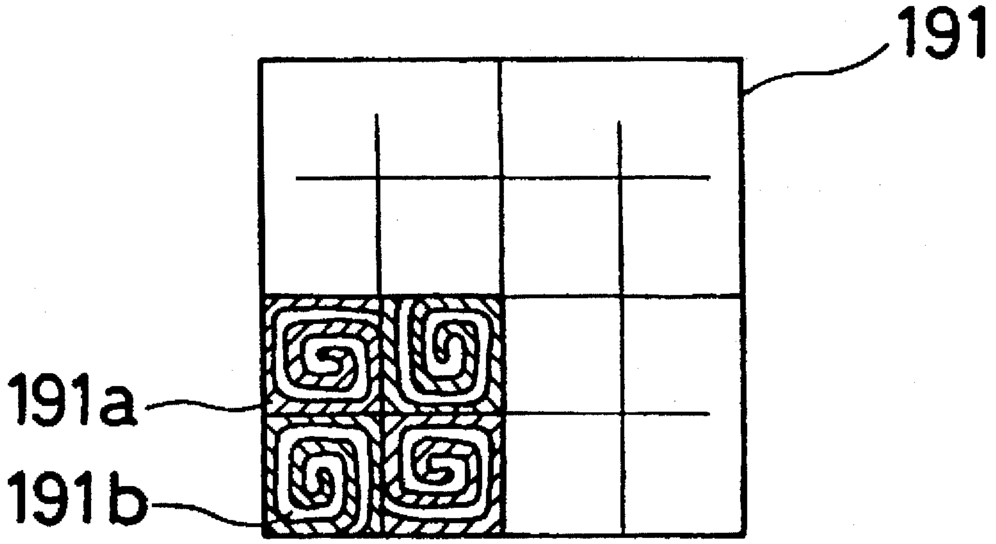
FIG. 29 is a plan view showing a fifth embodiment of a tile having a pattern of the invention.

Referring to FIG. 29, a tile 191 has a spiral pattern. For instance, the pattern is composed of a dark brownish part **191*a* and a yellow part 191*b*. The dark brownish part 191*a* and the yellow part 191*b* go through the tile 191** in its thickness direction, respectively, as in the fourth embodiment. Thus, if the tile is sliced at any plane parallel to its front surface, the same spiral pattern as that of the front surface appears at all times.

Figure 30:
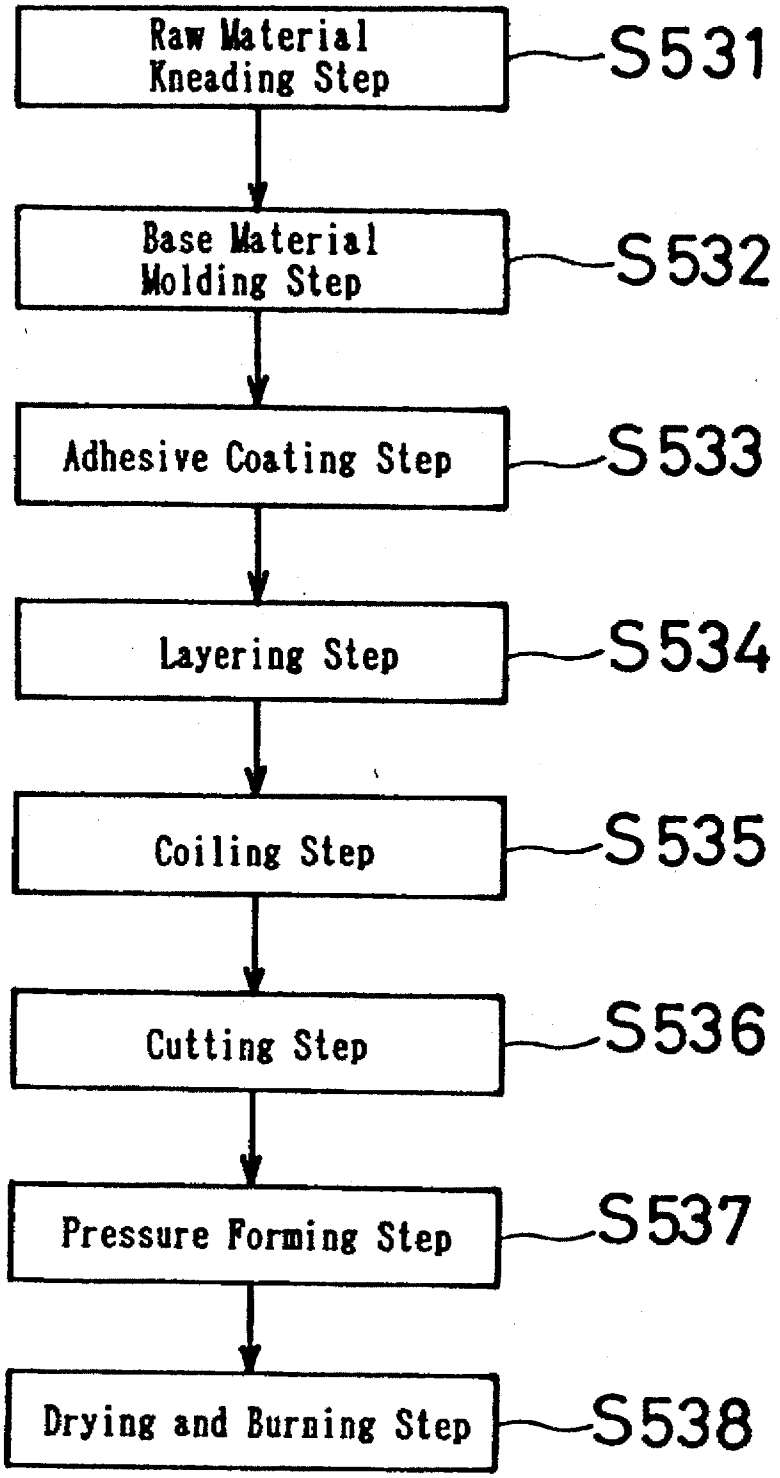
FIG. 30 is a flowchart showing manufacturing steps of the fifth embodiment of a tile having a pattern of the invention.
Figure 31:
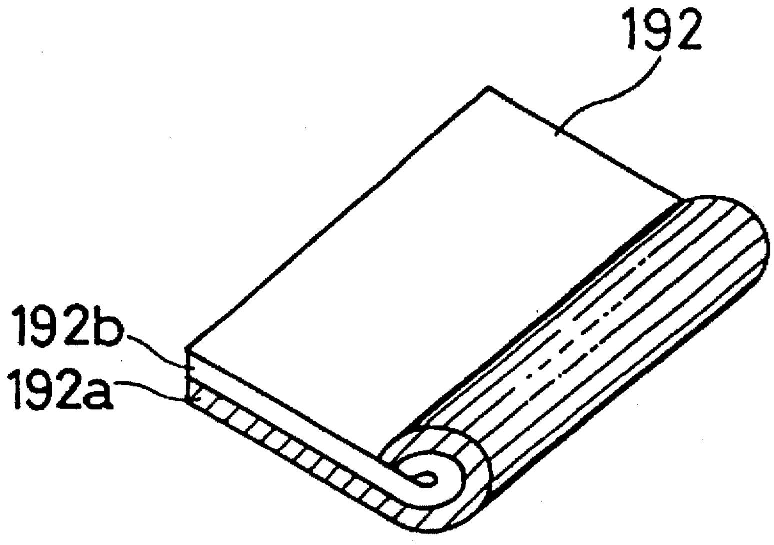
FIG. 31 is a perspective view showing a rolling state in a rolling step of FIG. 30.

Next, manufacturing steps of the tile 191 will be described referring to FIG. 30. The fifth embodiment is principally different from the fourth embodiment in that it has a coiling step S535 after a layering step S534.

In manufacturing the tile 191, first, in a raw material kneading step S531, two kinds of colored raw material mixed powders were prepared by adding, on one hand, 2% iron oxide, and on the other hand, 2% loess, respectively to the same raw material mixed powders as those of the fourth embodiment which consist of 50% feldspar, 20% china clay, 10% kaolin and 20% clay. Each kind of colored raw material mixed powders were added with water and kneaded, thereby obtaining two kinds of clay bodies which were respectively controlled to a moisture content of 25%. The raw material mixed powders added with the iron oxide become dark brownish color and the raw material mixed powders added with the loess become yellowish color.

Next, In a base material molding step S532, each clay body was molded by the double stage rolling mill 183 thereby obtaining a dark brownish plate **192*a* and a yellowish plate 192*b*** each of which is a rectangular shape 200 mm wide, 500 mm long and 3 mm thick.

Then, in an adhesive coating step S533, an adhesive was coated on joint surfaces of each of the two plates **192*a* and 192*b*. Thereafter, in a layering step S534, the dark brownish plate 192*a* was placed below and the yellowish plate 192*b* was piled up thereon. They were gently pushed to each other as a whole so as not to generate any clearance between the layers, thereby to obtain a layered body 192 shown in FIG. 31. Then, in the coiling step S535, the layered body 192** of two layers was coiled into a roll by a winding machine, while making one lateral end an axis for winding, thereby obtaining a cylindrical bar of 40 mm diameter and 500 mm length.

Figure 32:
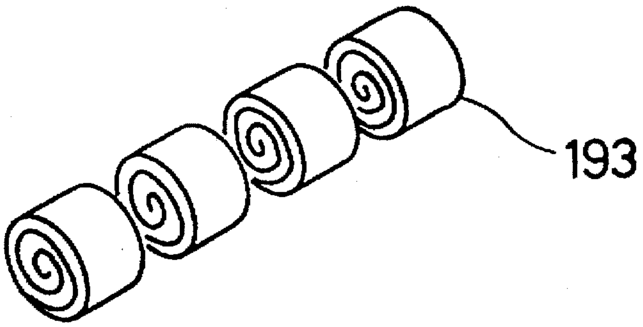
FIG. 32 is a perspective view showing a block cut in a cutting step of FIG. 30.
Figure 33:
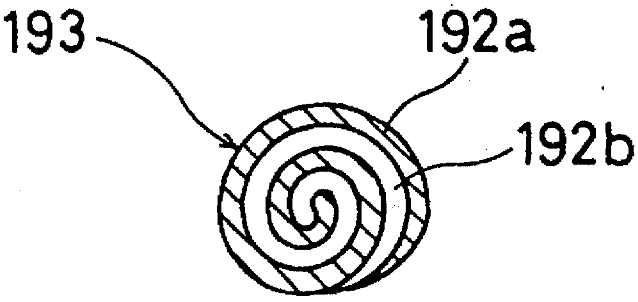
FIG. 33 is a front view showing a cutting plane of the block of FIG. 32.

Next, in a cutting step S536, this cylindrical bar was cut into round slices one after another at 20 mm intervals, thereby forming cylindrical blocks 193 shown in FIG. 32. Thus obtained block 193 has a spiral pattern on its section as shown in FIG. 33.

After this, as in the fourth embodiment, in a pressure forming step S537, a total of sixteen cylindrical cut blocks 193 were placed, four blocks 193 in each of four rows in a pressure forming dish, while each block 193 having its opposite surfaces in the thickness direction disposed at the upside and the downside therein. This pressure forming dish as a pressure forming die is a dimension of 175 mm square. Then, they were pressingly molded at a pressure of 75 $kg/cm^2$. Thereafter, in a drying and burning step S538, a pressed block composed of the sixteen blocks 193 was dried at a temperature of 150° C. to 200° C., and then burned 30 hours at a temperature of 1200° C. Thus, the nonglazing tile 191 of 170 mm square was obtained which had a two colored spiral pattern as shown in FIG. 29. The pressed block of 170 mm square contracted into 150 mm square in a finished state.

As mentioned above, the fifth embodiment of the tile is made by: molding two kinds of colored clay bodies of a predetermined moisture content into the dark brownish plate **192*a* and the yellowish plate 192*b*; layering the plates 192*a* and 192*b* while coating an adhesive on the joint surfaces thereof; coiling them into a bar and cutting the bar in the layering direction at fixed intervals, thereby obtaining the blocks 193; disposing and pressingly molding the blocks 193** with their cutting surface faced above in the pressure forming dish; and drying and burning the pressed block.

The manufacturing method of this embodiment of the tile comprises: the raw material kneading step S531 for kneading the raw material mixed powders, pigments and water into the colored clay bodies of a predetermined moisture content; the base material molding step S532 for molding the colored clay bodies into the dark brownish plate **192*a* and the yellowish plate 192*b* as plate base materials; the adhesive coating step S533 for coating the adhesive on the joint surfaces of these plates 192*a*, 192*b*; the layering step S534 as the collecting and piling step for layering the plates 192*a*, 192*b* with the adhesive coated thereon, thereby forming the layered body 192; the coiling step S535 as a deforming step for coiling the layered body 192; the cutting step S536 for cutting the coiled body at fixed intervals to form the blocks 193; the pressure forming step S537 for disposing and pressingly molding the blocks 193 with their cutting surface faced above in the pressure forming dish; and the drying and burning step S538** for drying and burning the pressed block.

Accordingly, the fifth embodiment is expected to have similar advantages to those of the fourth embodiment. In particular, in the fifth embodiment, since the plates **192*a*, 192*b* are piled up in two layers in the step S534 and coiled in the coiling step S535**, a variety of patterns like spiral patterns can be obtained.

Sixth Embodiment

Next, in sixth to eighth embodiments, a tile having a pattern obtained by combining bars like cylindrical bars or square bars will be described.

First, in the sixth embodiment, a tile having a pattern using two colors of cylindrical bars will be described referring to FIGS. 34 to 36.

Figure 34:
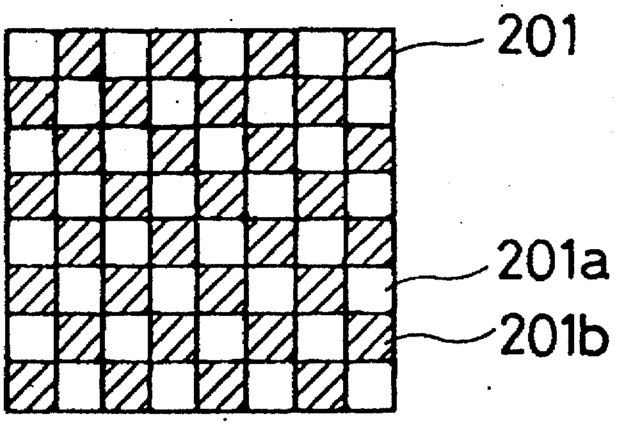
FIG. 34 is a plan view showing a sixth embodiment of a tile having a pattern of the invention.

In FIG. 34, a tile 201 has a diced pattern. The pattern is formed by whitish parts 201*a* and blackish parts 201*b*, for example.

In manufacturing the tile having such pattern, to start with, two kinds of clay bodies of a moisture content of 20% which were colored respectively into white and black were prepared in the same manner as the fourth embodiment.

Figure 35:
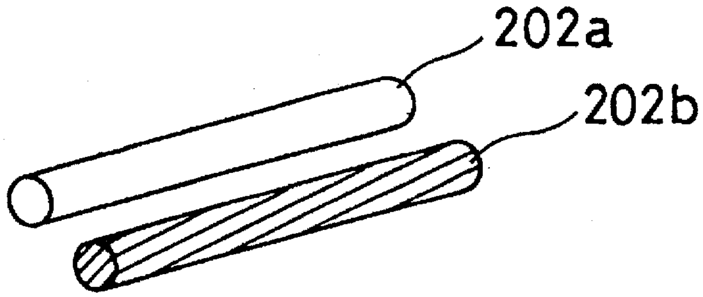
FIG. 35 is a perspective view showing round bars during manufacturing of the sixth embodiment of a tile having a pattern of the invention.

Next, they were molded from an extruder using a round nozzle, thereby obtaining many whitish bars 202*a* and blackish bars 202*b* each of which is 9 mm diameter and 500 mm long, as shown in FIG. 35. After an adhesive was coated on joint surfaces of these bars 202*a*, 202*b*, as shown in FIG. 36, the two kinds of bars 202*a*, 202*b* were gathered and piled substantially in a square bar shape of four rows and four decks in a holder 205 while making their end surfaces flush. The holder 205 is composed of a channel shaped stainless frame 203, which has front and rear openings of 40 mm×50 mm, both side walls of 50 mm×600 mm and a bottom surface of 40 mm×600 mm, and a sliding plate 204 38 mm wide, 550 mm long and 5 mm thick, which is assembled on the bottom surface of the frame 203 so as to be movable back and forth. This step constitutes a gathering and piling step.

Then, the gathered bars 202*a*, 202*b* were fed forward together with the sliding plate 204. Then, a bundle of cylindrical bars 202*a*, 202*b* was sliced into a block bodies 5 mm thick. Four block bodies were placed with their cutting surface faced above in a pressure forming die and pressingly formed thereby. In this pressing, the block had its pattern, which was originally composed of multiple circles, changed into a diced one that clearances between the bars 202*a*, 202*b* were filled, as shown in FIG. 34, since the bars 202*a*, 202*b* were adjusted in a moderate moisture content and easily deformed so as to be expanded in every direction and shaped into squares.

In this embodiment, the diameter of each bar 202*a*, 202*b* is 9 mm, since four cylindrical bars 202*a*, 202*b* are arranged for each row or each line. However, the diameter of each bar may be changed according to the number which will be disposed in the holder 205 and, especially, the width thereof. For example, in case five cylindrical bars 202*a*, 202*b* are arranged in order in 40 mm wide holder 205, the diameter of each bar is 7.5 mm.

Seventh Embodiment

Figure 37:
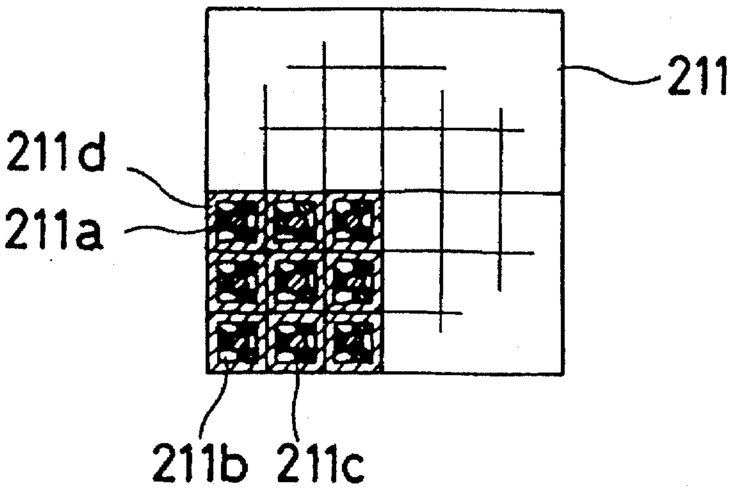
FIG. 37 is a plan view showing a seventh embodiment of a tile having a pattern of the invention.
Figure 38:
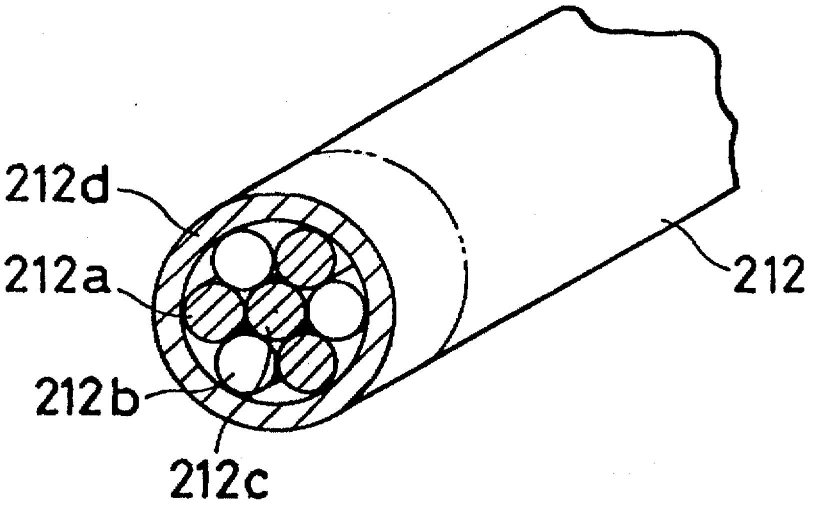
FIG. 38 is a a perspective view showing a state of gathered small bars during manufacturing of the seventh embodiment of a tile having a pattern of the invention.

In the seventh embodiment, a tile having a mottled pattern is described referring to FIGS. 37 and 38. The pattern is obtained by deforming three colors of cylindrical bars.

In FIG. 37, a tile 211 has a mottled pattern. For instance, the pattern is composed of brownish parts 211*a*, whitish part 211*b*, inner blackish parts 211*c* and outer blackish parts 211*d*.

In manufacturing the tile of the above pattern, first, brown, white and black clay bodies of a moisture content of 20% were prepared in the same manner as the fourth embodiment.

Next, these clay bodies were respectively extruded from a round nozzle of a conventional extruder to prepare many brownish bars 212*a*, whitish bars 212*b* and blackish bars 212*c* each of which was 3 mm diameter and 500 mm long. Then, an adhesive was coated on joint surfaces of these bars, and three brownish bars 212*a* and three whitish bars 212*b* were disposed one by one in a circle so as to surround a blackish bar 212*c* as a center. Thereafter, they were enclosed by a blackish ring tube 212*d*, which was made by rolling a blackish plate 30 mm wide, 500 mm long and 2 mm thick, thereby preparing a unit gathered body 212 of 13 mm diameter shown in FIG. 38. This step constitutes a gathering and piling step.

Figure 36:
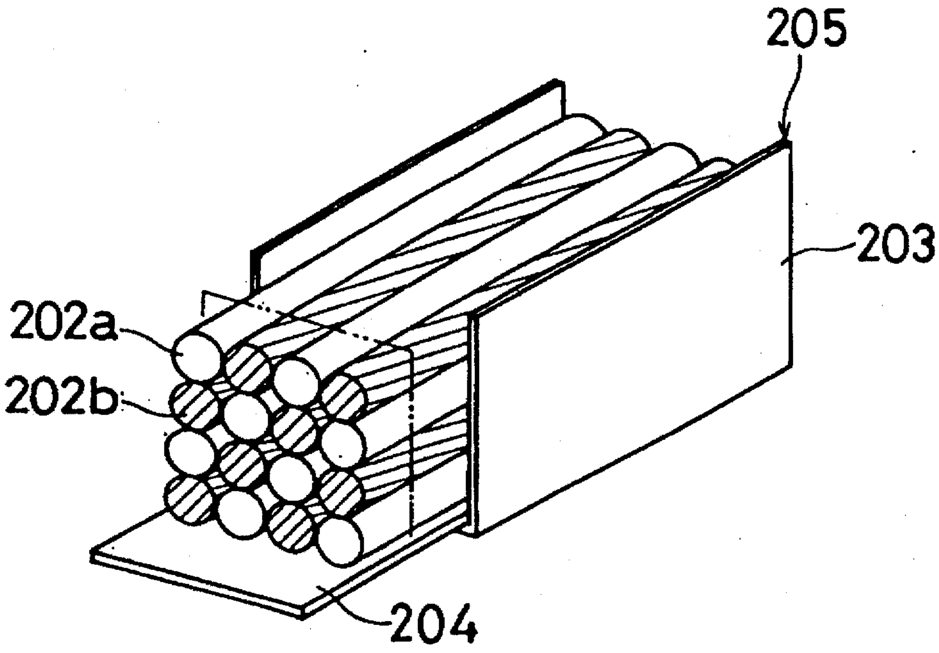
FIG. 36 is a perspective view showing a state of gathered round hats during manufacturing of the sixth embodiment of a tile having a pattern of the invention.

Next, the unit gathered bodies 212 of a round bar shape were further gathered and piled in three rows and three lines by use of a holder 205 similar to that of the sixth embodiment shown in FIG. 36, thereby forming a gathered and piled body. Then, it was sliced into 15 mm thick blocks in the same manner as the sixth embodiment. They were disposed in order in a pressure forming dish, pressingly formed, dried and burned. Thus obtained tile has a pattern that small square mottles are circularly lined on a black background.

Eighth Embodiment

In the eighth embodiment, a tile having a lozenge pattern using two colors of triangle bars will be described, referring to FIGS. 39 and 40.

Figure 39:
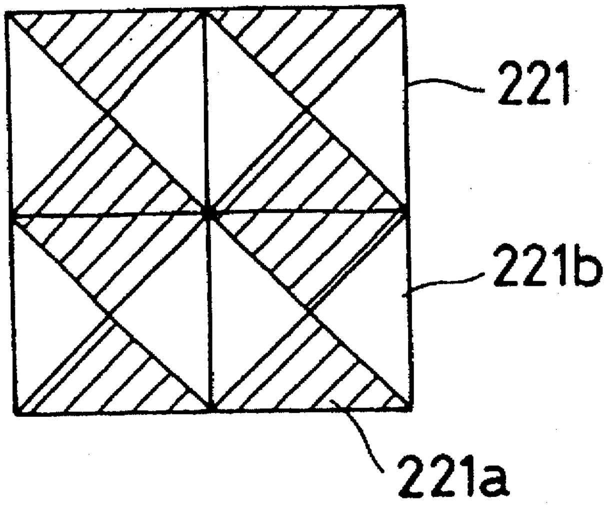
FIG. 39 is a plan view showing a eighth embodiment of a tile having a pattern of the invention.

In FIG. 39, a tile 221 has a lozenge pattern. Each lozenge is composed of a brownish part 221*a* and a whitish part 221*b*, for example.

In manufacturing the tile, to begin with, a brown clay body and a white clay body were prepared, each of which had a moisture content of 20%.

Figure 40:
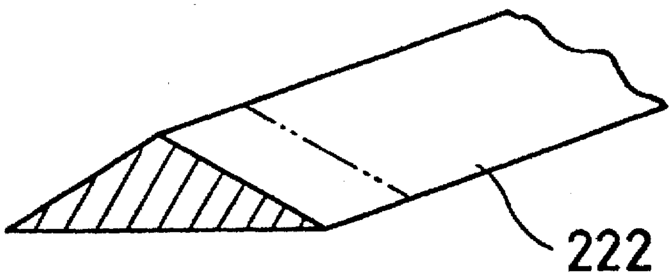
FIG. 40 is a perspective view showing a triangle bar during manufacturing of the eighth embodiment of a tile having a pattern of the invention.

Next, they were molded into two colors of isosceles triangle bars 222 having a side of 40 mm and an altitude of 20 mm, as shown in FIG. 40, using a known extruder. Then, an adhesive was coated on joint surfaces of these triangle bars 222, and thereafter they were closely joined with their apexes contacted so that the same colors were symmetrically disposed into a square shape as a whole. Then, the gathered body was cut into 15 mm thick blocks. A plurality of cut blocks were placed in order in a pressure forming dish of 85 mm square while their cut surface faced above, pressingly formed and dried and fired. Thereby, a tile of 75 mm square which had two colors of lozenges arranged in order was obtained.

Thus obtained tiles can be of course used as tiles for building materials in such a place as a bathroom and a lavatory, or tiles for construction materials in such a place as a pavement and a park. In addition, they are applicable or widely used for an ashtray for family use, a saucer, a tea caddy, a basin, or accessories like a pendant. Specially, due to the characteristics that the pattern is never faded nor vanished if the surface is abraded, they have outstanding advantages when used as tiles for building use such as a bathroom or a lavatory or tiles for construction use such as a pavement or a park. Moreover, each color in the pattern goes through in the thickness direction, and a spectrum pattern is formed at side surface or the like, so that they can exhibit very massive impression when used for furniture or fixtures.

Here, in the fourth to eighth embodiments, the clay body may be obtained by adding a coloring pigment and water to the same raw material as the normal tiles such as feldspar, china clay, kaolin, clay, etc., and kneading them. In this case, the moisture content of the clay body is set in such a value as, when the blocks are disposed in the die to be pressed, the block are never destroyed by their expansion and can flow to such a degree as to be filled up to corners. By experiments, 20±5% is the best.

As the coloring pigment, pigments for kneading may be used like methyl cellulose, iron oxide and Mn-Al pink, in addition to natural pigments like chromite and loess. The added amount is preferably one to two percent in normal uses.

As the adhesive for joining the molded bodies to each other, cellulose ether such as methyl cellulose, CMC (carboxymethyl cellulose sodium), ethyl cellulose or benzyl cellulose, or a synthetic resin may be used. In addition to such cellulose ether or synthetic resin, any one which can prevent the molded bodies from peeling off mutually by burning may be used. Moreover, in addition to organic adhesives like a synthetic resin, an inorganic adhesive may be used as a matter of course. The inorganic adhesive is advantageous in view of property, but expensive. In view of costs, the organic adhesive is advantageous.

The drying and burning after pressing may be carried out in accordance with a manufacturing condition of common tiles.

In the fourth to eighth embodiments, while the adhesive is coated on the joint surfaces of the molded bodies of different colors after the colored clay bodies are molded into plates or bars, modification is possible. For example, the adhesive may be added beforehand to the colored clay bodies. In this case, particularly, it is possible to prevent crazes or cracks from being generated in the same color body in burning. Moreover, it is possible to omit the step for coating the adhesive separately on the joint surfaces of the differently colored clay bodies, thereby simplifying more the manufacturing.

In the fourth to eighth embodiments, while plate or bar shaped molded bodies are gathered and cut into a constant width, thereby making the blocks, other modifications are possible. For example, after the bar molded bodies are gathered, they may be twisted in a circumferential direction by holding their circumference. In this case, different patterns may appear on each desired cutting plane parallel to the surface of the tile, thereby enabling a variety of patterns.

In the fourth to eighth embodiments, various colors may be used in addition to the above mentioned colors. The size of the tile can be desirously set. The number of tiles disposed in the die can be appropriately determined, such as one, two, four, or sixteen.

In the fourth to eighth embodiments, while the bars like the round bars or square bars are molded by the extruder, the machine or means for molding is not limited thereto.

Ninth Embodiment

A ninth embodiment of the invention will be described referring to FIGS. 41 to 48. A tile has a mottled spiral pattern.

Figure 41:
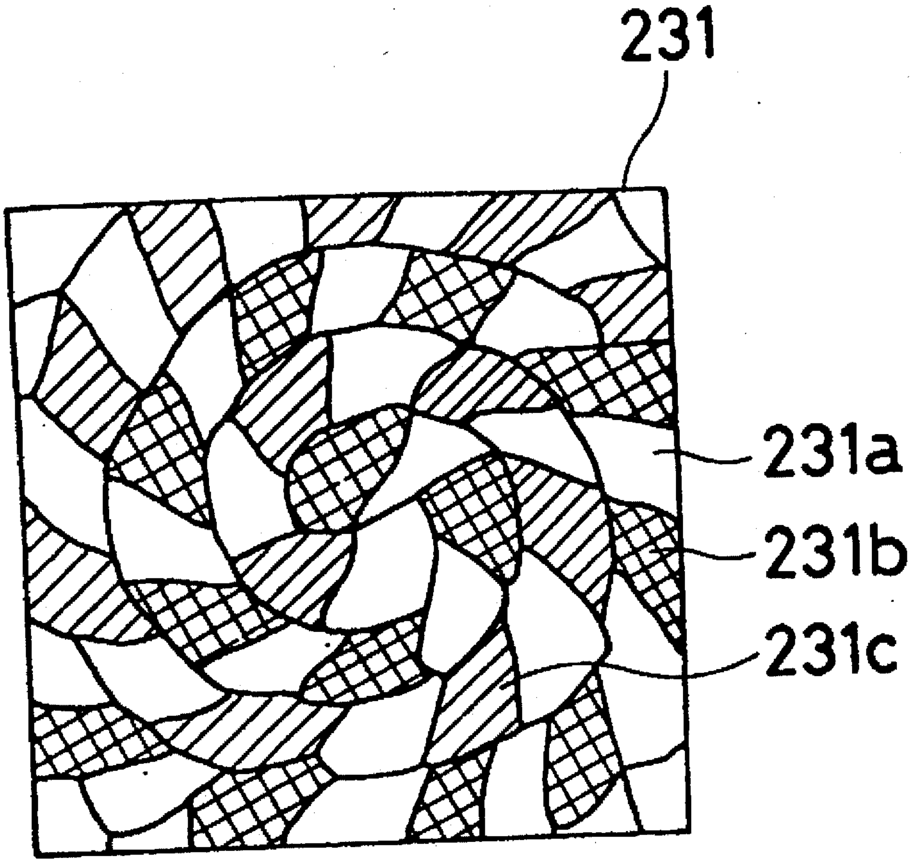
FIG. 41 is a plan view showing a ninth embodiment of a tile having a pattern of the invention.

In FIG. 41, a tile 231 has a mottled spiral pattern composed of two mottled bars. The pattern is composed, e.g. of whitish parts 231*a*, blackish parts 231*b* and dark brownish parts 231*c*. The mottled spiral bar is disposed parallel while twisted, so that, when sliced on a desired plane parallel to a surface of the tile, a different pattern from that of the surface appears.

Figure 42:
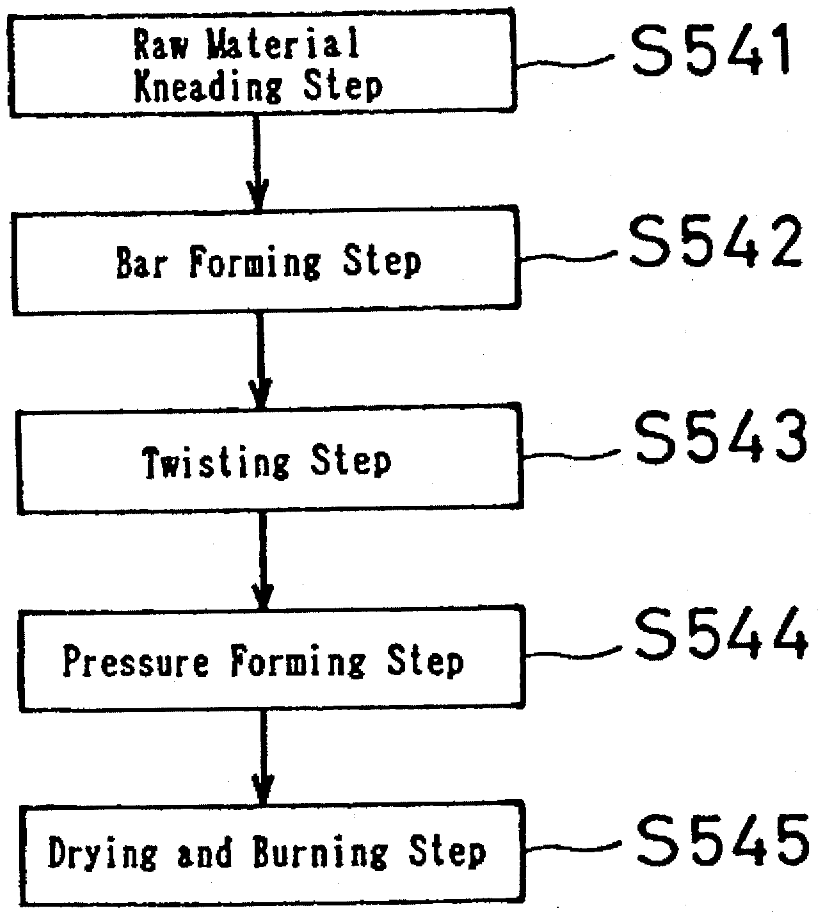
FIG. 42 is a flowchart showing manufacturing steps of tiles having patterns in ninth to eleventh embodiments of the invention.

Next, manufacturing steps of this tile is described referring to FIG. 42.

Figure 43:
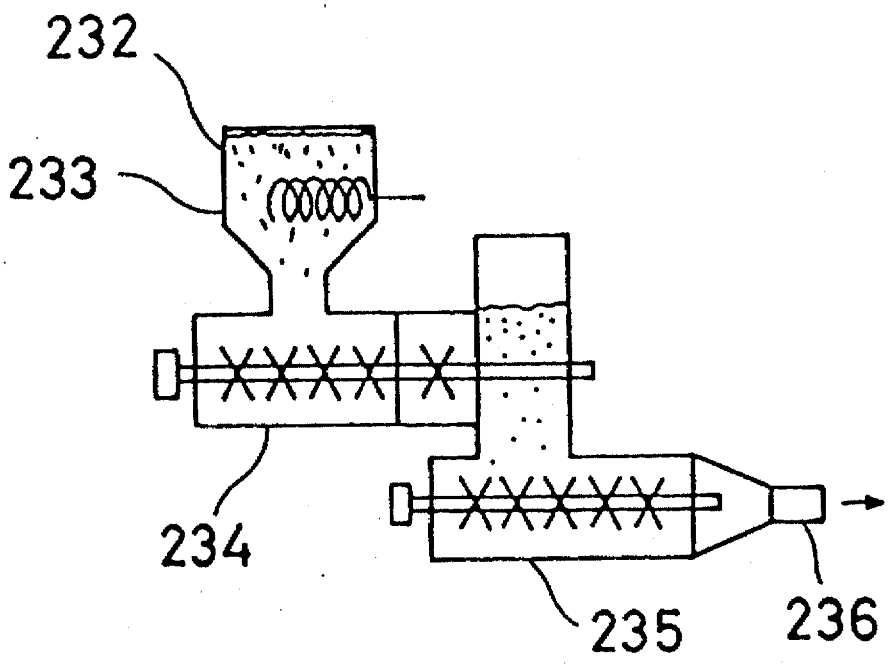
FIG. 43 is a schematic drawing showing a continuous molding machine used in a bar molding step of FIG. 42.

In manufacturing the tile 231, to start with, in a raw material kneading step S541, three kinds of raw material mixed powders were prepared: a first kind of raw material mixed powders consisting of 50% feldspar, 20% china clay, 10% kaolin and 20% clay; a second kind of colored raw material mixed powders composed of the first raw material mixed powders added with 2% chromite pigment powders; and a third kind of colored raw material mixed powders composed of the first raw material mixed powders added with 1% red iron oxide. 3% CMC as an adhesive and 25% water were added to each kind of raw material mixed powders. Then, as shown in FIG. 43, each kind of powders were put into a mixer 233 of a continuous molding machine 232. They were sufficiently kneaded by a pug mill 234 to prepare three kinds of clay bodies. The first kind of powders become a whitish color, the second kind become a blackish color and the third kind become a dark brownish color.

Figure 44:
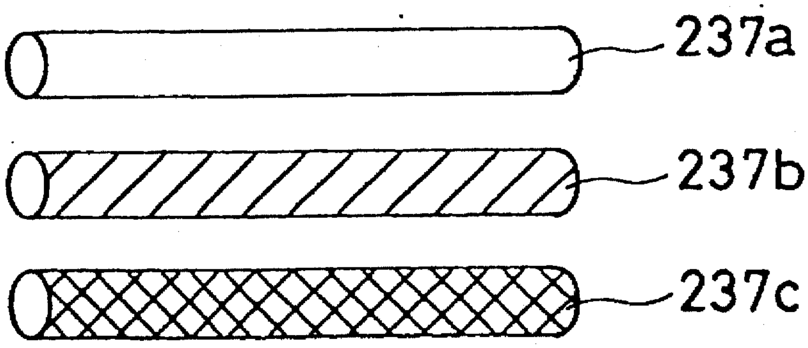
FIG. 44 is a perspective view showing bars in the bar molding step of FIG. 42.

Next, in a bar forming step S542, each kind of clay bodies obtained by the step S541 was extruded from a mouthpiece 236 having a circular opening by use of an extruder 235 of the continuous molding machine 232, thereby obtaining a soft whitish round bar 237*a*, a soft blackish round bar 237*b* and a soft dark brownish round bar 237*c* each of which was 8 mm diameter and 1000 mm long, as shown in FIG. 44.

Figure 45:
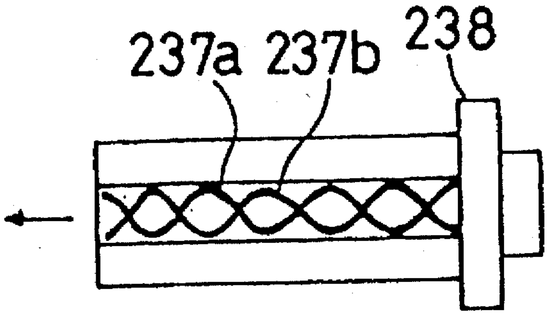
FIG. 45 is a schematic drawing showing a twister used in a twisting step of FIG. 42.
Figure 46:
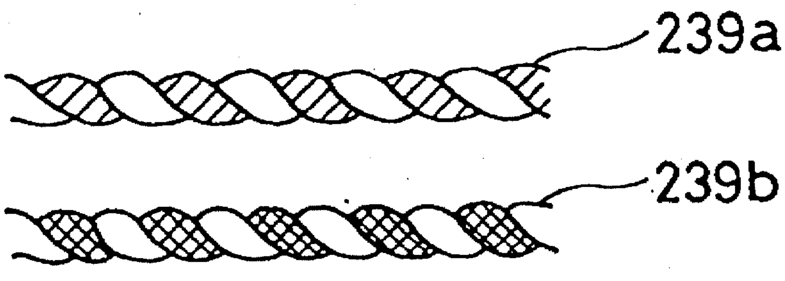
FIG. 46 is a plan view showing twisted bars twisted in the twisting step of FIG. 42.

In a twisting step S543, as shown in FIG. 45, the whitish bar 237*a* and the blackish bar 237*b* were put into each of two supply holes of a twister 238, and twisted under such a preset condition as they were twisted to a medium degree at a low speed in accordance with an operation of twisting a rope. Thus, there was produced a rope like twisted bar 239*a* of approximately 15 mm diameter of mottled pattern of black and white as shown in FIG. 46. Similarly, the whitish bar 237*a* and the dark brownish bar 237*c* were put into the supply ports of the twister 238 and twisted, thereby obtaining a rope like twisted bar 239*b* of approximately 15 mm diameter of a mottled pattern of white and dark brown.

Figure 47:
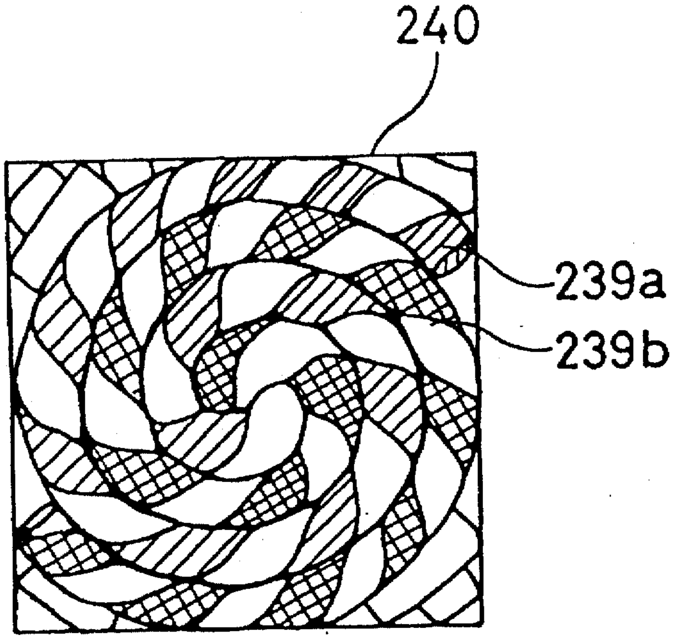
FIG. 47 is a plan view showing twisted bars arranged in a die in a pressure forming step of FIG. 42.
Figure 48:
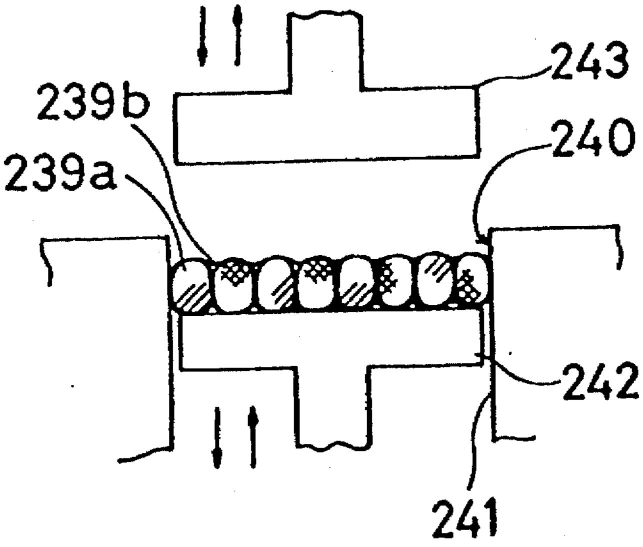
FIG. 48 is a schematic drawing showing a pressure forming state in the pressure forming step in FIG. 42.

Next, in a pressure forming step S544, as shown in FIG. 47, two different colored ropes or the twisted bar 239*a* and the twisted bar 239*b* were disposed in a pressure forming die 240 of 110 mm square, while being coiled in close contact about two rounds in the clockwise direction, and had their rest cut off. As shown in FIG. 48, the pressure forming die 240 is composed of a fixed lower mold 241 having a square hole and a movable lower mold 242 which vertically moves in the fixed lower mold 241. A pressed body can be taken out easily by raising the movable lower mold 242 after pressing. After the twisted bar 239*a* and the twisted bar 239*b* were accommodated in the pressure forming die 240 while coiled, the rests of the twisted bar 239*a*, 239*b* which had been cut were packed in a space defined at corners of the die 240. The pressing was carried out at a pressure of 75 kg/cm$^2$.

By this pressing, top round portions of each rope or the twisted bar 239*a*, 239*b* were spread toward their diameter direction, thereby defining a border line positioned on the same plane between the adjacent ropes of different colors. Thus, a long spiral flow of mottled pattern was defined.

Thereafter, in a drying and burning step S545, the pressed body was dried at a temperature not more than 200° C., and then burned thirty hours at a temperature of 1200° C., thereby providing a nonglazing tile 231 of 100 mm square which had a mottled pattern of three different colors of white, black and dark brown, as shown in FIG. 41.

In this embodiment, while the size of the tile 231 is 100 mm square, it may be other desired sizes. The shape thereof may be modified desirously such as a circle, triangle, hexagon or octagon.

As mentioned above, the above embodiment of the tile is made by: preparing three kinds of colored clay bodies which is of a predetermined moisture content and added with CMC as an adhesive; twisting each two of the different colors of bars or the whitish round bar 237*a*, the blackish round bar 237*b* and the dark brownish round bar 237*c*; disposing the twisted bar 239*a* and the twisted bar 239*b* in a coiled manner on a horizontal plane in the pressure forming die 240; and pressingly forming, drying and burning them.

According to the above embodiment, a clear border line is defined in the pattern by the joint surfaces of the whitish round bar 237*a*, blackish round bar 237*b* and dark brownish round bar 237*c* which go through the tile in the thickness direction. Thus, there is no problem that the pattern is faded or vanished when the tile surface is abraded.

Since no glazes are used on the tile surface, the tile surface is rough, so that it is hard to slip when got wet in a bathroom, a pavement or the like, and assures safety.

Since the tile is made wholly of the same raw material and the clay bodies of equal density, and since the adhesive is added to the clay bodies beforehand, there are no cracks nor crazes in burning and no clearance generated.

The manufacturing method of the tile of this embodiment comprises: the raw material kneading step S541 for kneading the raw material mixed powders, pigments, water and an adhesive to the raw material mixed powders to prepare the colored clay bodies of a predetermined moisture content; the bar forming step S542 for forming the whitish round bar 237*a*, the blackish round bar 237*b* and the dark brownish round bar 237*c* out of the colored clay bodies; the twisting step S543 for twisting the whitish round bar 237*a*, the blackish round bar 237*b* and the dark brownish bar 237*c*; the pressure forming step S544 for disposing the twisted bar 239*a* and the twisted bar 239*b* in a coiled manner on the horizontal plane in the pressure forming die 240 and pressingly forming them; and the drying and burning step S545 for drying and burning the pressed body.

Accordingly, the tile can be manufactured by the simple steps from the step S541 to the step S545.

Tenth Embodiment

Next, a tenth embodiment will be described referring to FIGS. 49 to 52. A tile has a quadrant mottled pattern.

Figure 49:
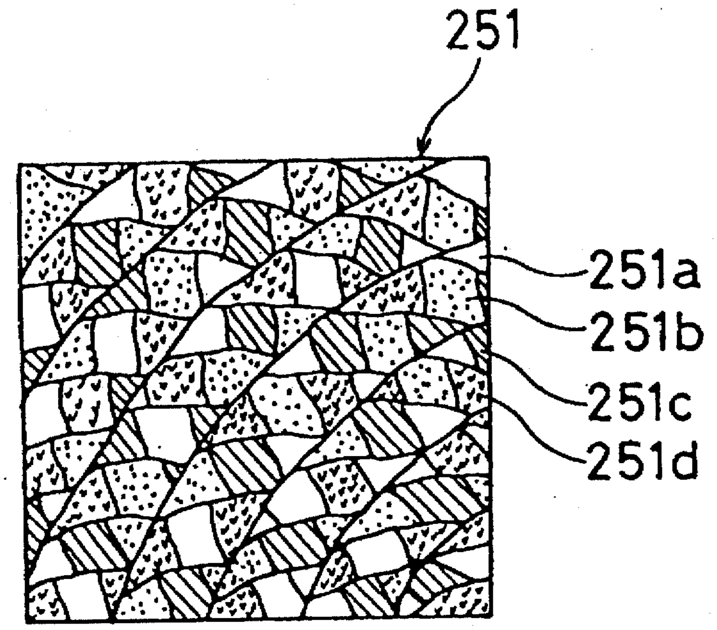
FIG. 49 is a plan view showing a tenth embodiment of a tile having a pattern of the invention.

In FIG. 49, a tile 251 has a pattern made of many quadrant bars having mottles. Each quadrant bar is composed, e.g. of whitish parts 251*a*, blackish parts 251*b*, pinkish parts 251*c* and blueish parts 251*d*. The quadrant bars are arranged horizontally while twisted, so that, when the tile is sliced on any plane parallel to a tile surface, a pattern slightly different from that of the surface appears.

Manufacturing steps of this tile will be described hereunder.

In manufacturing the tile 251, in the same manner as the ninth embodiment, in a raw material kneading step S541 shown in the flowchart of FIG. 42, an uncolored raw material mixed powders and three kinds of colored raw material mixed powders were prepared: uncolored raw material mixed powders consisting of 50% feldspar, 20% china clay, 10% kaolin and 20% clay; first colored raw material mixed powders obtained by adding 1% $Fe_2O_3$-$Cr_2O_3$-CoO black pigment to the uncolored raw material mixed powders; second colored raw material mixed powders obtained by adding 2% $Al_2O_3$-MnO pink to the uncolored raw material mixed body; and third colored raw material mixed body obtained by adding 2% Zircon blue pigment. 1% CMC and 25% water were added to each kind of raw material mixed powders. Moreover, 2% rock fibers 6 mm long were added thereto. Then, each of them was thrown and mixed in the mixer 233 of the continuous molding machine 232 of FIG. 43, and sufficiently kneaded by the pug mill 234 to prepare four kinds of clay bodies. The uncolored raw material mixed powders become a white color after burning.

Next, in a bar forming step 8542, each kind of clay body obtained in the step S541 was extruded from the mouthpiece 236 of 6 mm diameter by use of the extruder 235 of the continuous molding machine 232, thereby obtaining a soft whitish round bar, a soft blackish round bar, a soft pinkish round bar and a soft blueish round bar each of which was 1000 mm long.

Figure 50:
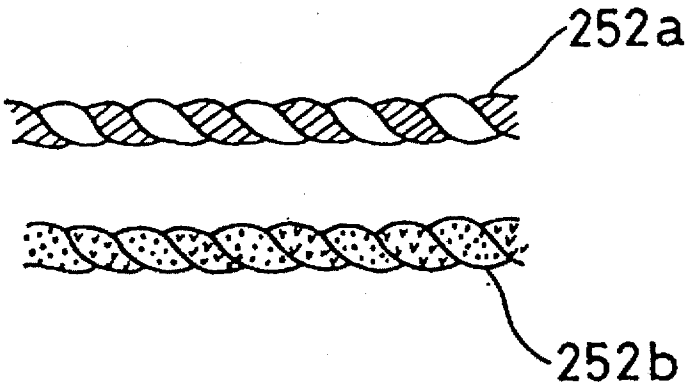
FIG. 50 is a plan view showing twisted bars in a manufacture of a tenth embodiment of a tile having a pattern of the invention.
Figure 51:
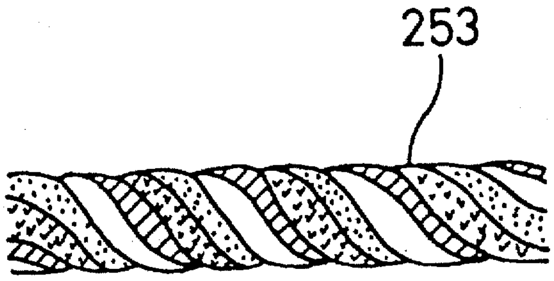
FIG. 51 is a plan view showing a double-twisted bar in a manufacture of a tenth embodiment of a tile having a pattern of the invention.

In a twisting step S543, the whitish bar and the blackish bar were put into each of the supply holes of the twister 238 and twisted thereby to obtain a twisted bar 252*a* of a mottled pattern of black and white as shown in FIG. 50. Similarly, the pinkish bar and the blueish bar were put in the supply hole of the twister 238 and twisted thereby to obtain a rope like twisted bar 252*b* of a mottled pattern of pink and blue. Then, these twisted bars 252*a* and 252*b* were further twisted to obtain a thick double-twisted bar 253 of approximately 20 mm diameter as shown in FIG. 51.

Figure 52:
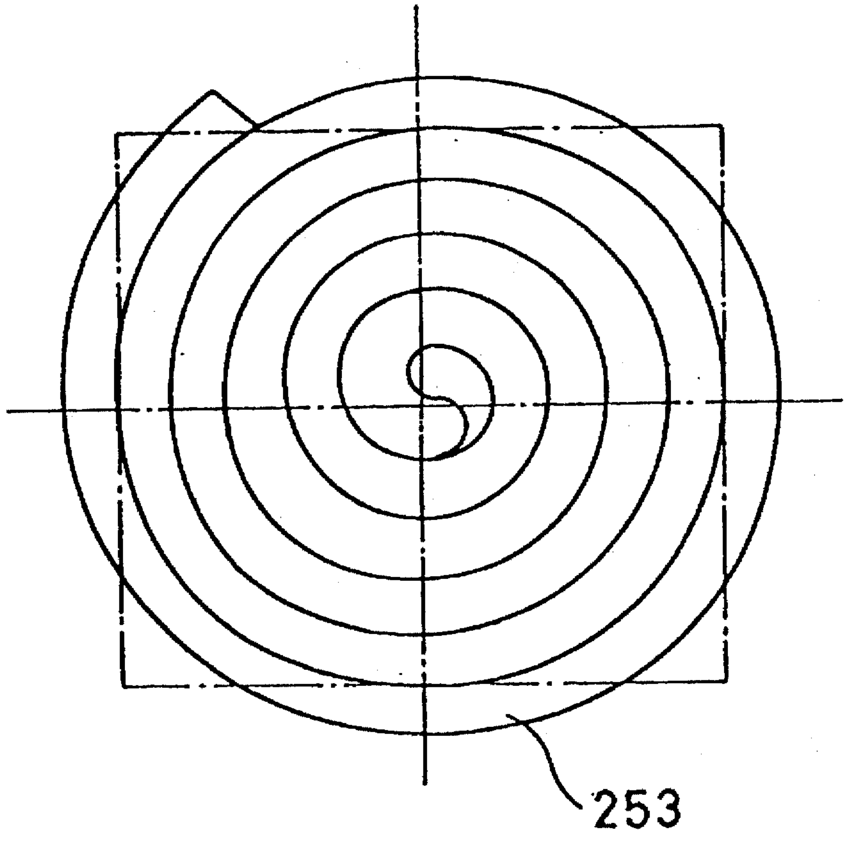
FIG. 52 is a plan view showing a coiled state of a double-twisted bar in a manufacture of a tenth embodiment of a tile having a pattern of the invention.

Next, in a pressure forming step S544, the double-twisted bar 253 having four colors was coiled five times with its one end as a start point, and cut off alone one-dot chain lines into four quadrants, as shown in FIG. 52. The rests of the bar 253 in cutting were stored for packing into spaces of corners of the die. Next, a quadrant cut piece of the bar 253 was placed in the pressure forming die 240 of 110 mm square shown in FIG. 48. Then, the rests of the bar 253 were filled in the spaces defined at the corners of the die 240. Thereafter, the filled body was pressed.

Then, in a drying and burning step S545, the pressed body was dried at a temperature not more than 200° C., and burned thirty hours at a temperature of 1200° C., thereby forming a nonglazing tile 251 of 100 mm square having a mottled pattern of four colors of white, black, pink and blue.

As mentioned above, the tenth embodiment of the tile is made by: molding the colored clay bodies of a predetermined moisture content each of which is added with CMC as an adhesive and rock fibers as reinforcing fibers to obtain different colored bars or the whitish round bar, the blackish round bar, the pinkish round bar and the blueish round bar; twisting each two of them; further twisting the twisted bars 252*a* and 252*b* formed by twisting the above bars to prepare the double-twisted bar 253; arranging it horizontally in the pressure forming die 240; and pressingly forming and drying and burning.

Accordingly, the same advantages are expected as the ninth embodiment. Particularly, due to the double-twisted bar 253, more various patterns may be obtained. Since the reinforcing fibers are added, a tensile strength in twisting is improved so as to prevent rupture of the round bars in double twisting.

Eleventh Embodiment

An eleventh embodiment of the invention will be described referring to FIG. 53. A tile has a mottled stripe pattern.

Figure 53:
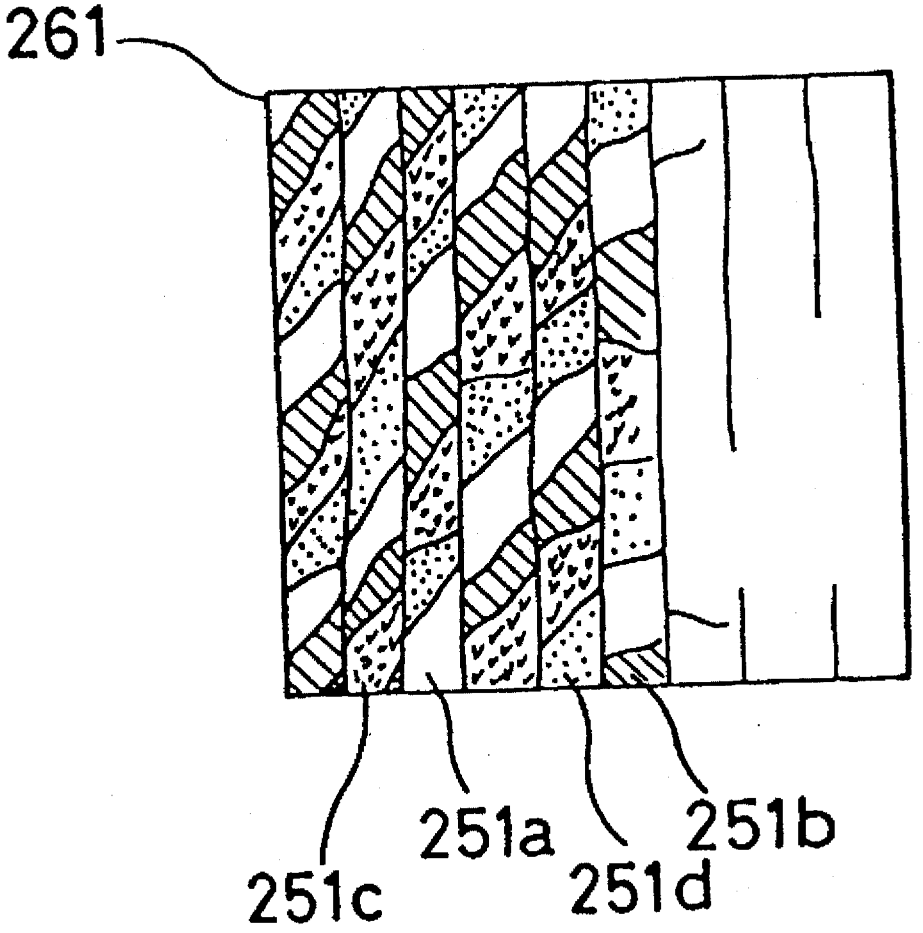
FIG. 53 is a plan view showing a eleventh embodiment of a tile having a pattern of the invention.
Figure 54A:
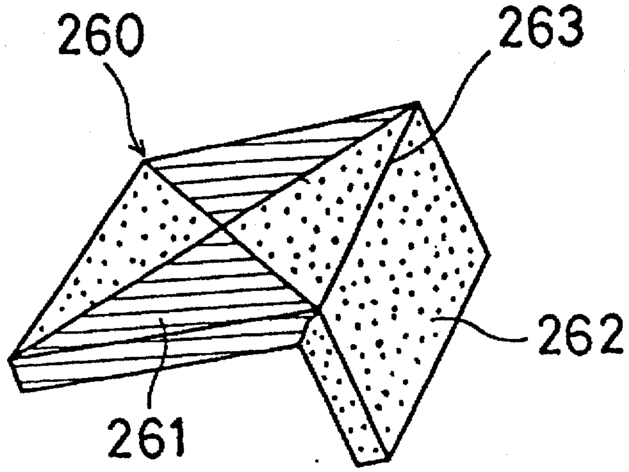
FIG. 54(*a*) is a perspective view showing an appearance of an example of an angle tile having a colored pattern obtained by twelfth to sixteenth embodiments.
Figure 54B:
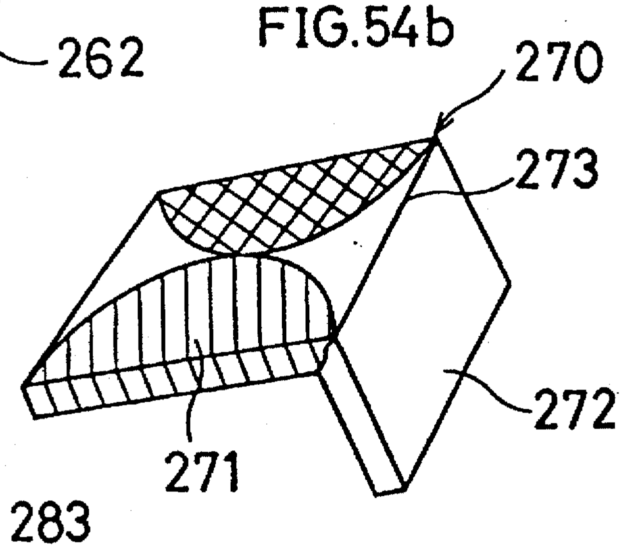
Figure 54C:
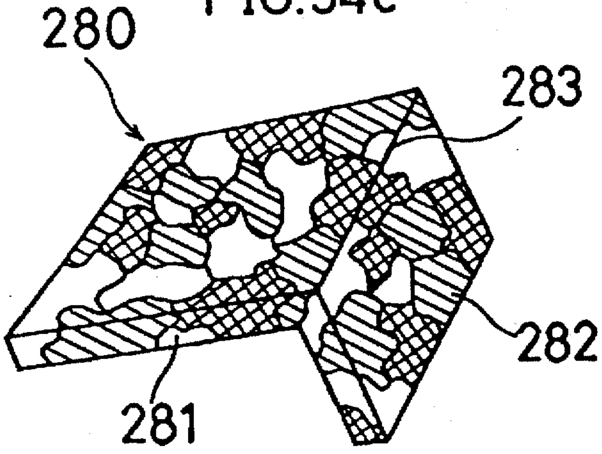
Figure 54D:
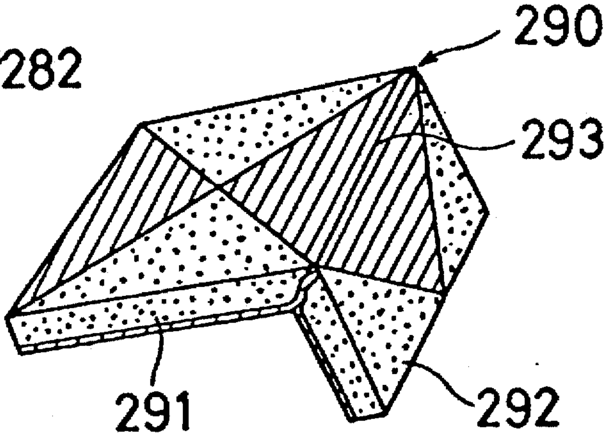

In FIG. 53, a tile 261 has a mottled stripe pattern. The pattern is composed, e.g. of whitish part 251*a*, blackish parts 251*b*, pinkish parts 251*c* and blueish parts 251*d* as in the tenth embodiment.

A manufacturing of this tile was carried out by use of a double twisted bar 253 similar to that of the tenth embodiment. First, the double-twisted bar 253 of four colors was cut into a length of 105 mm. A plurality of cut pieces of the bar 253 were disposed in the same direction in the pressure forming die 240 and pressed. Then, they were dried at a temperature of not more than 200° C., and burned thirty hours at a temperature of 1200° C., thereby obtaining a nonglazing tile 261 having a mottled stripe pattern of four colors of white, black, pink and blue.

Thus obtained tile has wide uses as in the tiles of the fourth to eighth embodiments. Particularly, it shows outstanding advantages when used for tiles for construction use. Moreover, it can give a massive feeling when used in furniture or fixtures or the like.

In case the different colored bars made of the colored clay bodies have an adhesive coated on the joint surfaces and twisted, a joining strength at the borders of the different colors can be heightened in special.

In the ninth to eleventh embodiments, the clay bodies may be obtained by adding coloring pigments, water and, if desired, an adhesive to the same material as common tiles such as feldspar, china clay, kaolin, clay, etc., and kneading them. In this case, the moisture content of the clay body is set so that, when the twisted bar is disposed and pressed in the die, it can flow to such a degree as being filled up to the corners in the die thereby preventing its destroy by expansion. By experiments, 20±5% is the best.

As the coloring pigments, pigments for kneading may be used such as chromium oxide, iron oxide or Mn-Al pink, in addition to natural pigments like chromite or loess. The added amount is one to two percent usually.

As an adhesive joining the molded bodies mutually, e.g. a cellulose ether like CM (methyl cellulose), CMC (carboxymethyl cellulose sodium), ethyl cellulose or benzyl cellulose, or a synthetic resin may be used. In addition, as the adhesive of the ninth to eleventh embodiments, any one may do as long as it prevents cracks or the like in burning as in the fourth to eighth embodiments. Of course, inorganic adhesives may be used in addition to the organic adhesives like a synthetic resin.

The drying and burning after pressing may be carried out in accordance with a manufacturing condition for generally known nonglazing tiles.

While, in the ninth to eleventh embodiments, the adhesive is beforehand added to the raw material mixed powders for preventing cracks by burning, peeling off between different colored parts or the like, other modifications are possible. For example, the adhesive may be coated on the contact surfaces of every colors of bars after they are extruded in the bar forming step S542. In particular, this is more effective for prevention of peeling off at the borders of different colored portions. The adhesive may be added beforehand to the raw material mixed powders, and further coated on the contact surfaces of the bars in the bar forming step S542.

In the ninth to eleventh embodiments, while the twisting of the bars is done by the twister 238, a machine or means therefor is not limited thereto, but any means for giving an even twisting to the round bars may do instead. For example, twisting by hand is possible.

While, in the ninth to eleventh embodiments, the twisted bar is obtained by one time or two times twisting, the twisting times are not limited thereto. Mottles of the pattern can be increased by using thinner round bars and multiplying the twisting times. The colors or color arrangement are not limited to those of the above embodiments, but they may be chosen from various kinds of colors or color arrangements. The size of the tile may be set in desired one.

While the tenth and eleventh embodiments use the rock fibers as the reinforcing fibers, other reinforcing fibers like whisker may be used. Moreover, depending on the material of the tile, any types of reinforcing material that can keep its fibrous state at any burning temperatures can be used such as glass wool, metal fibers, etc.

Glazing treatment of the tile surface may be freely adopted according to its use.

Twelfth to sixteenth embodiments of the invention will be described hereunder.

FIGS. 54(*a*) to 54(*d*) illustrate respectively examples of angle tiles having various colored patterns which are obtained in each of the twelfth to sixteenth embodiments. The angle tile 260, 270, 280, 290 only as an example of these embodiments is composed of long and short tiles joined by a rectangular corner 263, 273, 283, 293. They may be used for stepped parts of stairs or roads or the like. In the following description, the long tile is called a main plate 261, 271, 281, 291. The short one is called a bent plate 262, 272, 282, 292.

In FIG. 54(*a*), the main plate 261 of the tile 260 has two pairs of triangle parts of different colors while each pair shows symmetry. The bent plate 262 is the same color as that of the adjacent triangle. In FIG. 54(*b*), the main plate 271 of the tile 270 has a pair of symmetrically arranged semicircular parts and other parts of different colors. The bent plate 272 is the same color as that of the other parts. In FIG. 54(*c*), both of the main plate 281 and the bent plate 282 of the tile 280 has a spread mottled pattern. In FIG. 54(*d*), the main plate 291 of the tile 290 has the same color arrangement as that of the tile of FIG. 54(*a*). The bent plate 292 has a color arrangement corresponding to a half of the above color arrangement. These are the appearances of the tiles in each embodiment.

Twelfth Embodiment

The twelfth embodiment will be described referring to FIGS. 55 to 60, taking the angle tile 260 as an example.

In FIG. 54(*a*), the angle tile 260 has the main plate 261 and the bent plate 262 formed at both sides of the corner 263. The main plate 261 has one pair of triangles provided with light blue spots on a white background and the other pair provided with light gray spots on a black background. The bent plate 262 has light blue spots on a white background like the one triangle pair of the main plate 261.

Figure 55:
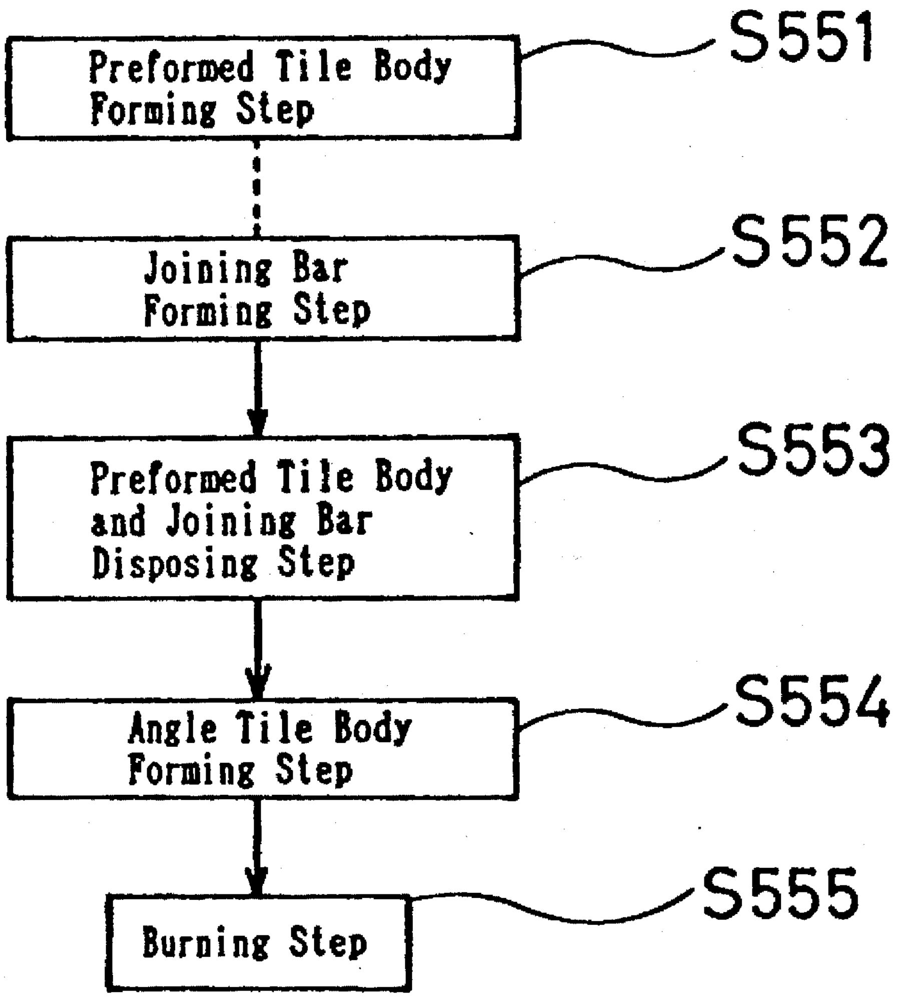
FIG. 55 is a flowchart showing manufacturing steps of the twelfth embodiment of an angle tile of the invention.

This angle tile 260 was manufactured according to a process of FIG. 55 by use of the following device.

Figure 56:
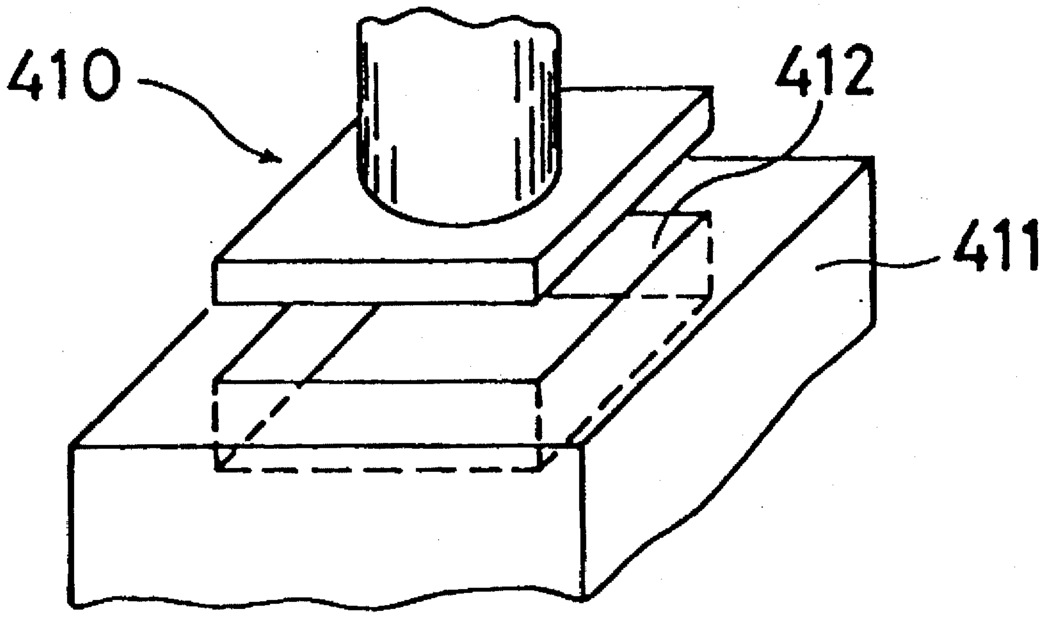
FIG. 56 is a perspective view diagramatically showing a plain tile pressing machine used in the twelfth embodiment of the invention.
Figure 57:
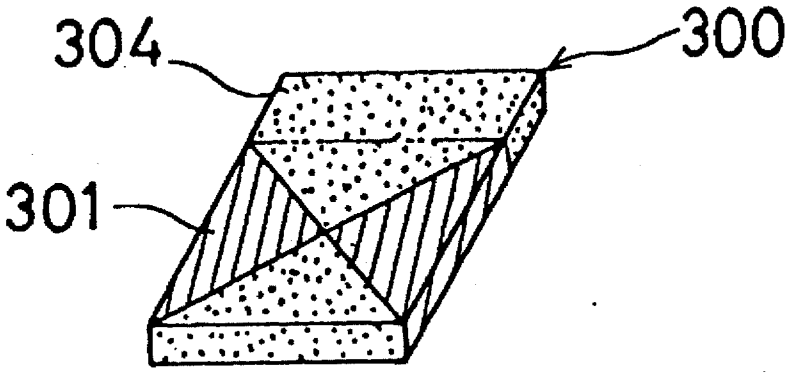
FIG. 57 is a perspective view showing a preformed main plate body made by the plain tile pressing machine of FIG. 56.
Figure 58:
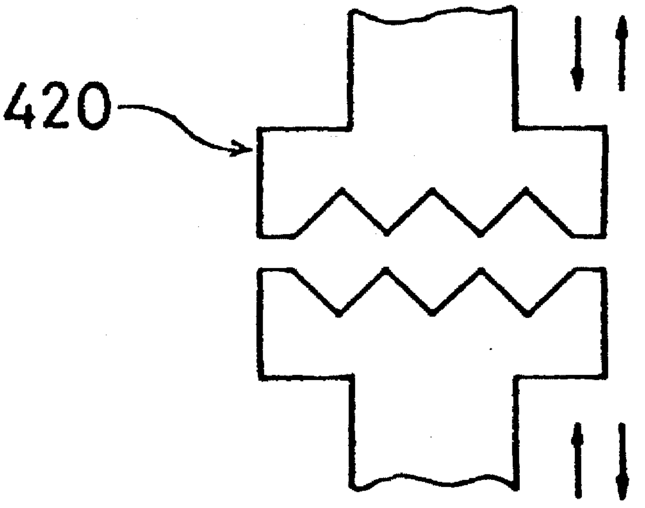
FIG. 58 is a schematic drawing showing a bar pressing machine used in the twelfth embodiment of the invention.
Figure 59:
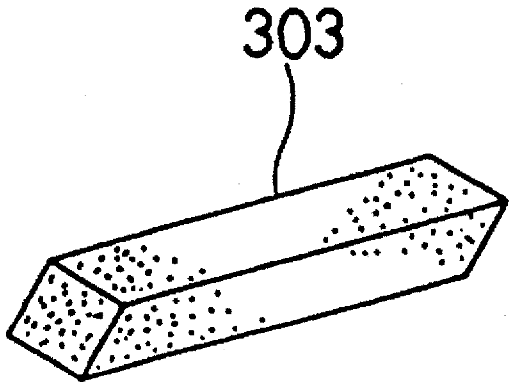
FIG. 59 is a perspective view showing a joining bar made by the bar pressing machine of FIG. 58.
Figure 60:
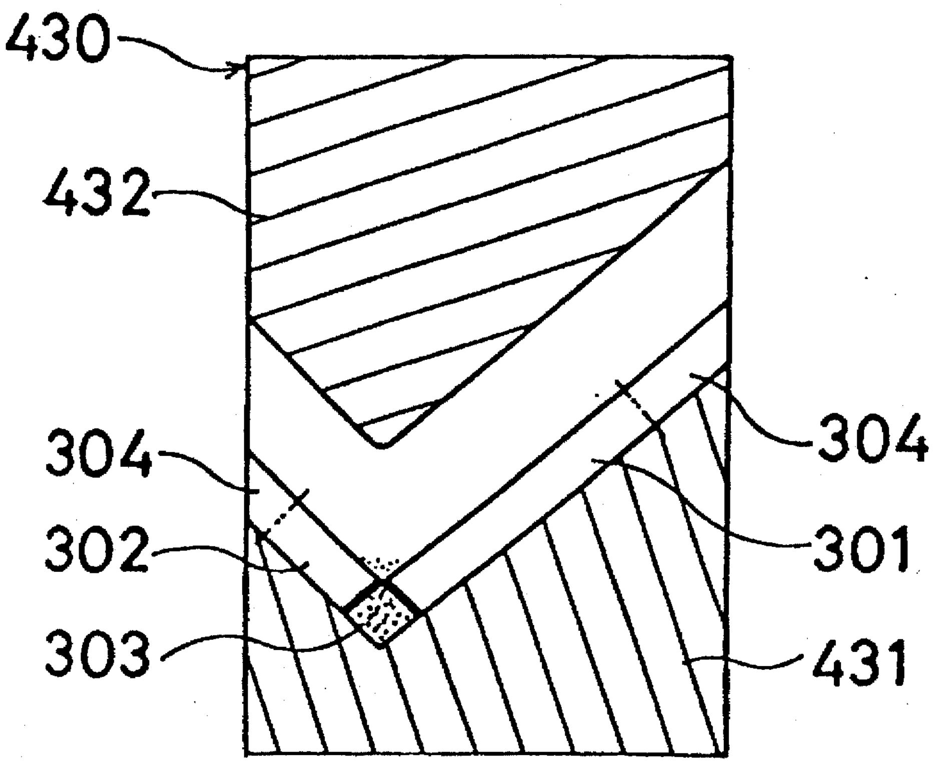
FIG. 60 is an explanatory drawing of a used state of a pressing die of an angle tile pressing machine used in the twelfth embodiment of the invention.

FIG. 56 shows a plate tile press machine 410 used in a preformed tile body forming step S551. FIG. 57 shows a preformed tile body 300 made by this plate tile press machine 400. This preformed tile body includes a preformed main plate body 301 forming the main plate 261 and a preformed bent plate body 302 forming the bent plate 262. Each preformed tile body 301, 302 has a trimmed part 304. FIG. 58 shows a bar press machine 420 used in a joining bar forming step S552 of FIG. 55. FIG. 59 shows a joining bar 303 formed by the bar press machine 420 of FIG. 58. FIG. 60 shows a press die in an angle tile pressing machine used in an angle tile body forming step S554, a lower mold 431 and an upper mold 432 thereof.

To begin with, in a preformed tile body forming step, colored granules used for preparing the preformed tile body 300 were prepared as follows. A crashed mix raw material consisting of 50% feldspar, 20% china clay, 10% kaolin and 20% clay was used herein. Three kinds of colored crashed mix raw materials were prepared: a first material adding 5% black pigment (belonging to a group of CoO, $Cr_2O_3$, $Fe_2O_3$)

to the above crashed mix raw material; a second material adding 5% blue pigment (belonging to a group of $ZrSiO_4$ (V)); and a third material without any pigment added. Water was added to each kind of these materials. They were then mixed and ground by a trommel or the like into a slip, and granulated by a spray drier into granules of a fixed moisture content (granule diameter of about 70 μm). Thus, black, blue and uncolored (white) granules were prepared. The preformed tile body 300 was prepared using these colored granules (including white ones) as mentioned below.

First, a partition plate (not shown) was disposed diagonally in a forming space 412 (103 mm wide, 120 mm long and 13 mm deep) of the lower mold 411 of the plate tile press machine 410 shown in FIG. 56. Thus, the forming space 412 was divided into four isosceles right triangles. Then, a mixture of the uncolored or white granules and the blue granules was filled in the facing one pair of the triangle spaces. A mixture of the white granules and the black granules was filled in the other pair of the triangle spaces. Thereafter, the partition plate ,was removed, and the granules were pressed by the plate tile press machine 410 to make the preformed main plate tile body 301 having a colored pattern shown in FIG. 57. A mixture of the white granules and the blue granules was filled in the forming space 412 (103 mm long, 55 mm wide and 13 mm thick) of the lower mold 411. They were similarly pressed to obtain the preformed bent plate body 302. The pressing was carried out at a pressure of 200 kg/cm$^2$.

As mentioned above, the trimmed part 304 is provided in a length of about 20 mm on a part unnecessary in a finished tile or outside ends of the preformed main plate body 301 and the preformed bent plate body 302. This trimmed part 304 is cut off in a following step. Therefore, uncolored or white granules were filled at a part corresponding to the trimmed part 304. Accordingly, in forming the preformed main plate body 301, the partition plate was diagonally disposed only in a square part (103 mm square) of the forming space 412 while excepting a part for forming the trimmed part 304 (about 20 mm wide).

Next, in a joining bar forming step S552, a joining bar 303 was formed. This joining bar 303 had a cross section of 13 mm square and a length of 103 mm and was made by filling a mixture of the white granules and the blue granules used in forming the preformed tile body in the bar press machine 420 shown in FIG. 58, and pressing it. FIG. 59 shows thus obtained joining bar 303 which has a pattern of light blue spots scattered on a white background.

In a preformed tile body and joining bar disposing step S553, two kinds of preformed tile bodies 301 and 302 obtained in the step S551 and the joining bar 303 obtained in the step S552 were respectively disposed in the lower mold 431 of the press die 430 of the angle tile pressing machine which molded an angle product. Specifically, the joining bar 303 was disposed along a lowermost rectangular corner of the V-shaped lower mold 431. At this time, since the corner of the joining bar 303 and the corner of the lower mold 431 are rectangular, respectively, the joining bar 303 can be disposed in close contact therewith. Next, the preformed main plate body 301 and the preformed bent plate body 302 were disposed at both sides of the joining bar 303 on both slopes of the lower mold 431. Here, they were disposed so that one end or the side of the trimmed part 304 was positioned outside and that the other end surface was touched vertically with the joining bar 303. At this time, a size of one part, for the main plate, of the lower mold 431 is 105 mm wide, 120 mm long and 13 mm deep. A size of the other part, for the bent plate, of the lower mold 431 is 105 mm long, 55 mm wide and 13 mm deep. Uncolored granules were filled in contact surfaces between the preformed tile bodies 301 and 302 and the joining bar 303 in a small amount, and also in a gap at contact parts between the preformed tile bodies 301 and 302 and the upper mold 432 in a thickness of the preformed tile body. FIG. 60 shows the state of each material on the lower mold 431.

In an angle tile body forming step S554, the reversed V-shaped upper mold 432 corresponding to the shape of the lower mold 431 was pressed against the materials on the lower mold 431 at a pressure of 300 kg/cm$^2$. Thus, the materials were integrally pressed and the angle tile body was obtained. The angle tile body was taken out by pulling up the upper mold 432 and pushed up the lower mold 431 up to a take-up level.

As mentioned above, the trimmed parts 304 approximately 20 mm wide were provided on both ends of the angle tile body or unnecessary parts for finished tiles. These trimmed parts 304 were removed by cutting by a cutter along cutting lines shown in FIG. 60. Since the angle tile body is a pressed body molded by a sufficient pressing force, it has enough strength to bear any works by hand to a sufficient degree, unless it is intended to destroy it.

In a burning step S555, the angle tile bodies obtained in the step S554 were arranged in a chamotte sagger at appropriate intervals therebetween. They were burned four hours at a temperature of 1200° C. and sintered.

Thus, the angle tile 260 was obtained. As shown in FIG. 54(*a*), this tile 260 has the main plate 261 100 mm wide, 100 mm long and 10 mm thick and the bent plate 262 100 mm long, 50 mm wide and 10 mm thick at opposite sides of the rectangular corner 263. The main plate 261 is diagonally divided into two pairs of triangles one pair of which has the light blue spotted pattern on the white background and the other pair of which has light gray spotted pattern on the black background. The bent plate 262 has the light blue spotted pattern on the white background which is the same as the pattern of the adjacent part of the main plate 261.

As mentioned above, this embodiment of the angle tile 260 is made by: disposing the plate Shaped preformed tile bodies 301 and 302 having the spotted pattern respectively on the opposite slopes of the lower mold 431 of V-section; disposing the joining bar 303 of the same material as the preformed tile body 301, 302 between the facing end surfaces of the preformed tile bodies 301 and 302 along the edge of the lower mold 431; and pressing them between the lower mold 431 and the upper mold 432 into one body, and then burning them.

According to the present embodiment, since the plate shaped preformed tile bodies 301 and 302 are given colored patterns on their surfaces beforehand, such patterns appear on the surface of the angle tile as they are, so that it is possible to obtain the above mentioned patterns that would be difficult to provide in conventional molds for angle tiles. Moreover, since the preformed tile bodies 301, 302 are joined by the joining bar 303 of the same material into the angle molded body without any joint line, so that the finished tile has a good appearance and sufficient corner strength.

The manufacturing method of the angle tile comprises: the preformed tile body forming step S551 for forming the plate shaped preformed tile bodies 301, 302 having the colored spotted pattern on their surfaces; the joining bar forming step S552 for forming the joining bar 303 of the same material as the preformed tile body 301, 302; the preformed tile body and joining bar disposing step S553 for disposing the preformed tile bodies 301, 302 respectively on the opposite slopes of the lower mold 431 of V-section and the joining bar 303 between the end surfaces of the preformed tile bodies 301, 302 along the edge of the lower mold 431; the angle tile body forming step S554 for pressing the preformed tile bodies 301, 302 and the joining bar 303 between the lower mold 431 and the upper mold 432 to form the angle tile body as one body; and the burning step S555 for burning the angle tile body.

According to this embodiment, the angle tile having the colored spotted pattern can be obtained by the simple steps from the step S551 to the step S555.

Thirteenth Embodiment

Figure 61:
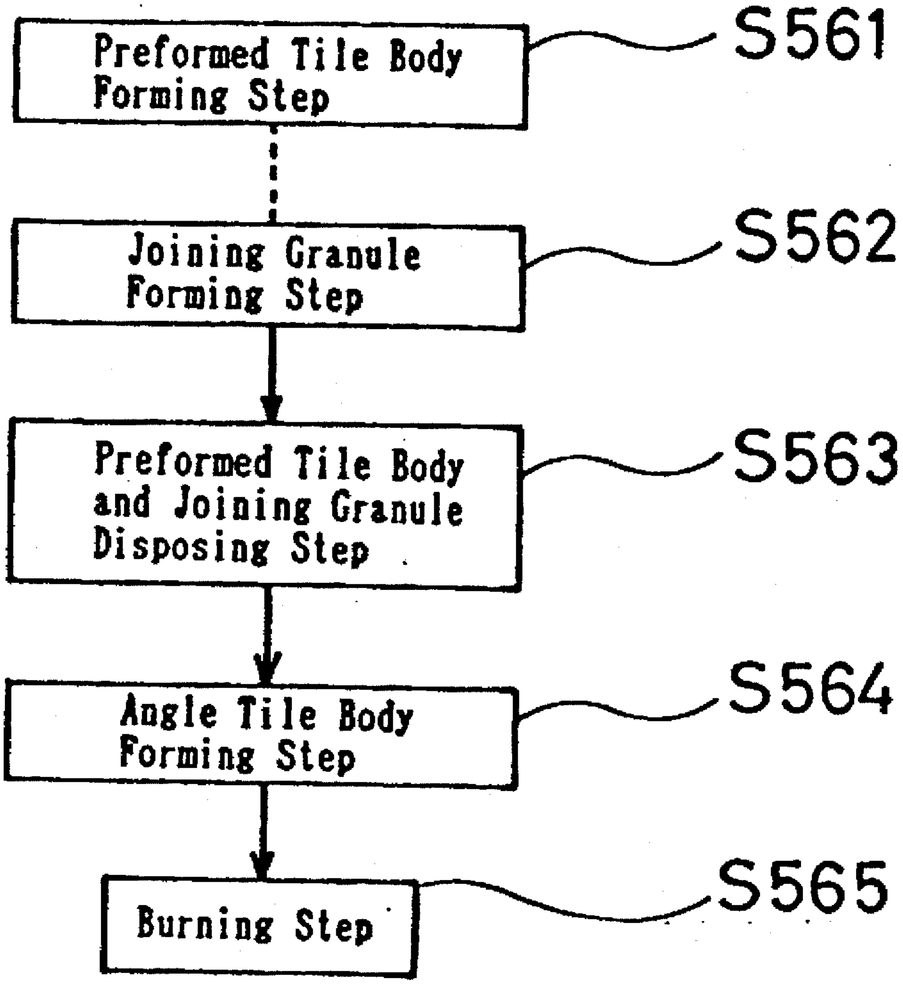
FIG. 61 is a flowchart showing manufacturing steps of the thirteenth embodiment of an angle tile of the invention.

The thirteenth embodiment of the invention will be described referring to FIGS. 61 to 63(*b*), taking the angle tile 270 of FIG. 54(*b*) as an example.

In FIG. 54(*b*), the angle tile 270 has the main plate 271 and the bent plate 272 at both sides of the rectangular corner 273. The main plate 271 has a pattern composed of a pair of semicircles, one of which is yellow and the other of which is green, and the other parts which is white. The bent plate 272 has a pattern of the same white color as the adjacent part of the main plate 271.

This angle tile 270 was manufactured as follows.

Figure 62:
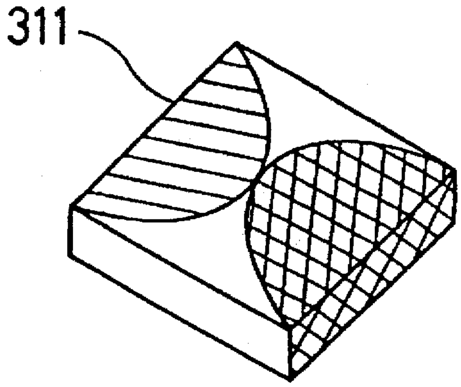
FIG. 62 is a perspective view showing a preformed main plate body formed in a preformed tile body forming step of the thirteenth embodiment of the invention.
Figure 63A:
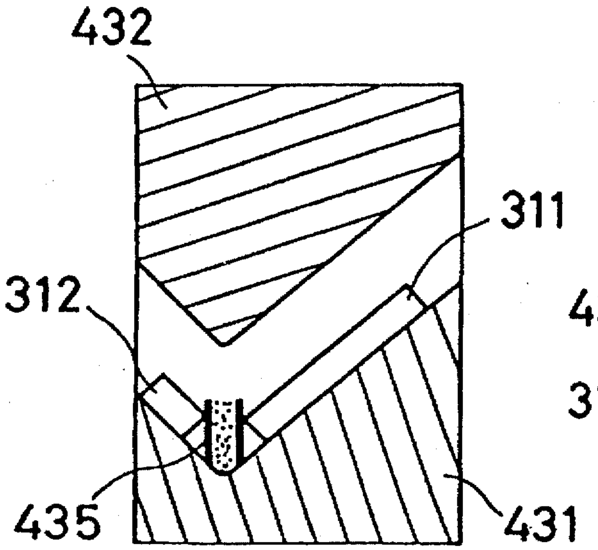
FIG. 63(*a*) is an explanatory drawing of a used state of a frame of a pressing die of an angle tile pressing machine used in the thirteenth embodiment of the invention.
Figure 63B:
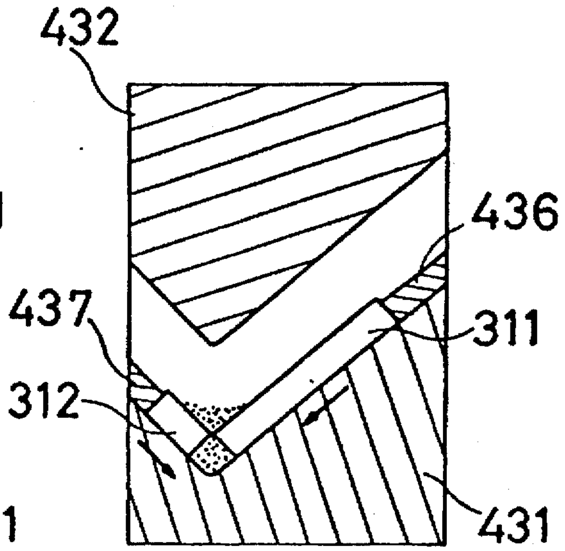

FIG. 62 shows a preformed tile body 311 formed in a preformed tile body forming steps S561. FIG. 63 shows an aluminium frame 435 of the press die 430 of the angle tile pressing machine used in the angle tile body forming step S554. The frame 435 defines guide walls in filling joining granules at the edge of the lower mold 431 of V-section. A pair of trimming metal fittings 436, 437 are disposed at such positions as trimmed parts are to be provided on each end of the preformed tile bodies 311, 312 which are placed on the slopes of the lower mold 431. The fittings 436 is situated against the outside end of the preformed main plate body 311. The other fittings 437 is situated against the outside end of the preformed bent plate body 312.

First, in the preformed tile body forming step S561, three kinds of colored crashed mix raw materials were prepared from the same uncolored crashed mix raw material as the twelfth embodiment: first colored materials obtained by adding 5% yellow pigment (titan yellow) to the uncolored material; second colored material obtained by adding 5% green pigment (chromium oxide) to the uncolored material; and the uncolored crashed mix raw material as it is though it is called a colored crashed mix raw material herein for convenience sake. Each of them was added with water and granulated into particles of about 70 μm diameter, thereby preparing three kinds of colored granules or yellow, green and uncolored (white) granules.

Then, in the preformed tile body forming step S561, two partition plates (not shown) were disposed in the forming space 412 of the lower mold 411 of the plate tile press machine 410. Each partition plate is semicircular and has a diameter equal to a length of a side of the forming space 412. Thus, the partition plates divided the forming space 412 into three spaces (two semicircular spaces and the rest). The yellow granules and the green granules were filled respectively in the two semicircular spaces and the white granules were filled in the rest of the space. Then, the partition walls were removed and the colored granules were pressed by the plate tile press machine 410 to form the preformed main tile body 311. On the other hand, using another plate tile press machine which was substantially the same construction as the press machine 410 but different in size and had a lower die and a forming space, the preformed bent plate body 312 was prepared. For convenience sake, the press die and its elements are given the same reference numerals as those of the press die 410. Namely, the white granules were filled in all the forming space 412 and pressed similarly to the above, thereby forming the preformed bent plate body 312. FIG. 62 shows the preformed tile body 311 molded as above. Here, the size of the forming space 412 for the preformed main plate body 311 was 308 mm wide, 308 mm long and 25 mm deep. The size of the forming space 412 for the preformed bent plate body 312 was 308 mm long, 35 mm wide and 25 mm deep. The pressure was 200 $kg/cm^2$.

In the twelfth embodiment, the trimmed part 304 is formed at the end of each preformed tile body 301, 302, and the forming space 412 includes a space for such trimmed part. However, in this embodiment, as mentioned below, the trimming metal fittings 436, 437 of substantially a similar shape to the trimmed part 304 is placed in molding the angle tile body. Thus, the forming space 412 in this embodiment includes no space for such trimmed part.

Next, in a joining granule forming step S562, joining granules were prepared by adding 1% CMC to the white granules, which were used in forming the preformed tile body 311, 312.

Then, in a preformed tile body and joining granule disposing step S563, each preformed tile body 311, 312 and the joining granules were disposed on the lower mold 431 of V-section. Specifically, the aluminium frame 435 (305 mm long, 50 mm high and 30 mm wide) for guiding the joining granules as packed material was disposed in the lower mold 431 so that its opening was contacted with the edged area of the lower mold 431. Thereafter, the joining granules were put into the frame 435. Then, as shown in FIG. 63(*a*), the preformed main plate body 311 and the preformed bent plate body 312 were disposed in the lower mold 431 so that they were contacted to the frame 435. Then, the frame 435 was removed, and simultaneously, each preformed tile body 311, 312 was pushed toward the edge of the lower mold 431 (in a direction of arrow of FIG. 63(*b*)) along the slope thereof, thereby making the preformed tile bodies 311, 312 nearer. Next, the trimming metal fittings 436, 437 were placed so as to touch the ends of the preformed tile bodies 311, 312 in such positions as the trimmed parts were placed. FIG. 63(*b*) shows a state obtained by the above operation. At this time, as shown in FIG. 63(*b*), the joining granules were densely packed in a bar shaped space of 25 mm square section which was defined by the end surfaces of the two preformed tile bodies 311, 312. Moreover, the rest of the joining granules buried an inside part defined by touching edges of the two preformed tile bodies 311, 312.

Then, in an angle tile body forming step S564, the upper mold of reversed V-section corresponding to the section of the lower mold 431 is pressed against the lower mold 431 at a pressure of 400 $kg/cm^2$, thereby obtaining an angle tile body without any cutting works needed. Since the thickness of the trimming metal fittings 436, 437 as an alternate of the trimmed part is set into 80% that of each preformed tile body 311, 312, they never hinders the pressing work of the angle tile body into one body.

Thereafter, in a burning step S565, as in the twelfth embodiment, the angle tile body was burned to obtain the angle tile 270. The angle tile 270 has the main plate 271 300 mm wide, 300 mm long and 20 mm thick and the bent plate 272 300 mm long, 50 mm wide and 20 mm thick at opposite sides of the rectangular corner 273 shown in FIG. 54(*b*). The main plate 271 has a pattern composed of a pair of symmetrically arranged semicircles, one of which is yellow and the other of which is green, and the rest part which is white. The bent plate 272 has a pattern of white color which is the same as the adjacent part of the main plate 271.

As mentioned above, this embodiment of the angle tile 270 is made by: disposing the plate like preformed tile bodies 311, 312 having colored patterns thereon on both the slopes of the lower mold 431 of V-section; disposing the joining granules of the same material between the end surfaces of the preformed tile bodies 311, 312 along the lowermost corner of the lower mold 431; and pressing them between the upper mold 432 and the lower mold 431 into one body, and burning it.

According to this embodiment, as in the twelfth embodiment, it is possible to provide an angle tile which has a colored pattern and a good apearance.

The manufacturing method of the angle tile in this embodiment comprises: the preformed tile body forming step S561 for forming the plate shaped preformed tile bodies 311, 312 having the colored patterns thereon; the joining granules forming step S562 for forming the joining granules which are the same material as those of the preformed tile body 311, 312; the preformed tile body and joining granule disposing step S563 for disposing the preformed tile bodies 311, 312 on both the slopes of the lower mold 431 and the joining granules between the end surfaces of the preformed tile bodies 311, 312 along the corner of the lower mold 431; the angle tile body forming step S564 for pressing the preformed tile bodies 311, 312 and the joining granules between the upper mold 432 and the lower mold 431 to form the angle tile body; and the burning step S565 for burning the angle tile body.

According to this embodiment, it is possible to provide an angle tile having a colored pattern with simple steps. Moreover, in this embodiment, since the trimming metal fittings are used, there is no need to provide the trimmed part on the preformed tile body.

Fourteenth Embodiment

Next, the fourteenth embodiment of the invention will be described referring to FIGS. 64 to 67, taking the angle tile 280 of FIG. 54(*c*) as an example.

In FIG. 54(*c*), the angle tile 280 has the main plate 281 and the bent plate 282 at opposite sides of the rectangular corner 283. Each of the main plate 281 and the bent plate 282 is provided with a spread mottled pattern continually.

This angle tile 280 was manufactured as below, according to the manufacturing steps similar to those of the twelfth embodiment.

Figure 64:
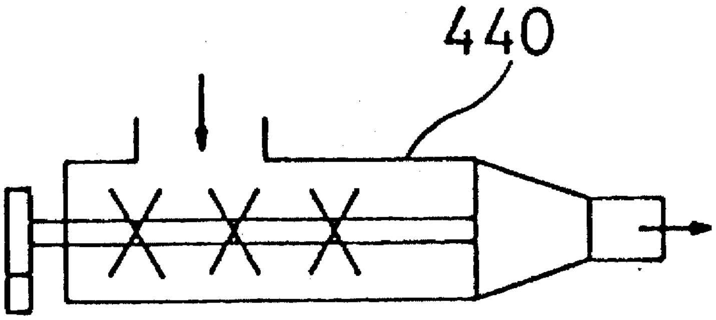
FIG. 64 is a schematic drawing showing an extruder used in a preformed tile body forming step and a joining bar forming step of the fourteenth embodiment of the invention.
Figure 65:
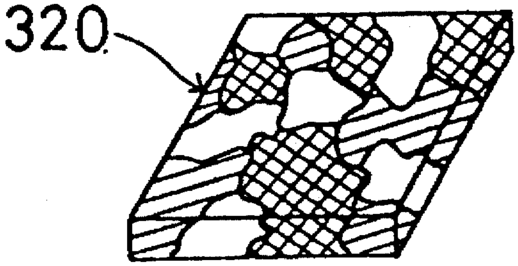
FIG. 65 is a perspective view showing a preformed main plate body formed in the preformed tile body forming step of the fourteenth embodiment of the invention.
Figure 66:
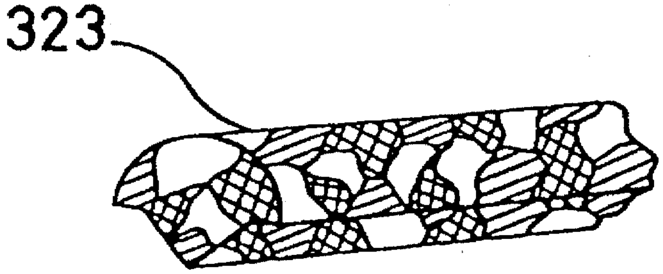
FIG. 66 is a perspective view showing a joining bar molded by the extruder of FIG. 64.
Figure 67:
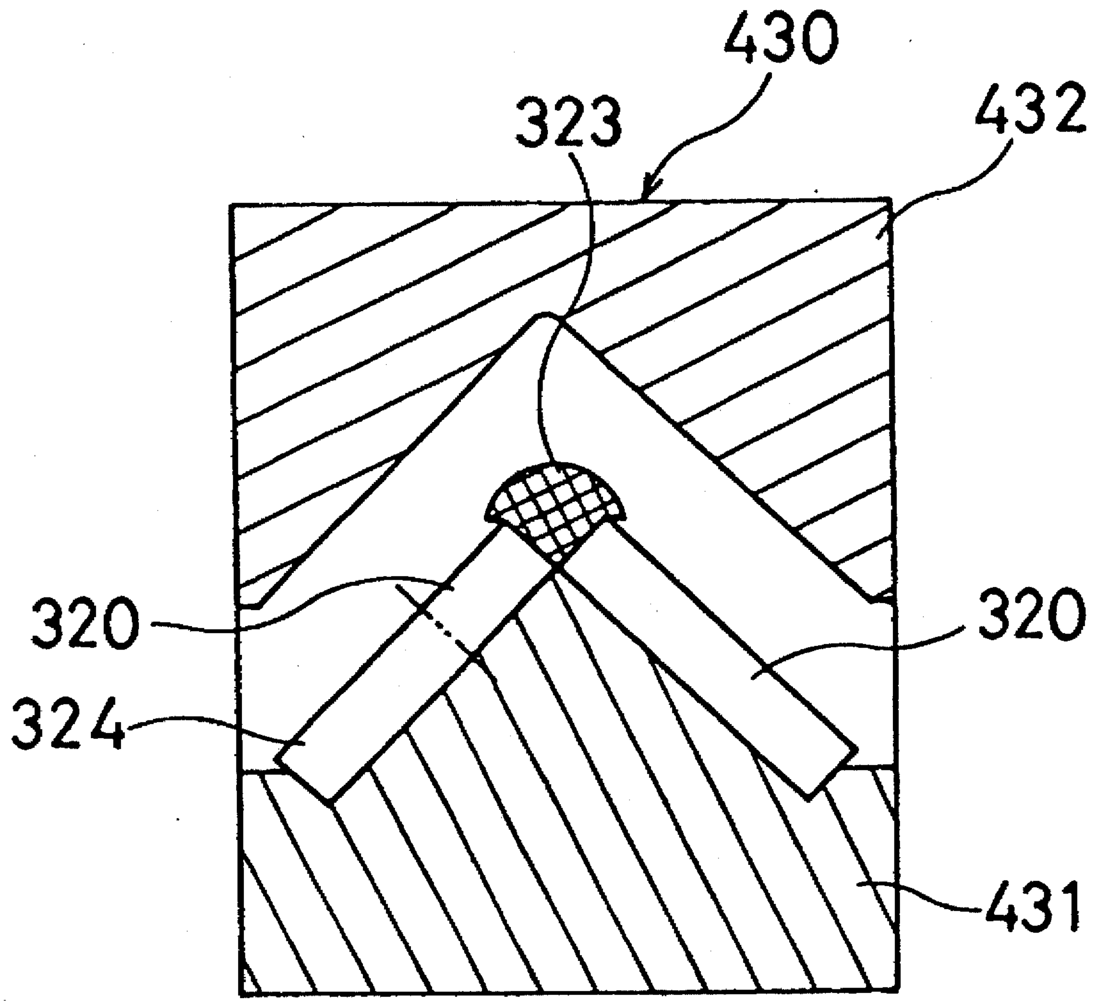
FIG. 67 is an explanatory drawing of a used state of a pressing die of an angle tile pressing machine used in the fourteenth embodiment of the invention.

FIG. 64 shows an extruder 440 used in the preformed tile body forming step S551 and the joining bar forming step S552. FIG. 65 shows a preformed tile body 320 formed in the preformed tile body forming step S551. FIG. 66 shows a joining bar 323 molded in the joining bar forming step S552. FIG. 67 shows a press die 430 in the angle tile press machine used in the angle tile body forming step S554.

First, in the preformed tile body forming step S551, the preformed tile body 320 was fabricated as follows.

Three kinds of colored granules (white, dark brown and blue) were prepared by: adding 5% white pigment (zircon), 5% dark brown pigment ($Fe_2O_3$-ZnO) and 5% blue pigment (zircon blue or the like) respectively to three crashed mix raw materials similar to that of the twelfth embodiment; further adding water to each of them so that the moisture content became 20%; and kneading each of them. The three kinds of colored clay bodies were respectively put into the extruder 440 shown in FIG. 64. Then, each clay body was extruded from a mouthpiece of 25 mm diameter (not shown), thereby molding white, dark brown and blue bars each of which is 1000 mm long and of a circular section. Thereafter, three kinds of colored round bars were gathered and piled in four rows and four lines while arranging the colors at random. Then, the gathered body was vertically cut at 25 mm intervals in the longitudinal direction. The cut pieces were half-dried by air drying at a temperature of not more than 50° C. The half-dried cut pieces were disposed in the forming space 412 of the lower mold 411 of the plate tile press machine 410 while their cut surfaces being faced above. Then, they were pressed at a pressure of 40 kg/cm$^2$ thereby forming nondried body of the preformed tile body 320. At the time of pressing, the cut pieces were deformed and spread, thereby providing the preformed tile body 320 which had a flowing mottled pattern on its surface.

In the twelfth embodiment, two kinds of preformed tile bodies 311 and 312 of different sizes were prepared for the main plate and the bent plate. However, in this embodiment, two preformed tile bodies 320 of the same size were joined, and one of them was cut off in half to make a bent plate 282. Therefore, in this embodiment, only one size of preformed tile body 320 was prepared which had a dimension subtracting the dimension of the trimmed part from the dimension of the preformed main plate body 301 of the twelfth embodiment.

Thus obtained nondried preformed tile body 320 was further air-dried at a temperature of not more than 50° C., thereby forming the preformed tile body 320 shown in FIG. 65. Thus dried preformed tile body 320 contracted to 105 mm square due to evaporation of moisture in comparison with the nondried one.

A press die 430 for forming an angle tile body has a lower mold of reversed V-section. So, in a joining bar forming step S552, a joining bar 323 was formed into a section that was fitted in a space of generally V-shape defined between end surfaces of the preformed tile bodies 320, when two tile bodies 320 were disposed on opposite slopes of the lower mold 431. A making process thereof will be described hereunder.

In making the joining bar 323, the three kinds of colored round bars used in forming the preformed tile body 320 were cut respectively into a length of 25 mm. The same number of the cut pieces of each color were mixed and kneaded until they made mottled pattern. Thereafter, they were put into the extruder of FIG. 64. The kneaded material was extruded from a mouthpiece (not shown) which had a shape composed of a semicircle of 30 mm diameter and an isosceles right triangle of 15 mm side with its bottom connected to a chord of the semicircle. The extruded body was cut into a length of 110 mm, then dried 24 hours at a temperature of not more than 50° C. Thus, The joining bar 323 having a spread mottled pattern was obtained as shown in FIG. 66.

Next, in a preformed tile body and joining bar disposing step S553, two preformed tile bodies 320 were disposed respectively on opposite slopes (107 mm wide, 107 mm long and 15 mm deep) of the lower mold 431 of reversed V-section of the press die 430. A V-section space was defined by the upper end surfaces of thus disposed two preformed tile bodies 320. Next, the joining bar 323 having the spread mottled pattern was disposed and fitted in the space between the two preformed tile bodies 320.

Then, in an angle tile body forming step S554, as shown in FIG. 67, the upper mold 432 of a V-section corresponding to the section of the lower mold 431 was pressed against the materials on the lower mold 431 at a pressure of 60 $kg/cm^2$, thereby making an angle tile body. This angle tile body was dried sufficiently at a temperature of not more than 100° C., and cut off by a cutter at such a position (a position shown by a two-dot chain line of FIG. 67) as the length of the bent plate 282 was 50 mm.

In the present embodiment, the bent plate 282 was obtained by cutting the preformed tile body 320, because the pattern on the preformed tile body 320 is a spread mottled one and it is hard to obtain the same pattern except the square shape. The cut parts were used for manufacturing another angle tiles.

In a burning step S555, the angle tile body was burned under the same condition as the twelfth embodiment, thereby making the angle tile 280 shown in FIG. 54(*c*). The tile 280 has the main plate 281 100 mm wide, 10 mm long and 10 mm thick and the bent plate 282 100 mm long, 50 mm wide and 10 mm thick at both sides of the rectangular corner 283. Both the main plate 281 and the bent plate 282 have the tricolor spread mottled pattern of white, blue and dark brown continually formed on their surface.

As mentioned above, this embodiment of the tile 280 is made by: disposing the plate shaped preformed tile bodies 320 having the spread mottled pattern respectively on the opposite slopes of the lower mold 431 of reversed V-section; disposing the joining bar 323 of the same material as those of the preformed tile body 320 between the end surfaces of these preformed tile bodies 320 along the peak of the lower mold 431; pressing them between the upper mold 432 and the lower mold 431 into one body; and burning it.

The manufacturing method of this embodiment of the tile comprises: the preformed tile body forming step S551 for forming the plate shaped preformed tile body 320 having the spread mottled pattern thereon; the joining bar forming step S552 for forming the joining bar 323 of the same material as the preformed tile body 320; the preformed tile body and joining bar disposing step S553 for disposing the preformed tile bodies 320 respectively on the opposite slopes of the lower mold 431 of reversed V-section and the joining bar 323 between the end surfaces of the preformed tile bodies 320 along the peak of the lower mold 431; the angle tile body forming step S554 for pressing the preformed tile bodies 320 and the joining bar on the lower mold 431 by the upper mold 432 into one body so as to make the angle tile body; the burning step S55 for burning the angle tile body.

According to the angle tile and its manufacturing method of this embodiment, the same advantageous effects can be obtained as the twelfth and thirteenth embodiment.

Fifteenth Embodiment

The fifteenth embodiment of the invention will be described referring to FIG. 68, taking the angle tile 290 of FIG. 54(*d*) as an example.

In FIG. 54(*d*), the angle tile 290 has the main plate 291 and the bent plate 292 at both sides of the rectangular corner 293. The main plate 291 has the same pattern as that of the angle tile 260 of FIG. 54(*a*). The bent tile 292 has a pattern similar to that of the main plate 291 (a pattern obtained by cutting the pattern of the preformed main plate body 301 in half). The patterns on the main plate 291 and the bent plate 292 are continuously provided.

This angle tile 290 was manufactured as below according to steps similar to those of the thirteenth embodiment.

First, in a preformed tile body forming step S561, a preformed main plate body 301 was made by use of the plate tile press machine 410 used in the twelfth embodiment. A preformed bent tile body 332 was made by use of a partition plate (not shown) so that the pattern became a pattern obtained by cutting the pattern of the preformed main plate body 301 in half. The thickness of the preformed tile bodies 301, 332 was 10 mm.

In a joining granule forming step S562, joining granules were prepared by adding 1% CMC to the black granules used in forming the preformed tile body 301, 332.

Next, in a preformed tile body and joining granule disposing step S563, the preformed tile bodies 301, 332 and the joining granules were disposed on the lower mold 431 of V-section, as in the thirteenth embodiment. However, in this embodiment, the black granules were filled by use of the aluminium frame 435 103 mm long, 20 mm high and 10 mm wide. Moreover, the black granules were disposed as a lining material over the preformed tile bodies 301, 332 in a uniform thickness of 6 mm.

Figure 68:
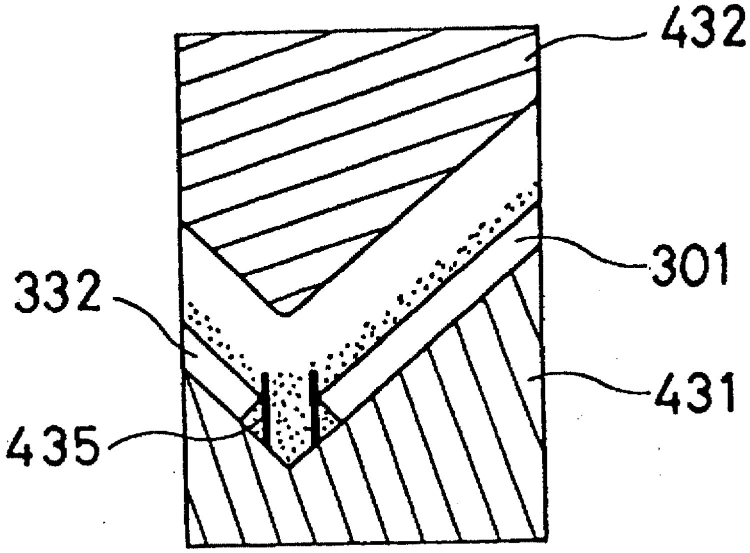
FIG. 68 is an explanatory drawing of a used state of a pressing die of an angle tile pressing machine used in the fifteenth embodiment of the invention.

Then, in an angle tile body forming step S564, as shown in FIG. 68, the materials on the lower mold 431 were pressed by the upper mold 432 to form an angle tile body. The thickness of the angle tile body was 13 mm.

Thereafter, via similar steps to those of the thirteenth embodiment, the angle tile 290 was obtained as shown in FIG. 54(*d*). The angle tile 290 has the main plate 291 and the bent plate 292 of the same dimension as those of the twelfth embodiment. The main plate 291 has the same pattern as that of the main plate 261 of the twelfth embodiment. The bent plate 292 has the pattern similar to that of the main plate 291 (the pattern cutting the pattern of the main plate 291 in half). The patterns of the main plate 291 and the bent plate 292 are continuously provided.

As mentioned above, the present embodiment of the tile 290 is made by: disposing the preformed tile bodies 301, 332 having the colored pattern respectively on the opposite slopes of the lower mold 431 of V-section; disposing the joining granules of the same material between the end surfaces of these preformed tile bodies 301, 332 along the corner of the lower mold 431; and pressing them by the upper mold 432 into one body and burning it.

The manufacturing method of the present embodiment of the tile comprises: the preformed tile body forming step S561 for forming the plate shaped preformed tile bodies 301, 332 having the colored pattern thereon; the joining granules forming step S562 for forming the joining granules of the same material as that of the preformed tile body 301, 332; the preformed tile body and joining granule disposing step S563 for disposing the preformed tile bodies 301, 332 on the opposite slopes of the lower mold 431 of V-section and the joining granules between the end surfaces of the preformed tile bodies along the edge of the lower mold 431; the angle tile body forming step S564 for pressing the preformed tile bodies 301, 332 and the joining granules between the lower mold 431 and the upper mold 432 into one body thereby obtaining the angle tile body; the burning step S565 for burning the angle tile body.

Accordingly, it is possible to provide an angle tile having a colored pattern and a good appearance as in the twelfth embodiment. It is also possible to provide an angle tile reinforced by lining, since the granules are used as a lining material.

Sixteenth Embodiment

The angle tile 260 of FIG. 54(*a*) may be manufactured as follows. Such modification will be described referring to FIG. 69.

This angle tile 260 was manufactured as below according to the steps of the thirteenth embodiment.

First, in the preformed tile body forming step S561, only a preformed main plate body 301 was formed as in the twelfth embodiment.

Then, in the joining granule forming step S562, joining granules were prepared by adding 1% CMC to the mixture of the white granules and the blue granules which were used in manufacturing the preformed main plate body 301.

Figure 69:
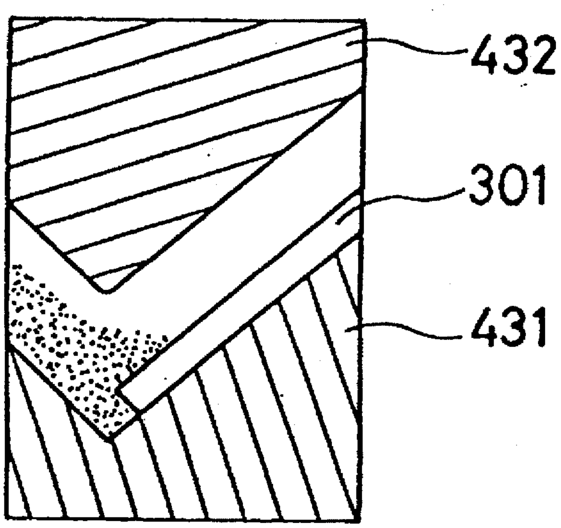
FIG. 69 is an explanatory drawing of a used state of a pressing die of an angle tile pressing machine used in the sixteenth embodiment of the invention.
Figure 70A:
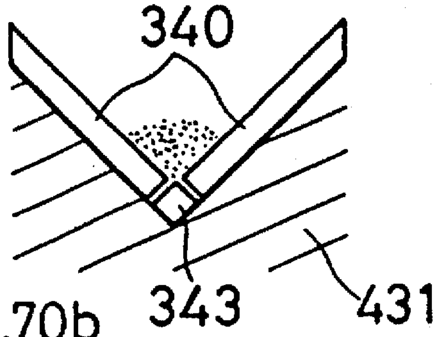
FIG. 70(*a*) is an explanatory drawing showing a modified mode of an arranging manner of materials in an arranging step of a preformed tile boy and a joining bar in each of the twelfth to sixteenth embodiments of the invention.
Figure 70B:
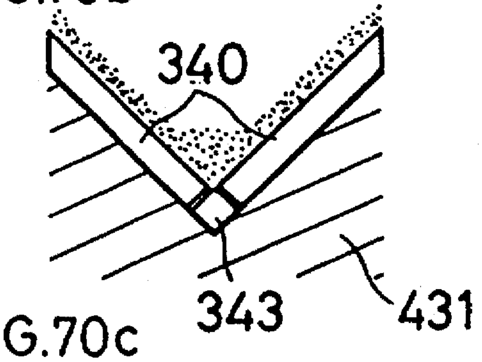
Figure 70C:
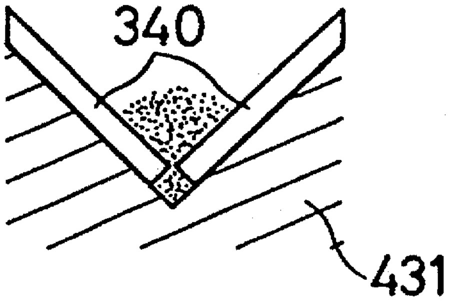
Figure 70D:
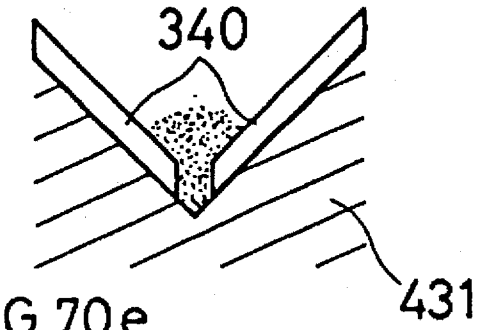
Figure 70E:
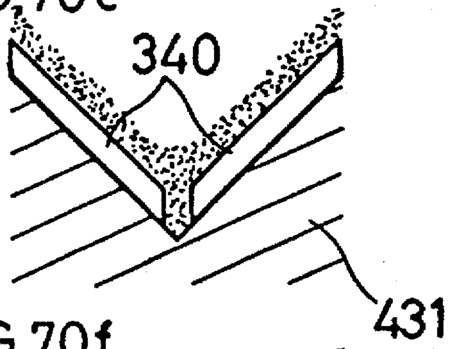
Figure 70F:
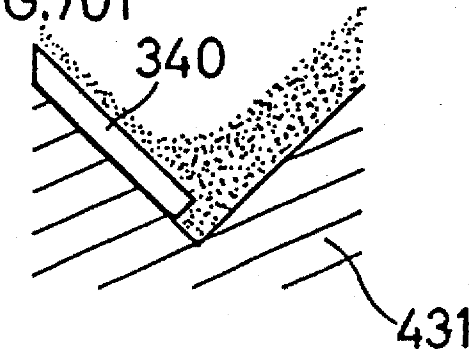

Next, in the preformed tile body and joining granule disposing step S563, the preformed tile body 301 was disposed on one slope of the lower mold 431 of V-section. On the other hand, the joining granules were disposed and filled on the other slope of the lower mold 431 as well as the corner of the lower mold 431, as shown in FIG. 69. This filled layer of the joining granules had a thickness twice that of the preformed main plate body 301. Particularly, the joining granules were filled over the corner of the lower mold 431 up to a maximum thickness of 10 mm.

Then, in the angle tile body forming step S564, the upper mold 432 of reversed V-section corresponding to the section of the lower mold 431 was pressed against the lower mold 431 to form an angle tile body. Trimmed parts 304 were cut off as in the twelfth embodiment. The burning step S565 was carried out under the same condition as the twelfth embodiment, thereby obtaining the angle tile 260 shown in FIG. 54(*a*) as in the twelfth embodiment.

As mentioned above, this modification of the angle tile is made by: disposing the plate shaped preformed tile body 301 having the colored pattern on the one slope of the lower mold 431 and the joining granules of the same material as that of the preformed tile body 301 on the other slope and the corner of the lower mold 431; and pressing them by the upper mold 432 into one body and burning it.

The manufacturing method of this modification comprises: the preformed tile body forming step S561 for forming the plate shaped preformed tile body 301 having the colored pattern; the joining granule forming step S562 for forming the joining granules of the same material as that of the preformed tile body 301; the preformed tile body and joining granule disposing step S563 for disposing the preformed tile body 301 on one slope of the lower mold 431 of V-section and the joining granules on the other slope and the corner of the lower mold 431; the angle tile body forming step S564 for pressing the preformed tile body 301 and the joining granules between the lower mold 431 and the upper mold 432 into one body, thereby forming the angle tile body; and the burning step S565 for burning the angle tile body.

According to this modification, the same advantages can be obtained, too, as in the twelfth embodiment.

In the above embodiments, the disposing works of the materials in the preformed tile body and joining bar disposing step S553 and the preformed tile body and joining granule disposing step S563 may be carried out as follows.

FIGS. 70(*a*) and 70(*b*) respectively show the case in which a joining bar is used. Specifically, FIG. 70(*a*) shows the case in which lining powders were disposed over a contact portion or border line of two preformed tile bodies 340 and the joining bar 343. FIG. 70(*b*) shows the case in which lining powders were disposed in a uniform thickness over all the two preformed tile bodies 340. Such angle tile has a corner made stronger.

FIGS. 70(*c*), 70(*d*) and 70(*e*) respectively show the case in which joining granules are used. Specifically, FIG. 70(*c*) shows the case in which the joining granules were disposed as a lining material over the facing ends of the two preformed tile bodies 340, in addition to being filled therebetween. FIGS. 70(*d*) and 70(*e*) respectively show the case in which an inside end of a preformed tile body 340 is slanted so as to facilitate filling the joining granules between end surfaces of the preformed tile bodies 340. More in detail, FIG. 70(*d*) shows the case in which the joining granules were filled as a lining material over the facing inside end surfaces thereof. FIG. 70(*e*) shows the case in which the joining granules were filled over all the preformed tile bodies 340 as a liner.

FIG. 70(*f*) shows the case in which the preformed tile body 340 was disposed on one slope of the lower mold 431 and the lining powders were disposed on the other slope and the corner of the lower mold 431, over the preformed tile body 340 and the joined part of the preformed tile body 340 and the lining powders.

In the twelfth to sixteenth embodiments, the preformed tile body may be any other forms so long as it is plate shaped. The pattern on its surface may be desirously changed, and if desired, it may be a plain pattern of one color. This preformed tile body may be formed by pressing a powder material or a clay body, for example, as in generally known tiles. In this case, it is preferable to set a pressure in pressing into a relatively low value. Thereby, the preformed tile body is further compressed when finally being pressed into an angle shape, so as to be strongly joined to the joining bar or granules. However, it is not preferable to mold it at an excessively low pressure, since the obtained colored pattern change in pressing it into the angle shape. Generally, it is preferable to set the pressure in forming the preformed tile body into one half to two thirds of a pressure in making finally the angle tile body. The pressure in pressing it into the angle shape is equal to a pressure for pressing common tiles or angle tiles. Preferably, the preformed tile body is formed into a width a little smaller than that of the lower mold so as to facilitate its disposing on the lower mold.

The joining bar and the joining granules are joined integrally with the preformed tile body to define the corner of the angle tile, so that they may be made of any material inasmuch as it has the same quality as that of the preformed tile body. "The same quality" means that the material is substantially the same in terms of composition so that there arise no remarkable differences in sintering temperature or the like. Preferably, the joining bar or granules have the same composition, including the component of the pigment, as that of the preformed tile body so that the colored pattern of the angle tile is made continuous including the corner. It is preferable to add an adhesive to these joining bar or granules so as to improve a joining property at the time of pressure forming with the preformed tile body as well as to prevent cracks at the time of burning. A cellulose ether like CMC or a synthetic resin or the like may be used.

The joining bar of such material may be formed by any desired method like extruding of a clay body or pressure forming of powders or the like. It is preferable to make its density approximately the same as that of the preformed tile body in view of uniformity of the angle tile when it is finished. Therefore, it is most preferable to form it by a method and under a condition similar to those of the preformed tile body. The joining bar needs to have such a section as to be filled as close as possible between the end surfaces of the preformed tile bodies on the slopes of the lower mold.

A normal powder material may be used as it is for the joining granules. However, it is advantageous to use a material in the form of pelletized granules. These granules can be made by adding water to a powder material, mixing and crushing it by a trommel or the like into a slip, and then pelletizing it into granules of a predetermined moisture content by a spray drier or the like. Since the granules are nonsticky and smooth, it improves workability. Moreover, the granules can flow easily to be filled over all between the end surfaces of the preformed tile bodies which are disposed on the opposite surfaces of the lower mold. In case the preformed tile body is made by pressure forming of a powder material, the joining granules may be the same as the powder material. The joining granules can be auxiliarily used in case a filling state of the joining bar is not satisfactory between the end surfaces of the preformed tile bodies.

While the preformed tile body and the joining bar or granules are disposed on the lower mold of the press die which defines a pressure forming space of angle shape, the lower mold may be a V-section or a reversed V-section. In case the lower mold is a reversed V-section, it is not preferable to use the joining granules. In case of providing an angle tile of relatively large size, the lower mold is preferably a V-section. A lining powder material may be further disposed on these materials on the lower mold. This provides an angle tile reinforced by the liner.

While, the angle tile and its manufacturing method of the twelfth to sixteenth embodiments were described, mainly taking as an example the angle tile composed of short and long tiles joined integrally by the rectangular corner, other modifications are possible. For example, The tiles joined by the corner may have the same length or other desired lengths. The corner may have a desired angle other than the right angle or may be curved.

The device used in the twelfth to sixteenth embodiments is not limited to the above described one. Any type of device which has been already used in a ceramic industry or the like may be chosen for the use. Or some change to the conventional device is possible.

Seventeenth Embodiment

A seventeenth embodiment of the invention will be described referring to FIGS. 71 to 76. A tile of this embodiment is also applicable to stepped parts of stairs or roads.

Figure 71:
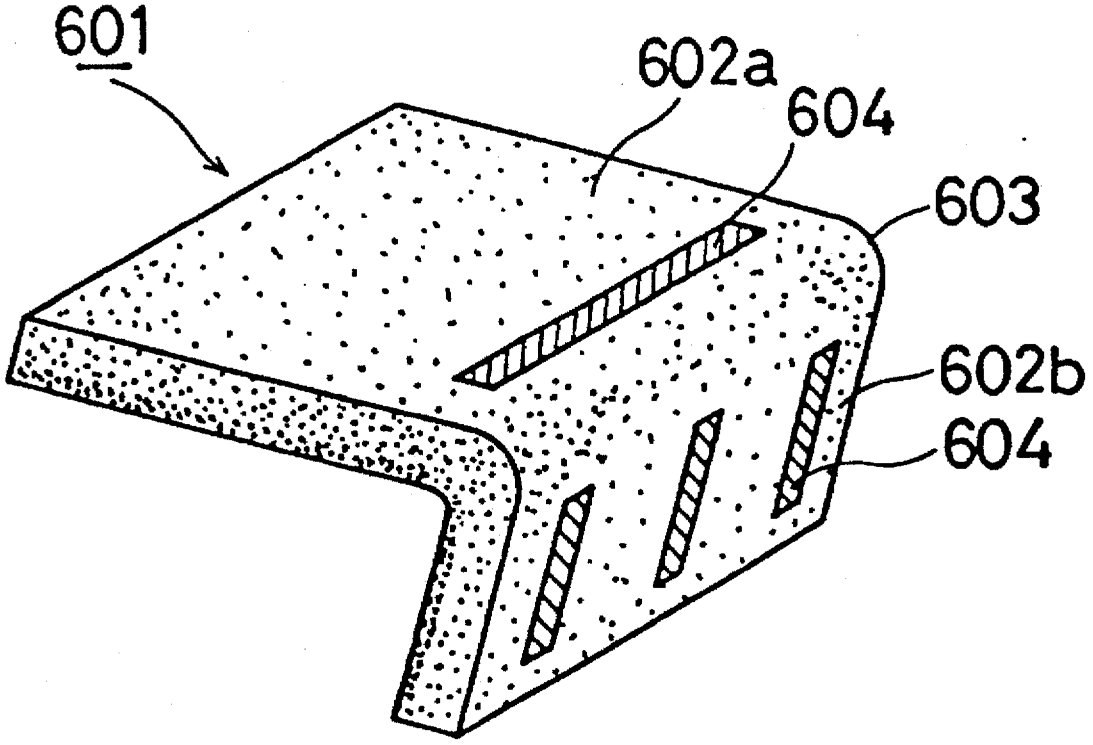
FIG. 71 is a perspective view of a seventeenth embodiment of an angle tile of the invention.

In FIG. 71, An angle tile 601 has a pair of plate tiles 602*a*, 602*b* and a corner 603 joining them at right angle. This tile 601 is used at the stepped part while putting the long plate tile 602*a* horizontally and the short plate tile 602*b* vertically. The corner 603 has a surface that is gently curved. The plate tiles 602*a*, 602*b* and the corner 603 have their surfaces uniformly colored as a whole. In this embodiment, the angle tile 601 has a spotted pattern of a light tone that green granules are scattered on a white background in a spotted manner.

In this embodiment of the angle tile 601, a colored pattern 604 for distinguishing the corner is provided on the surface of each plate tile 602*a*, 602*b*. As shown in FIG. 71, a long strip of colored pattern extends in a width direction of the tile near the corner 603, in the plate tile 602*a*. Short strips of colored pattern extend at right angle to the corner 603 and are disposed in parallel in the width direction of the tile, in the plate tile 602*b*. These patterns are colored into dark brown. These colored patterns 604 go through the tile in its thickness direction, so that they are never faded nor vanished if the tile is abraded.

In case of tiling the stepped parts of the stairs or the roads using the angle tiles 601, the colored patterns 604 are arranged along a corner of the stepped part, thereby defining a marking for distinguishing the corner from a flat part in terms of color difference. Thus, such colored patterns 604 attract attention of walkers, so that the walkers can be kept away from danger such as stumbling or the like when they go up and down the stepped parts like stairs, thereby improving safety in such going up and down.

This embodiment of the angle tile 601 is manufactured by a similar manufacturing method to that of the twelfth embodiment, in accordance with the process shown in FIG. 55.

Preformed Tile Body Forming Step

Figure 72:
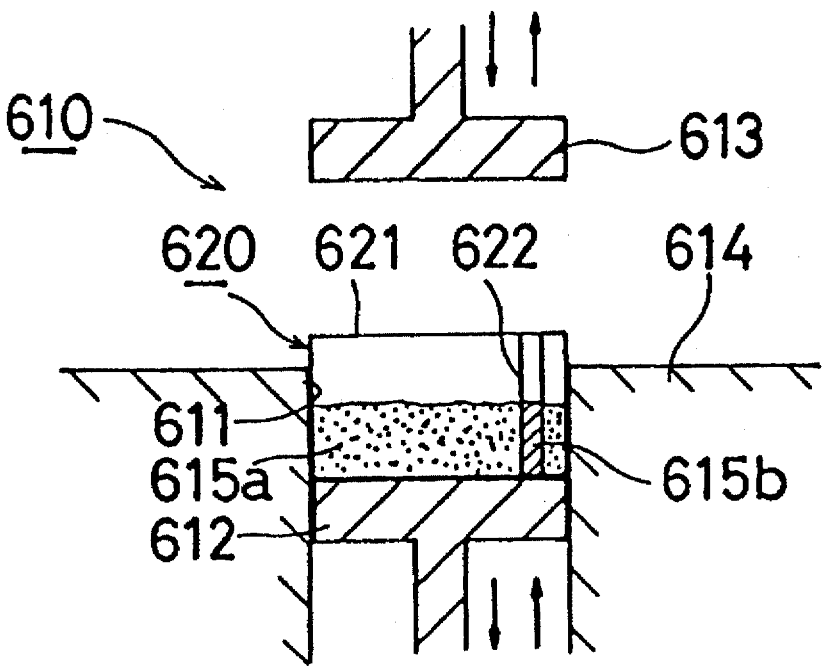
FIG. 72 is a sectional view of a pressure forming machine showing a process of filling colored granules in a pressure forming die in a preformed tile body forming step.
Figure 73:
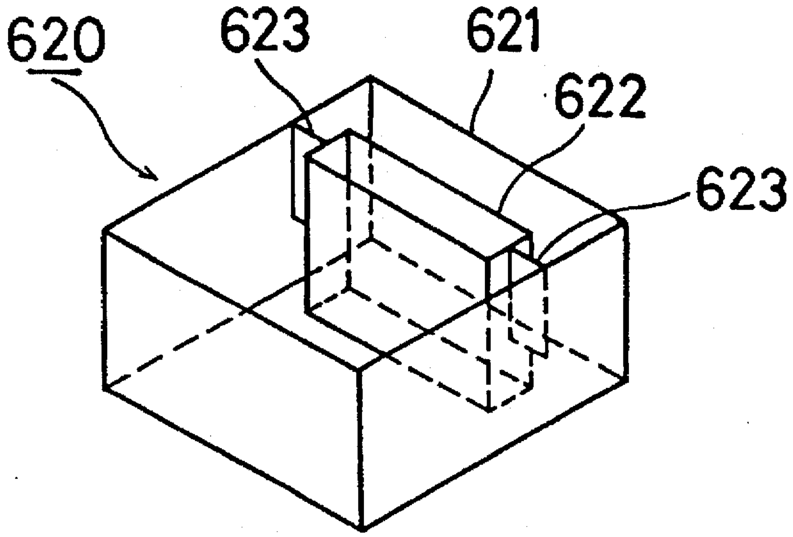
FIG. 73 is a perspective view of a partition plate used in filling the colored granules in the pressure forming die in the preformed tile body forming step.

In this embodiment, a preformed tile body is pressingly formed by use of a pressure forming machine 610 shown in FIG. 72 and a partition plate 620 shown in FIG. 73. The pressure forming machine 610 is composed of a pressure forming die 611, a vertically movable lower mold 612, a vertically movable upper mold 613 and a fixed frame 614.

The partition plate 620 is composed of a square outer frame 621, a partition wall 622 disposed inside thereof and joints 623 joining the partition wall 622 to the outer frame 621. The outer frame 621 is made into such a shape as to be fitted in the pressure forming die 611 without clearance. The joint 623 is made by a plate. A lower end of the joint 623 does not reach a lower end of the outer frame 621 and the partition wall 622. This partition wall 622 may be modified in various forms according to a desired pattern. Depending on a form of the pattern, at least one of the outer frame 621 and the partition wall 622 may be omitted, and the partition plate 620 may be composed of the partition wall 622 and the outer frame 621 or the joints 623. The partition plate 620 may be composed of only the partition wall 622.

The partition plate 620 may be formed by molding a synthetic resin, for example.

Such partition plate 620 was disposed in the pressure forming die 611. As shown in FIG. 72, colored granules 615*a*, 615*b* of different colors were filled respectively in forming spaces up to substantially the same height. In this filling, a proper hopper was used, since openings of the partition plate 620 were small.

The colored granules as a tile forming material were prepared as follows. Namely, three kinds of crushed mix raw materials were prepared: a first material obtained by adding 5% white pigment (zircon) to a base crushed mix raw material consisting of 50% feldspar, 20% china clay and 30% kaolin; a second material obtained by adding 2% green pigment (chromium oxide) to the base crushed mix raw material; a third material obtained by adding 2% dark brown pigment (red oxide) to the base material. These materials were mixed further with 0.5% CMC and water, and mixed in a trommel into a slip. This slip was fed to a spray drier to be granulated and dried. Thus, there were provided white, green and dark brown granules which had an average grain diameter of 500 μm and a moisture content of about 6%. Similarly, uncolored granules were prepared which had no pigments.

A mixture of 70% white granules and 30% green granules were used for the colored granules 615*a* which formed a whole surface of the tile. The dark brown granules were used for the colored granules 615*b* filled into the partition wall 622.

Thereafter, the partition wall was raised and removed out of the pressure forming die 611. Then, the colored granules 615*a*, 615*b* were gently pressed to make their surface flat. The uncolored granules were further filled as a lining material over the colored granules.

The granules in the pressure forming die 611 were pressed and molded into one body between the lower mold 612 and the upper mold 613 at a pressure of 200 $kg/cm^2$. Next, a preformed tile body which was obtained by this pressure forming was taken out by pulling up the upper mold 613 and pushing up the lower mold 612 up to a take-up level.

Figure 74A:
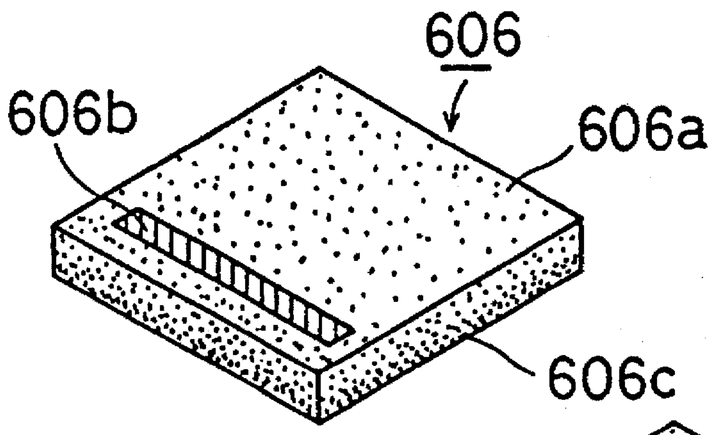
FIG. 74(*a*) is a perspective view of a long preformed tile body formed in the preformed tile body forming step.
Figure 74B:
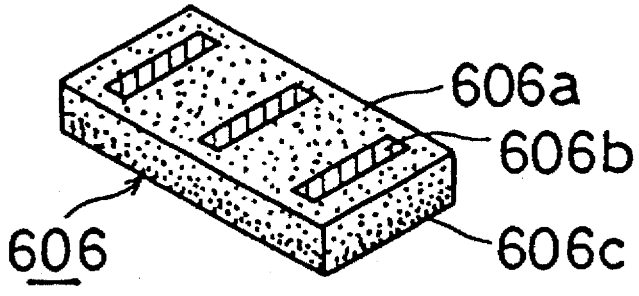

Thus obtained plate shaped preformed tile body 606 is composed of a surface layer 606*a* made of the mixture of colored granules 615*a*, a colored pattern 606*b* made of the colored granules 615*b* and a lining layer 606*c* made of the uncolored granules, as shown in FIG. 74(*a*).

A short preformed tile body 606 was fabricated by use of the same material as the preformed tile body 606 of FIG. 74(*a*) and a similar method thereto.

The preformed tile body 606 of FIG. 74(*b*) has a length of one half of the length of the one 606 of FIG. 74(*a*), and forms the short plate tile 602*b* of the tile 601 of FIG. 71. A partition plate 620 used in making the short preformed tile body 606 has three partition walls 622 corresponding to the colored patterns 606*b*. While the short preformed tile body 606 was fabricated by a pressure forming die of a dimension corresponding to a dimension thereof, the pressure forming die 611 for making the long preformed tile body 606 can be used as it is. In this case, the short preformed tile body 606 is obtained by cutting the long preformed tile body 606 in half.

Joining Bar Forming Step

A joining bar 607 was fabricated by use of the mixture of colored granules consisting of 70% white granules and 30% green granules which were used for making the surface layer 606*a* of the preformed tile body 606.

Figure 75:
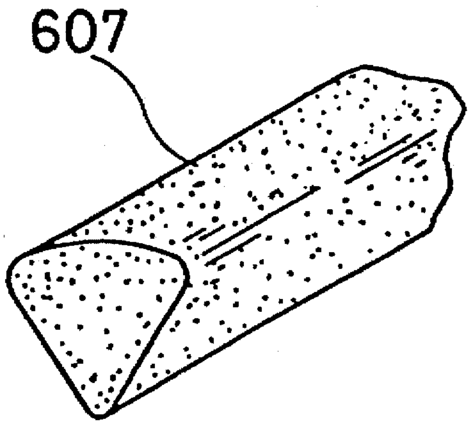
FIG. 75 is a partial perspective view of a joining bar formed in a joining bar forming step.

As shown in FIG. 75, the joining bar 607 has such a section as a bottom of an isosceles right triangle is formed into an arc. This section is substantially equal to a section of a space that is defined between end surfaces of a pair of preformed tile bodies when they are disposed respectively on opposite slopes of a lower mold of an angle tile press die described later. A length of the joining bar 607 is substantially equal to a width of the preformed tile body 606.

The joining bar 607 was pressed and formed at a pressure of about 100 $kg/cm^2$ by use of a pressure forming die of a shape corresponding thereto. This pressure is lower than a pressure in pressing the preformed tile body, so that the joining bar 607 has relatively a little larger dimension.

Preformed Tile Body and Joining Bar Disposing Step

The short and long pair of preformed tile bodies 606 and the joining bar 607 were disposed on the lower mold of the angle tile press die.

Figure 76:
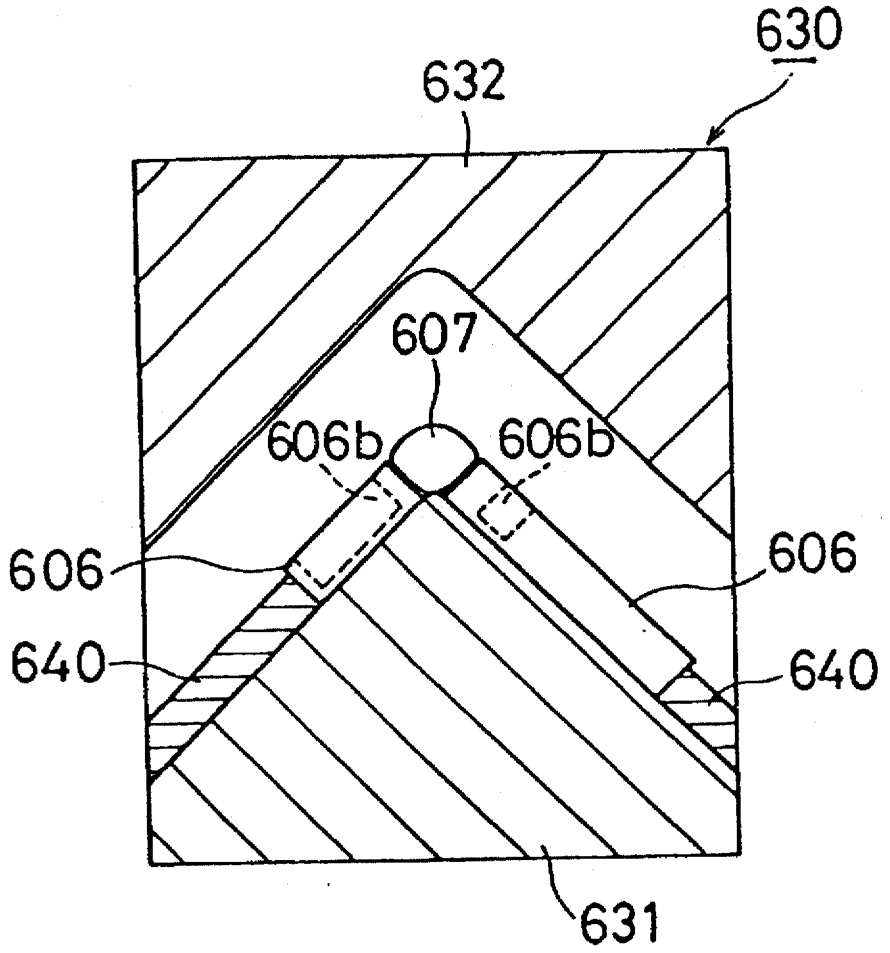
FIG. 76 is a sectional view of an angle tile pressing die showing a state in a preformed tile body and joining bar disposing step.

As shown in FIG. 76, an angle tile press die 630 is composed of a lower mold 631 of reversed V-section and an upper mold 632 of V-section.

The short and long preformed tile bodies 606 were disposed respectively on opposite slopes of the lower mold 631 while having the colored patterns 606*b* faced upside and placed near a peak of the lower mold 631. The joining bar 607 was disposed between the preformed tile bodies 606 along the peak of the lower mold 631. Trimming metal fittings 640 define a forming space over the lower mold 631 correspondingly to a shape of an angle tile to be fabricated.

In this step, if there is made a gap or clearance between the joining bar 607 and the preformed tile bodies 606, granules used for forming the joining bar 607 are preferably filled in such a gap.

Angle Tile Body Forming Step

The preformed tile bodies 606 and the joining bar 607 were pressed into one body between the lower mold 631 and the upper mold 632 to form an angle tile body. A pressure in this pressing is approximately the same level as the pressing of common tiles or angle tiles, but made higher than pressures in pressing the preformed tile body and the joining bar. In this pressing, the preformed tile bodies 606 and the joining bar 607 were further compressed to be joined integrally. In this embodiment, the pressure forming was carried out at a pressure of 400 $kg/cm^2$ to make the angle tile body as one body without any joint line.

Burning Step

The angle tile bodies were put in a chamotte sagger with a distance therebetween, and burned and sintered in a shuttle kiln under a condition of a burning temperature of 1250° C. and a burning time of 30 hours, thereby making angle tiles as finished products.

Thus, the angle tile 601 shown in FIG. 71 was obtained.

While, in this embodiment, the joining bar 607 is the same color as the surface layer 606*a* of the preformed tile body 606, it may be a different color so as to define a colored pattern at the corner of the angle tile for distinguishing it. While, in this embodiment, the surface layer 606*a* of the preformed tile body 606 has only the spotted pattern, a variety of patterns may be provided on the surface of the tile by use of a plurality of colors of granules and a partition plate according to a color arrangement.

Eighteenth Embodiment

An eighteenth embodiment of the invention will be described referring to FIGS. 77 to 81.

Figure 77:
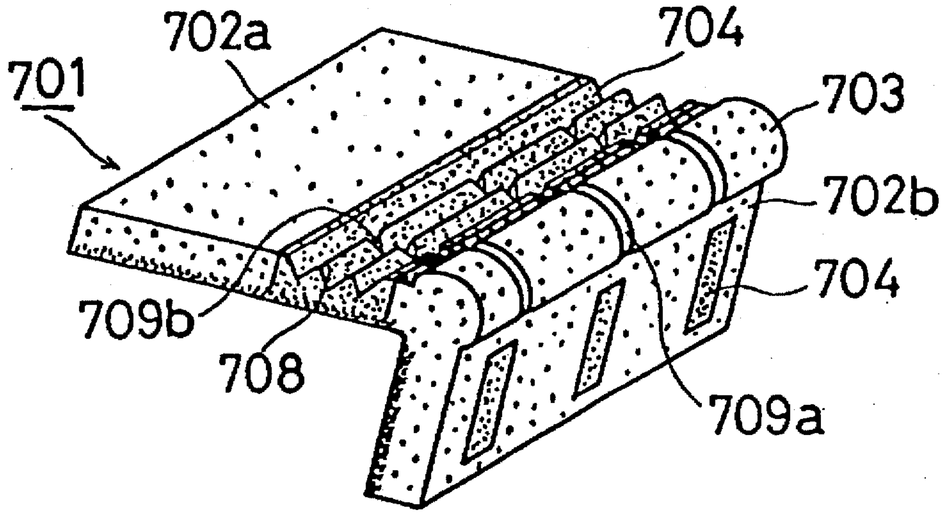
FIG. 77 is a perspective view of an eighteenth embodiment of an angle tile of the invention.

As shown in FIG. 77, an angle tile 701 of this embodiment is composed of a long and short pair of plate tiles 702*a*, 702*b* and a corner 703 joining them at right angle, as in the seventeenth embodiment of the angle tile 601. Colored patterns 704 for distinguishing the corner are provided respectively on the plate tiles 702*a*, 702*b*. The colored pattern 704 of the long plate tile 702*a* has a relatively large width and is formed successively from one end to the other end in the width direction of the tile. These plate tiles 702*a*, 702*b* and the corner 703 have their surfaces colored uniformly and provided with a spotted pattern of light whitish gray tone that light black granules are scattered to make spots on a white background. On the other hand, the colored pattern 704 is a spotted one of a similar color tone to the above color tone, but is made a spotted pattern of relatively dark tone that the light black granules are mixed in larger amount on a white background, thereby being distinguishable by a difference of lightness of the colors.

In this embodiment, a protruded area 708 is further formed on the colored pattern 704 of the long plate tile 702*a* in order to prevent slip. In the illustrated example, the protruded area 708 has a plurality of ribs each of which continuously extends in the width direction of the tile and which have a cross section of a saw shape as a whole. The corner 703 has a curved shape which is bulged out of the surface of the plate tiles 702*a*, 702*b*. This bulged corner 703 is provided with a plurality of grooves 709*a* for drainage along a curved surface thereof. These grooves 709*a* are continuous respectively with grooves 709*b* which are formed on the ribs of the protruded area 708.

Since the present embodiment of the angle tile 701 has the protruded area 708 for preventing slippage, it is possible to assure more safety in going up and down stepped parts. Moreover, shade by the protruded area 708 makes the colored pattern 704 more conspicuous, thereby facilitating the corner distinguishing effects of the colored pattern 704. Since the corner 703 is curved and bulged from the surface of the tile plates 702*a*, 702*b*, it enlarges the corner strength of the angle tile. Moreover, the bulged curved shape of the corner 703 itself can give distinguishing effects of the corner. Since the grooves 709*a* for drainage are formed on the bulged corner 703, they drain water on the plate tile 702*a* in cooperation with the grooves 709*b* of the plate tile 702*a*. These grooves 709*a*, 709*b* also enlarge the distinguishing effects of the corner due to their concavo-convex shapes.

Next, a manufacturing method of the angle tile in the eighteenth embodiment of the invention will be described according to the process shown in FIG. 61. It is basically the same as the manufacturing steps of the seventeenth embodiment, except the joining bar is substituted by joining granules.

Preformed Tile Body Forming Step

A preformed tile body was prepared by pressingly forming colored granules as a tile material, as in the preformed tile body forming step of the seventeenth embodiment.

Figure 78:
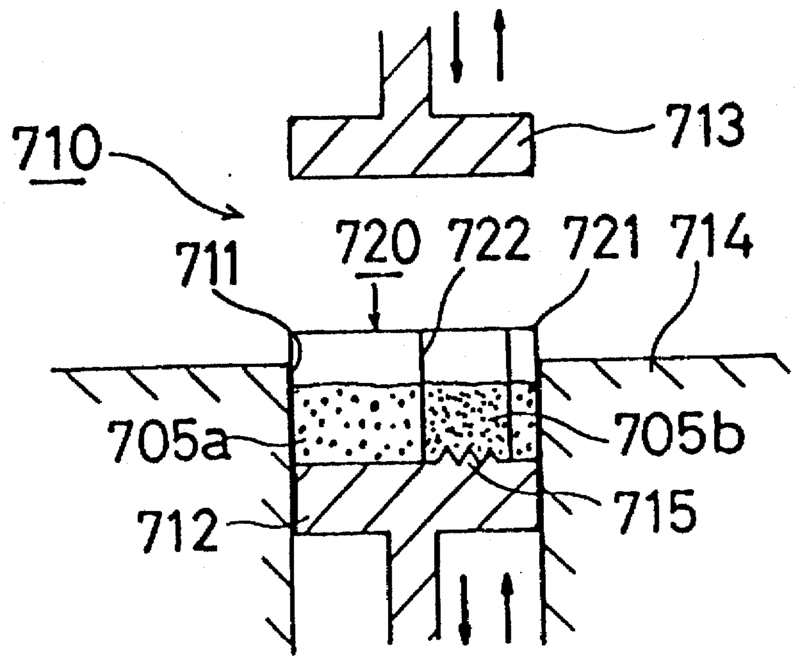
FIG. 78 is a sectional view of a pressure forming machine showing a process of filling colored granules in a pressure forming die in a preformed tile body forming step.

FIG. 78 shows a pressure forming machine 710 used in the pressing work. The pressure forming machine 710 is composed of a pressure forming die 711, a vertically movable lower mold 712, a vertically movable upper mold 713 and a fixed frame 714.

This pressure forming machine 710 is different from the pressure forming machine 610 of FIG. 72 in that a concavo-convex mold surface 715 is provided on an upper surface of the lower mold 712 or a bottom surface of the pressure forming die 711. The concavo-convex mold surface 715 serves to form ribs for preventing slippage on a tile surface. In this embodiment, the mold surface 715 has three lines of crests extending from one lateral end to the other lateral end of the pressure forming die 711. The mold surface 715 is arranged near one longitudinal end of the pressure forming die 711. The mold surface 715 is further provided with projections (not shown) at bottoms between the crests in order to form grooves for drainage. The mold surface 715 is structured in an exchangeable manner on a main body of the lower mold 712.

Figure 79:
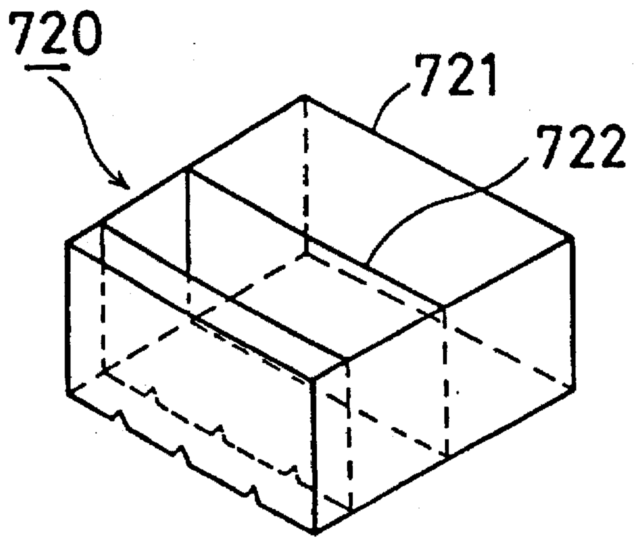
FIG. 79 is a perspective view of a partition plate used in filling the colored granules in the pressure forming die in the preformed tile body forming step.

A partition plate 720 shown in FIG. 79 was used in filling the colored granules as a tile material into the pressure forming die 711, as in the seventeenth embodiment. The partition plate 720 is composed of an outer frame 721 and two partition walls 722, and divided into three spaces by the two partition walls 722. The space defined between the two partition walls 722 has its width and position determined so as to accommodate the concavo-convex mold surface 715 therein.

The partition plate 720 was disposed in the pressure forming die 711. Then, colored granules 705*a* were filled into the two outside spaces each defined between the outer frame 722 and the partition walls 722, as shown in FIG. 78. Colored granules 705*b* were filled in the center space defined between the two partition walls 722. The two kinds of colored granules 705*a*, 705*b* were filled up to substantially the same height. Next, the partition plate 720 was taken up and removed out of the pressure forming die 711. Thereafter, the colored granules 705*a*, 705*b* were gently pressed so as to make their surfaces even. Then, lining granules were further filled over them.

The colored granules 705*a*, 705*b* were prepared as follows, in the same manner as those of the seventeenth embodiment. Namely, a base crushed mix raw material consisting of 50% feldspar, 20% china clay and 30% kaolin was added with 5% white pigment (zircon) as a coloring pigment. They were further added with 0.5% CMC and water and mixed in a trommel into a slip. This slip was put into a spray drier and granulated and dried. Thus, white granules of an average particle diameter of about 400 μm were prepared. Similarly, 2% black pigment (chromite) was mixed in the above base material to prepare light black granules of an average particle diameter of about 700 μm. Moreover, lining granules were prepared with no pigments added into an average particle diameter of about 500 μm. Each kind of the granules has a moisture content of about 6%.

The colored granules 705*a* were composed of 80% white granules and 20% light black granules. The colored granules 705*b* were composed of 60% white granules and 40% light black granules.

The colored granules 705*a*, 705*b* and the lining granules were pressed and molded into one body in the pressure forming die at a pressure of 200 kg/cm$^2$ between the lower mold 712 and the upper mold 713, as in the seventeenth embodiment.

Figure 80:
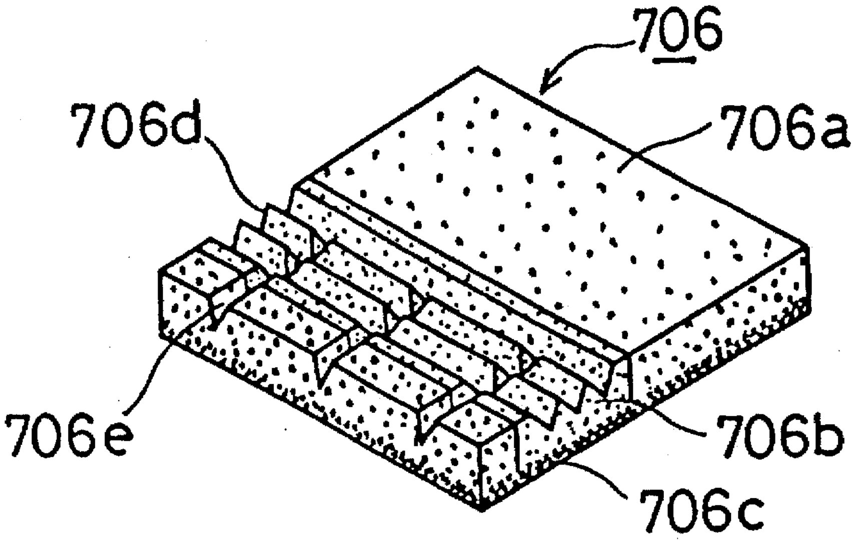
FIG. 80 is a perspective view of a preformed tile body formed in the preformed tile body forming step.

Thus obtained preformed tile body 706 has a surface layer 706*a* made of the mixed colored granules 705*a*, a colored part 706*b* made of the colored granules 705*b* and a lining layer 706*c* made of the lining granules, as shown in FIG. 80. The colored part 706*b* has a protruded area 706*d* for preventing slippage formed by the mold surface 715 of the pressure forming die 711. The colored part 706*b* is further provided with grooves 706*e* for drainage.

On the other hand, there was prepared a short preformed tile body constituting the short plate tile 702*b* in the angle tile 701 of FIG. 77. Here, the short preformed tile body has a structure corresponding to that of the long one 706 of FIG. 80, so the same reference numerals as the long preformed tile body 706 will be attached to the corresponding parts for convenience sake (see FIG. 81). The short preformed tile body was fabricated in the same manner as that of the preformed tile body 606 of FIG. 74(*b*). Still, a surface layer 706*a* was made of mixed colored granules of 80% white granules and 20% light black granules, and colored parts 706*b* were made of mixed colored granules of 60% white granules and 40% light black granules.

Joining Granule Forming Step

The mixed colored granules of 80% white granules and 20% light black granules which were used in fabricating the preformed tile body 706 and the surface layer 706*a* were used for joining granules as they were.

Preformed Tile Body and Joining Granule Disposing Step

The long and short preformed tile bodies 706 and the joining granules were disposed on a lower mold of an angle tile press die.

Figure 81:
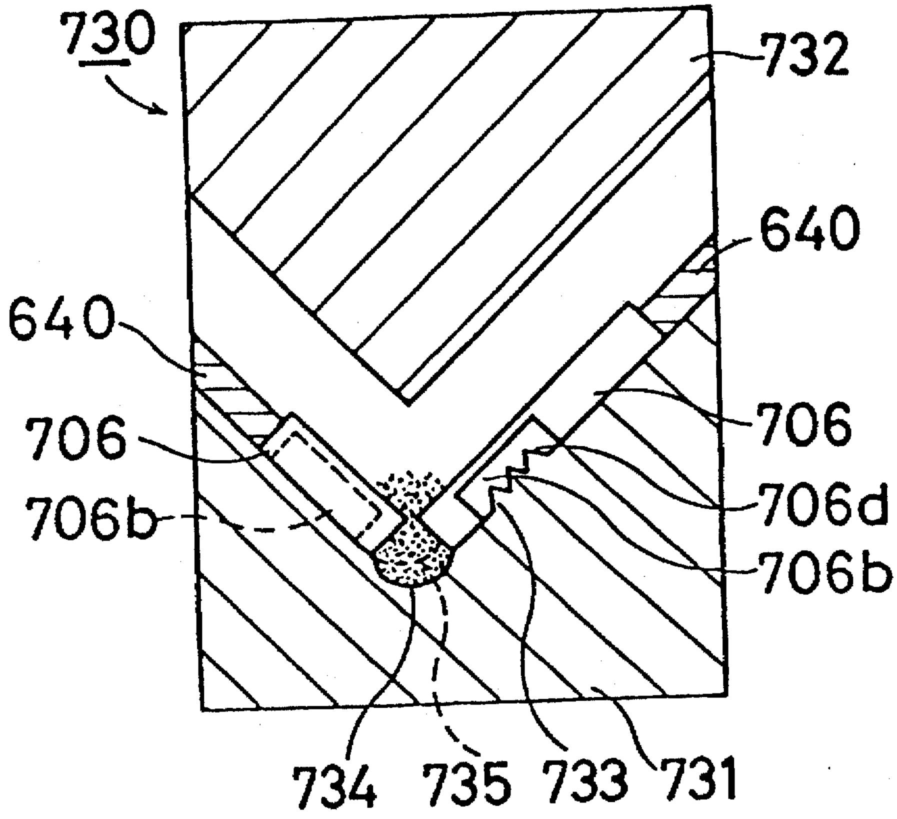
FIG. 81 is a sectional view of an angle tile pressing die showing a state in a preformed tile body and joining bar disposing step.

In FIG. 81, an angle tile press die 730 is composed of a lower mold 731 of V-section and an upper mold 732 of reversed V-section.

The lower mold 731 has a mold surface 733 that is the same shape as that of the concavo-convex mold surface 715 of the pressure forming die 711. This concavo-convex mold surface 733 has ribs which correspond to the slip preventing protruded area 706*d* of the long preformed tile body 706. Thus, it prevents the protruded area 706*d* from deforming at the time of pressing step. Compressed deformation of the preformed tile body 706 is not very large in pressing, so that such a concavo-convex mold surface 733 is not always necessary depending on a shape of the protruded area 706*d*. While, in this embodiment, the mold surface 733 is integrally formed on a surface of the lower mold 731, it may be in such a form as to pack dents of the protruded pattern 706 and define a flat surface.

A lowermost edge part or a bottom 734 of the lower mold 731 has a cross section that is curved and bulged downward. Protrusions 735 are provided along a curved surface of the bottom 734 so as to form the grooves 709*a* for drainage. Though not shown in FIG. 81, one of the slopes of the lower mold 731 has protrusions formed continuously with the protrusions 735. These protrusions (not shown) have a shape corresponding to that of the draining grooves 706*e* of the long preformed tile body 706 and fitted wherein. These protrusions (not shown) are provided principally for preventing the joining granules from intruding into the draining grooves 706*e*. Therefore, these protrusions need not be formed over all the full length of the groove 706*e*.

As shown in FIG. 81, a pair of long and short preformed tile bodies 706 were disposed on the opposite surfaces of the lower mold 731 while their colored surface situated downward. Then, the joining granules were filled between the end surfaces of the preformed tile bodies 706 along the bottom 734 of the lower mold 731.

In this filling the joining granules, the short preformed tile body 706 was moved upward a little along the slope of the lower mold 731 while the end metal fittings 640 was removed. Then, the joining granules were thrown into between the preformed tile bodies 706 through a hopper or a similar frame. Thereafter, the short preformed tile body 706 was pushed downward along the slope of the lower mold 731. The joining granules were disposed in an excessive amount over the bottom 734 of the lower mold 731, taking compression in pressing into account.

Angle Tile Body Forming Step, Burning Step

An angle tile body forming step and a burning step are just the same as the seventeenth embodiment.

Thus, the angle tile 701 shown in FIG. 77 was obtained. The angle tile 701 has the colored pattern 704 formed up to a sufficient depth in the thickness direction thereof and made into one body with the other part thereof. Accordingly, if the tile is abraded strongly, the colored pattern 704 is never vanished nor peeled off.

In this embodiment, the colored granules for the surface layer 706*a* of the preformed tile body 706 are used for the joining granules as they are so that the same color is given to the area from the corner to the plate tiles of the tile. However, the joining granules may be a different color tone from that of the colored granules, so that a corner distinguishing colored pattern is provided on the corner of the tile. While, in this embodiment, the surface layer 706*a* of the preformed tile body 706 is given a simple spotted pattern, plural colors of granules and an appropriate partition plate may be used so that various patterns are formed on the tile surface.

This embodiment provides an angle tile having a thick corner distinguishing colored pattern, that is difficult to obtain in conventional angle tile press dies, and slip preventing protrusions.

Figure 82A:
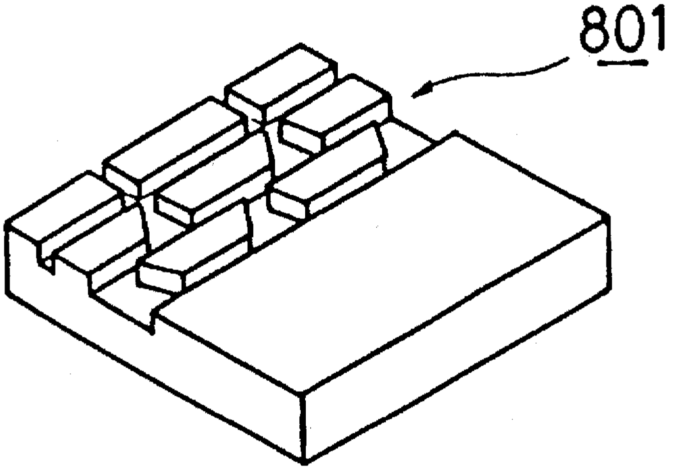
FIG. 82(*a*) is a perspective view showing a modification of slip preventing lugs.
Figure 82B:
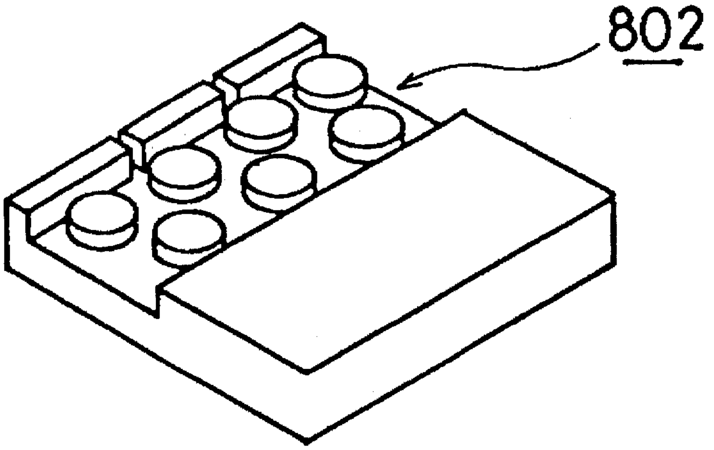
Figure 82C:
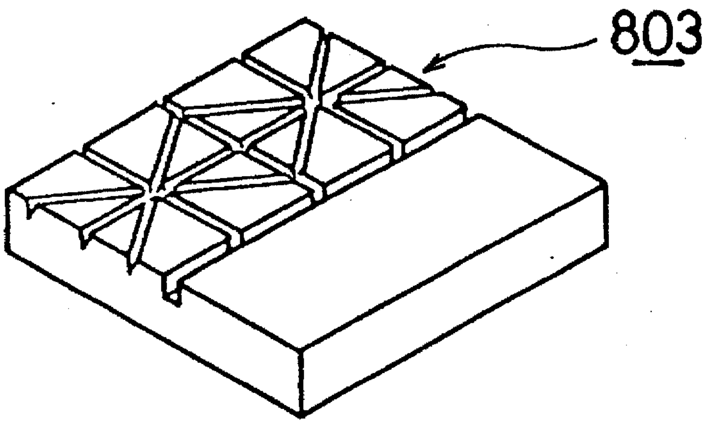

While, in this embodiment, the slip preventing protruded area 708 is formed into a section of a saw, it may have any other shapes some modifications will be shown in FIGS. 82(*a*) to 82(*c*). FIG. 82(*a*) illustrates a slip preventing protruded area 801 which has rectangular protrusions provided in two rows, while each row being arranged along a width direction of a tile. The protrusions of one row are positioned diagonally to those of the other row. FIG. 82(*b*) illustrates a slip preventing protruded area 802 which has circular protrusions provided in two rows, while each row being arranged along a width direction of a tile. The protrusions of one row are diagonally disposed to those of the other row. FIG. 82(*c*) shows a slip preventing protruded pattern 803 which has grooves of V-section provided laterally and longitudinally of a tile, thereby forming concaves and convexes.

The preferred embodiments described herein are therefore illustrative and not restrictive, the scope of the invention being indicated in the appended claims and all variations which come within the meaning of the claims are intended to be embraced therein.

What is claimed is:

1. A method of manufacturing an accessory tile having a plurality of plate portions and a three dimensional shape, said method comprising the steps of:

forming a plurality of tile blanks having plate shapes corresponding to different ones of said plate portions;

providing at least one of said tile blanks with a design having a plurality of colored portions corresponding to the design of said accessory tile;

disposing said tile blanks on a pressure-forming die having a shape corresponding to the shape of said accessory tile;

placing end surfaces of at least two of said tile blanks adjacent to each other to form a gap between said end surfaces;

disposing a moldable joining tile material in said gap;

pressing said tile blanks and said moldable joining tile material with said pressure-forming die to join said tile blanks via said moldable joining tile material so that said tile blanks and said moldable joining tile material form an integral body having a shape corresponding to said three-dimensional shape of said accessory tile; and burning said integral body of said tile blanks and said moldable joining tile material to form said accessory tile such that at least one of said plate portions of said accessory tile includes a design having a plurality of colored portions corresponding to the design of the colored portions of at least one of said tile blanks.

2. A method of manufacturing an accessory tile having an angular shape comprising first and second plate portions, said method comprising the steps of:

pressing a tile material to form a first preformed tile blank having a plate shape corresponding to the shape of said first plate portion;

pressing a tile material to form a second preformed tile blank having a plate shape corresponding to the shape of said second plate portion, at least one of said first and second preformed tile blanks being provided with a design comprising a plurality of colored portions;

disposing said first and second preformed tile blanks in a forming space of a press-forming die having an angular shape corresponding to the angular shape of said accessory tile, and placing one of the end surfaces of each of said preformed tile blanks adjacent to each other with a gap;

disposing a moldable joining tile material in said gap;

pressing said preformed tile blanks and said joining tile material with said press-forming die to join said preformed tile blanks with said joining tile material so that the preformed tile blanks and said joining tile material form an integral body having said angular shape of said forming space of said press-forming die; and burning said preformed tile blanks and said joining tile material to form said accessory tile such that at least one of said plate portions includes a design comprising a plurality of colored portions.

3. The method of claim 2 wherein the steps of pressing a tile material include disposing different colors of said tile materials into an inside space of a pressure-forming die while dividing said different colors from each other in a planar direction of said inside space such that each said color of said tile materials fills the thickness of said inside space, and pressing and integrally forming said tile materials into each said preformed tile blanks in said inside space such that said colored portions extend through the thickness of said preformed tile blanks.

4. The method of claim 2 wherein said joining tile material comprises a joining bar having the shape of said gap and being formed by pressing a tile material into said shape of said gap, wherein the step of disposing said joining tile material in said gap includes disposing said joining bar in said gap, and wherein the step of burning includes forming a corner portion of said accessory tile.

5. The method of claim 4 wherein said tile material of said joining bar and said tile materials of said first and second preformed tile blanks have substantially the same composition and quality.

6. The method of claim 4 further comprising disposing joining granules, made of said tile material of said tile blanks, on said joining bar in said gap.

7. The method of claim 5 wherein the density of said joining bar and the density of said preformed tile blanks are substantially the same.

8. The method of claim 4 wherein said step of disposing said tile material of said joining bar includes adding an adhesive to said tile material of said joining bar.

9. The method of claim 2 wherein said joining tile material comprises joining granules made of said tile material of said tile blanks, and wherein the step of disposing said joining tile material includes filling said gap with said joining granules while keeping said gap in a fixed state.

10. The method of claim 9 wherein said forming space has a V-section and said press-forming die comprises an upper mold and a lower mold between which said V-section is located, and wherein the step of filling said gap with said joining granules comprises the steps of:

interposing a frame, having an inside space for guiding and holding said joining granules, between said preformed tile blanks while keeping said gap therebetween in said fixed state;

filling said inside space of said frame with said joining granules while guiding said joining granules via said frame; and removing said frame to fill said gap while making said preformed tile blanks approach each other along the slopes of said lower mold in said V-section of said forming space.

11. The method of claim 9 wherein the step of filling said inside space of said frame with said joining granules includes adding an adhesive with said joining granules.

12. The method of claim 2 wherein the step of disposing said preformed tile blanks includes disposing a trimming means having a plate shape located at the other end of at least one of said preformed tile blanks, said trimming means having the same thickness as said at least one of said preformed tile blanks and removing said trimming means after performing the step of pressing said preformed tile blanks.

13. The method of claim 2 further comprising the step of disposing granules of a tile material wholly on one surface, in a thickness direction, of said preformed tile blanks joined via said joining tile material, after the step of disposing said first and second preformed tile blanks and before the step of pressing said preformed tile banks, to form a lining layer on the overall surface of said preformed tile blanks when joined by said joining tile material.

14. The method of claim 2 wherein the steps of pressing a tile material to form said first and second preformed tile blanks comprises the steps of:

preparing different colored bars from a tile material;

piling said colored bars;

cutting said colored bars to a thickness larger than the thickness of said preformed tile blanks to form a group of different colored cut pieces; and pressing said cut pieces into one body to form said first and second preformed tile blanks with a mottled pattern.

15. The method of claim 14 wherein said joining tile material comprises a joining bar having the shape of said gap; and said joining bar is formed by:

preparing different colored bars from a tile material;

cutting said bars into pieces;

kneading said pieces to form a kneaded body with a mottled pattern; and extruding and cutting said kneaded body into the shape of said gap to form said joining bar.

16. The method of claim 2 wherein said joining tile material comprises joining granules made of a tile material, and the step of disposing said joining tile material comprises the steps of:

filling said gap with said joining granules while keeping said gap in a fixed state; and disposing said joining granules on an overall surface in a thickness direction of said preformed tile blanks to form a lining layer on said overall surface of said preformed tile blanks.

17. The method of claim 2 wherein said one of said end surfaces of said preformed tile blanks is formed with substantially a rectangular shape so that said gap has substantially a square cross section, and said joining bar is formed with substantially a square cross section corresponding to said cross section of said gap.

18. The method of claim 2 wherein said forming space has a V-section and said press-forming die comprises an upper mold and a lower mold between which said forming space with said V-section is formed, and one end of each said preformed tile blank has a slanted shape so that said gap opens upward toward said upper mold.

19. The method of claim 2 wherein the steps of pressing said tile material to form said preformed tile blanks are performed under a pressure ranging from one-half to two-thirds the pressure used in the step of pressing said preformed tile blanks and said joining material.

20. The method of claim 2 further including using said accessory tile with said angular shape to form a stepped part, and wherein the steps of pressing said tile material to form said first and second preformed tile blanks comprises providing one of said preformed tile blanks with a colored striped portion along said one of said end surfaces of said preformed tile blanks.

21. The method of claim 2 wherein said joining tile material has a different color from the colors of said tile material of said preformed tile blanks, said joining tile material being pressed into a corner portion between said preformed tile blanks to form a colored pattern along said end surfaces of said preformed tile blanks.

22. The method of claim 2 wherein the steps of pressing said tile material to form said preformed tile blanks comprises providing one of said preformed tile blanks with a protruded area along said end surface.

23. An accessory tile obtained by the method of claim 1.

24. An accessory tile obtained by the method of claim 2.

25. An accessory tile obtained by the method of claim 20.

26. An accessory tile obtained by the method of claim 22.

* * * * *